United States Patent [19]
Wakabayashi et al.

[11] Patent Number: 5,481,656
[45] Date of Patent: Jan. 2, 1996

[54] ACCESSORY CONTROL DEVICE AND INFORMATION PROCESSING METHOD

[75] Inventors: Kenichi Wakabayashi; Chitoshi Takayama; Tadashi Shiozaki, all of Suwa, Japan

[73] Assignee: Seiko Epson Corporation, Japan

[21] Appl. No.: 79,482

[22] Filed: Jun. 18, 1993

[51] Int. Cl.⁶ .................................................. G06K 15/00
[52] U.S. Cl. ........................................... 395/115; 395/112
[58] Field of Search ..................................... 395/110, 114, 395/115, 116, 112, 164–166, 106; 400/61–62, 76, 3–6, 67; 358/404, 444

[56] References Cited

U.S. PATENT DOCUMENTS

| | | | |
|---|---|---|---|
| 4,441,164 | 4/1984 | Pavan | 395/115 |
| 4,730,947 | 3/1988 | Ikeda et al. | 400/61 |
| 5,137,379 | 8/1992 | Ukai et al. | 395/115 |

*Primary Examiner*—Arthur G. Evans

[57] ABSTRACT

An accessory control device for installation in an electronic device, such as a printer, that normally receives data though its own input port, for performing information processing. Rather than the electronic device receiving data from outside and processing it, the accessory control device is provided with a communication interface capable of receiving data directly from external sources and processing it using a processor within the accessory control device. The processed data is then transferred to the electronic device. The accessory control device is typically constructed using a cartridge type housing and has a communication control section that receives the data and transfers it to the microprocessor for processing in a desired manner. Memory internal to the cartridge is used to store data and programs used by the microprocessor. In a typical application the programs provide a page description language interpreter which is used by the microprocessor to develop print data received from an outside source into image data. Following this, the microprocessor outputs the image data using a double-bank control circuit to the electronic control device, which is typically a the laser printer, and it is printed.

34 Claims, 24 Drawing Sheets

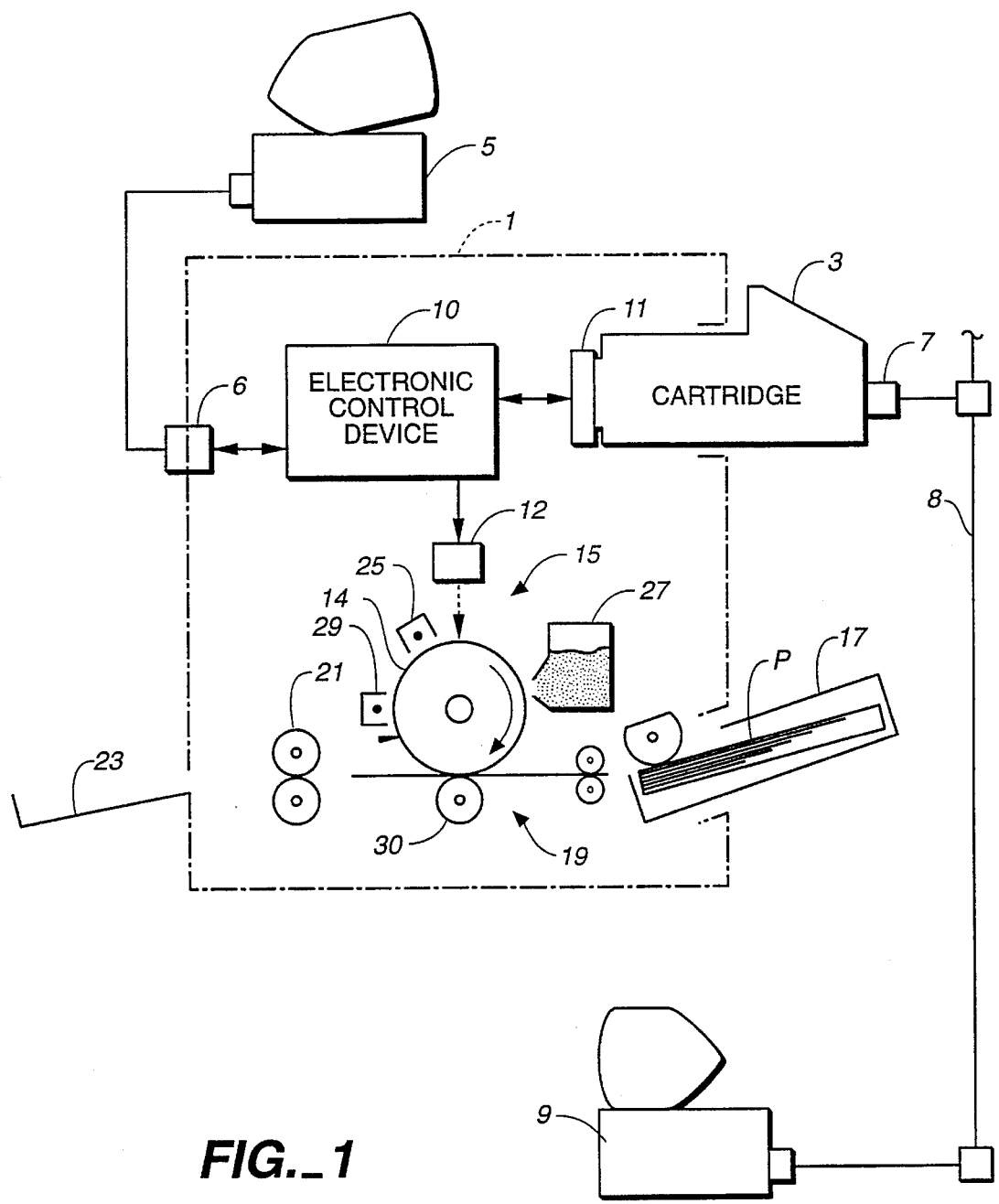
FIG._1

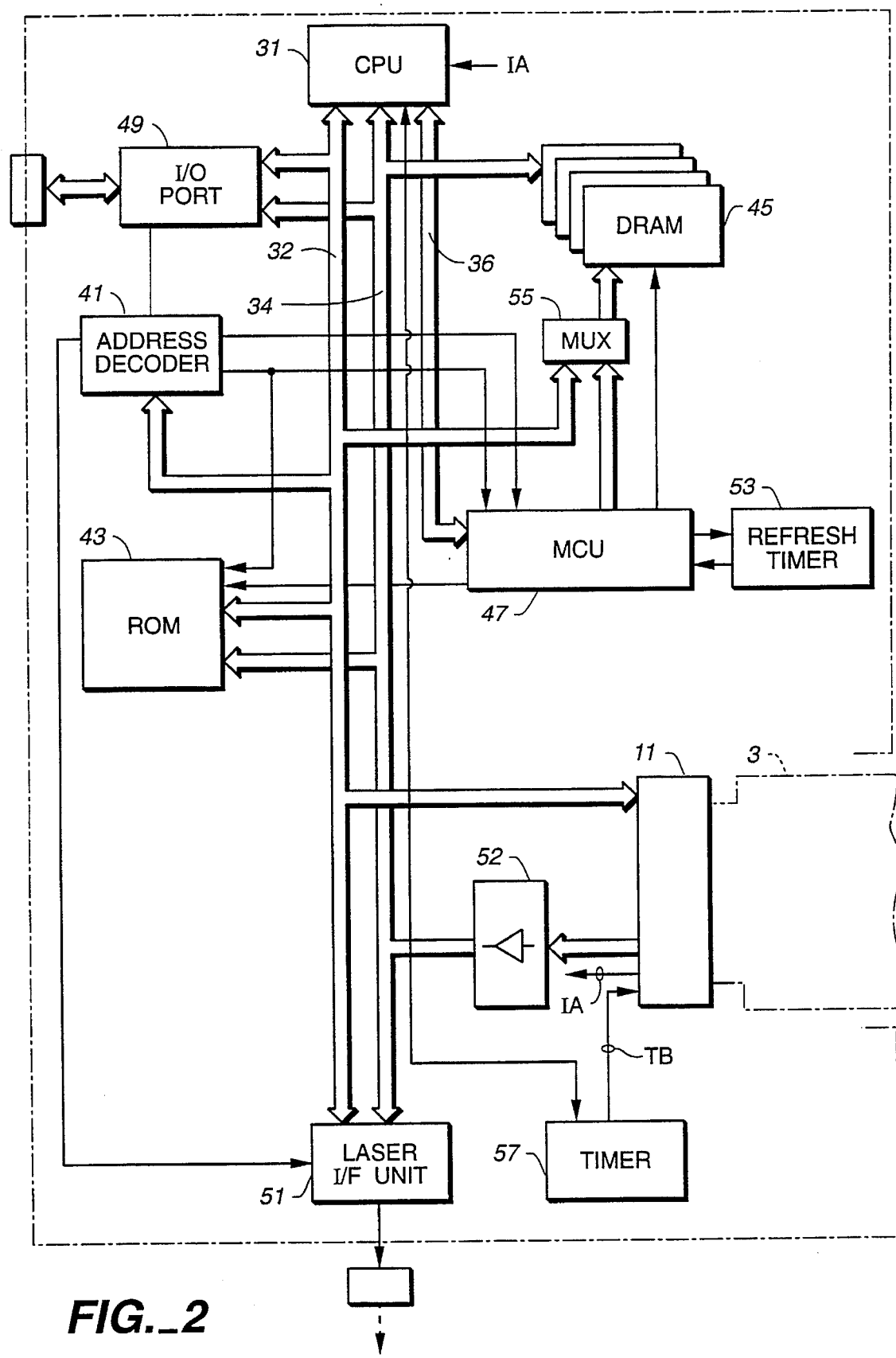
FIG._2

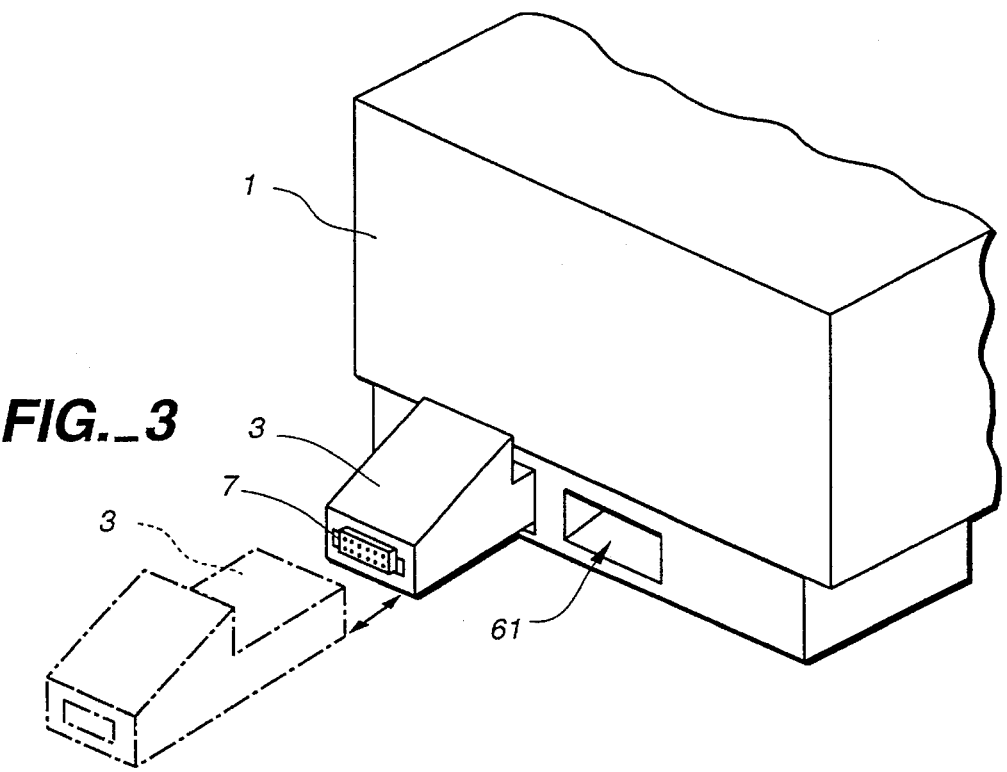
FIG._3
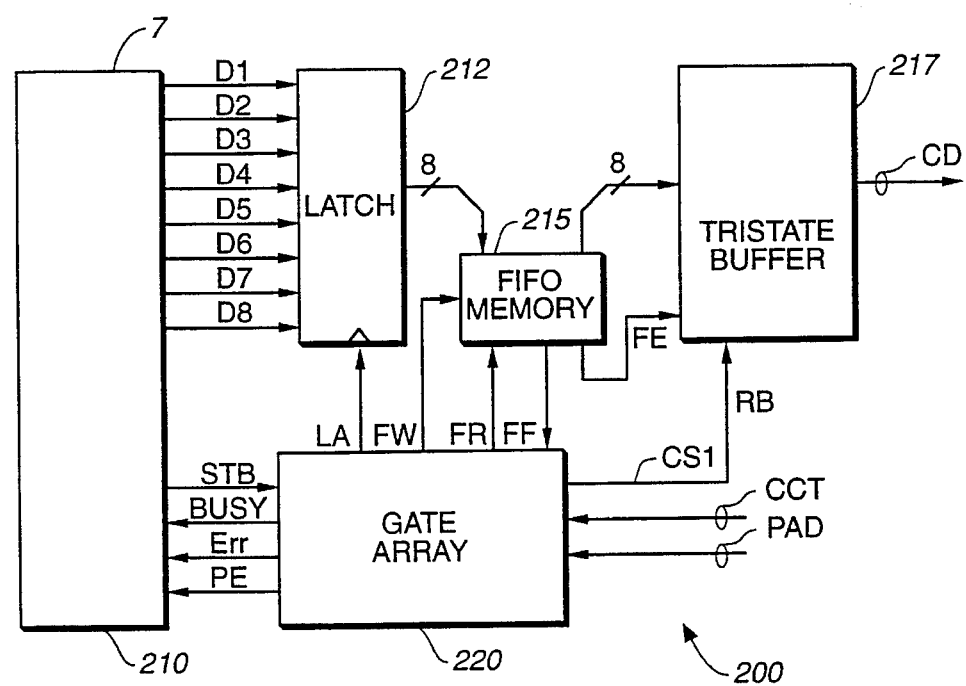
FIG._6

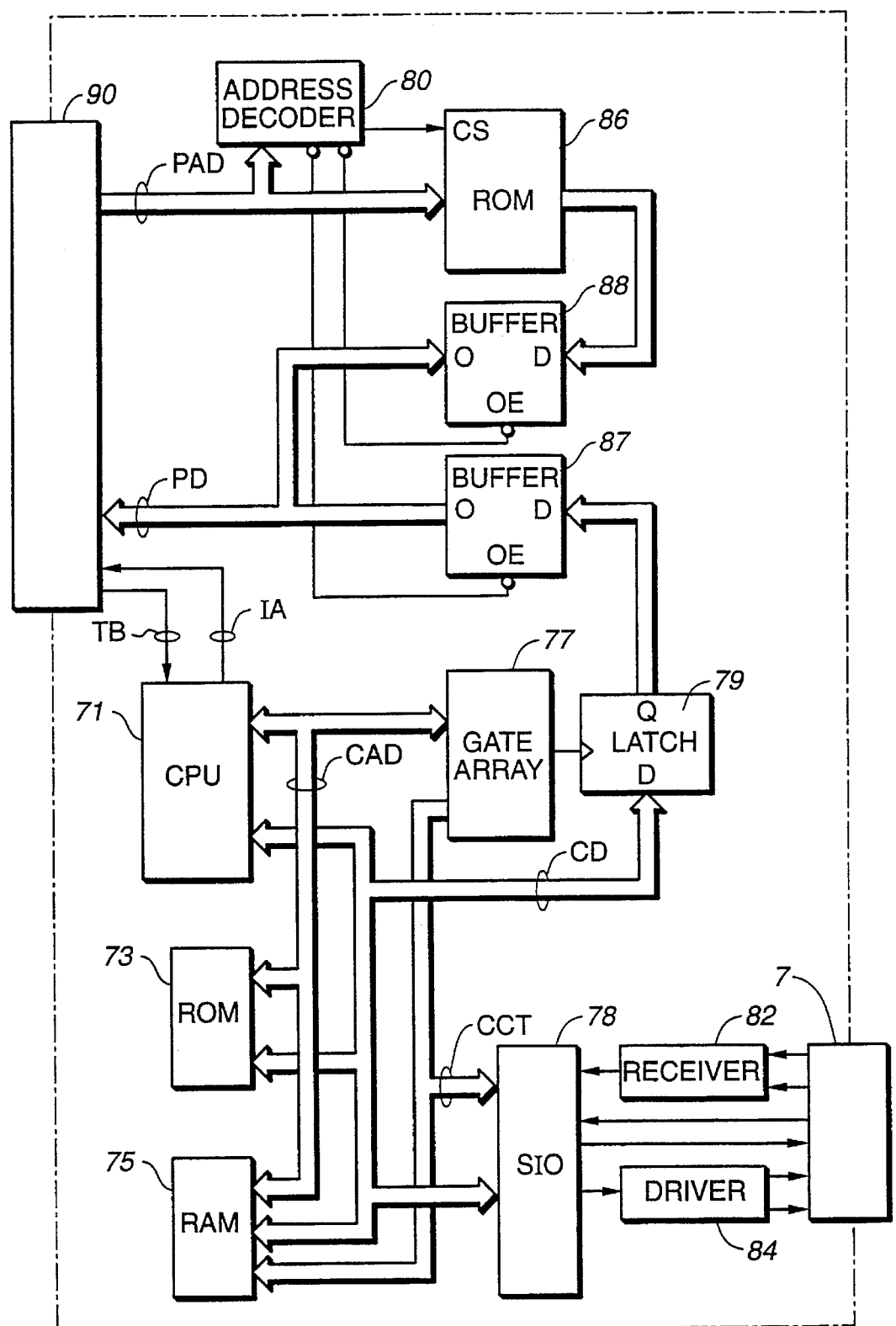
FIG._4

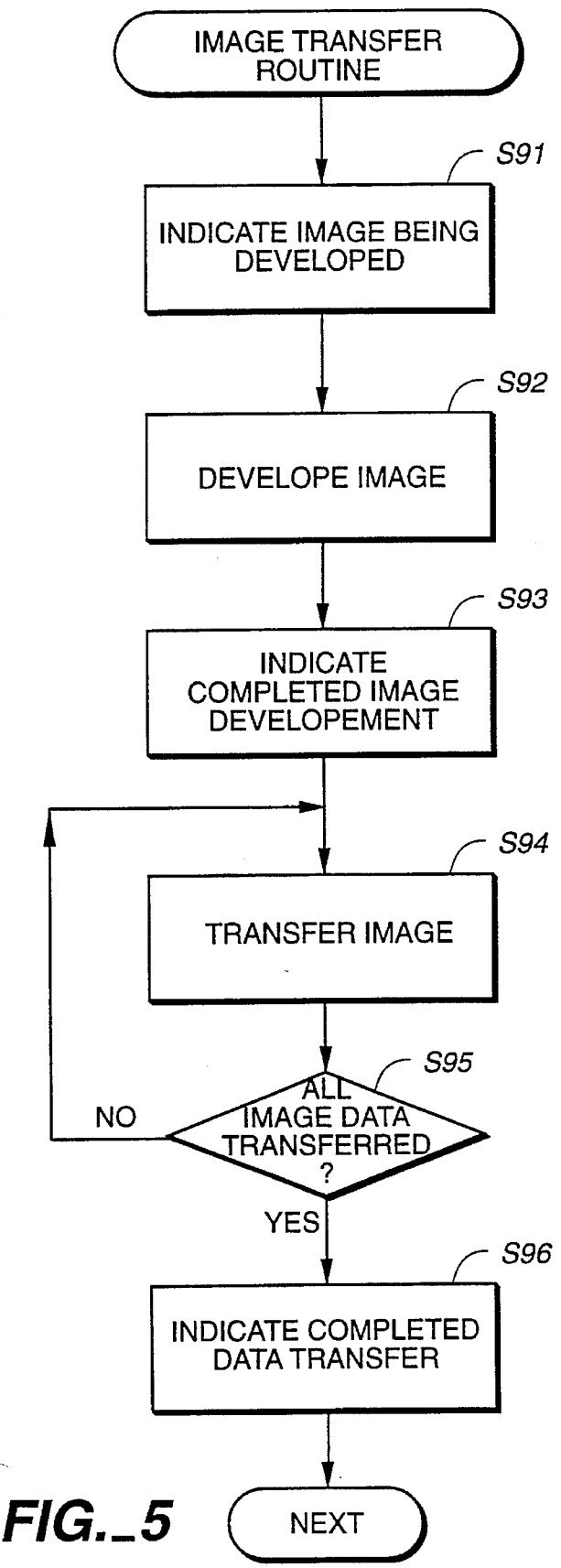

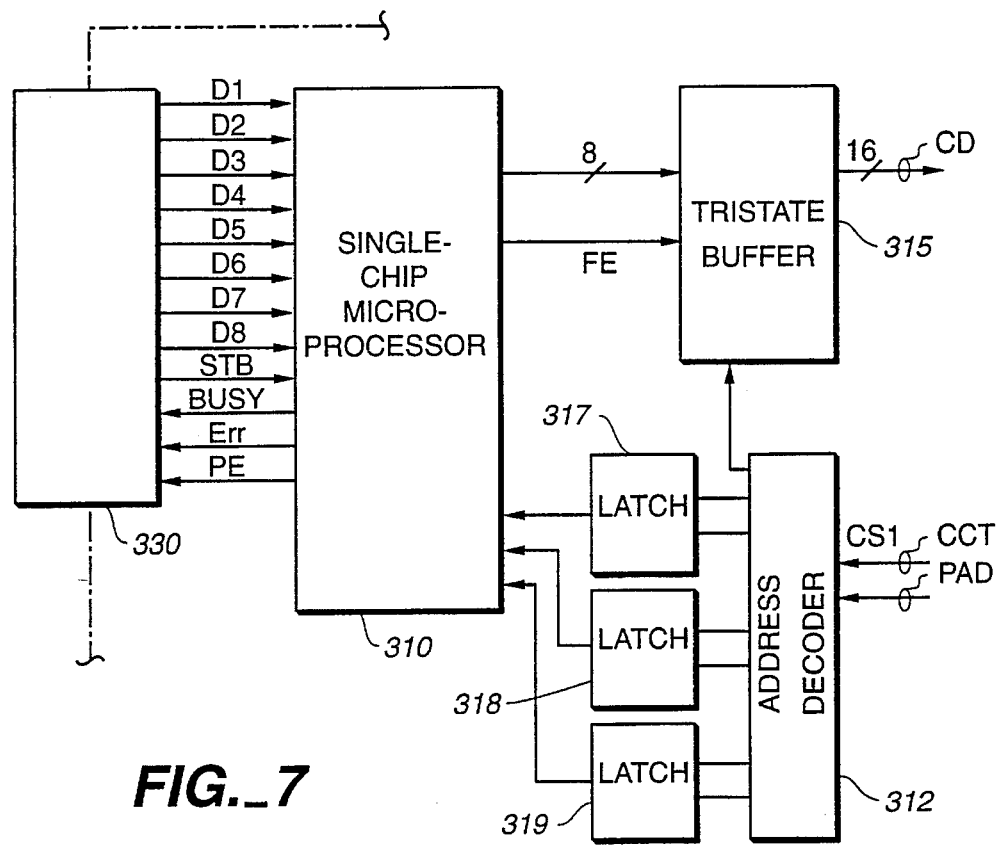
FIG._7
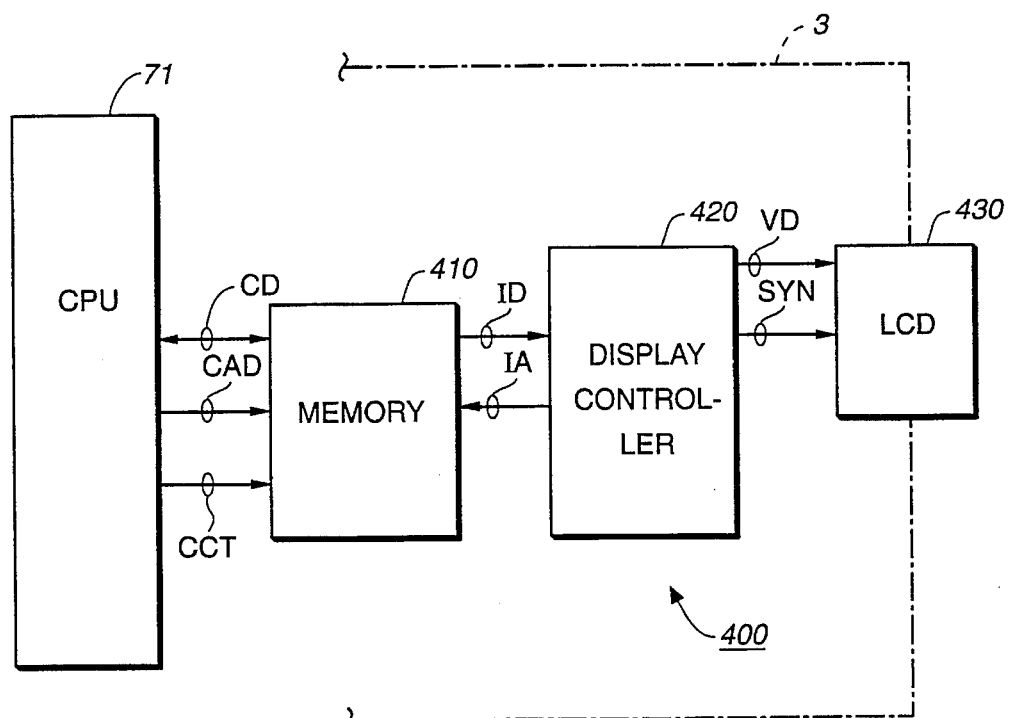
FIG._8

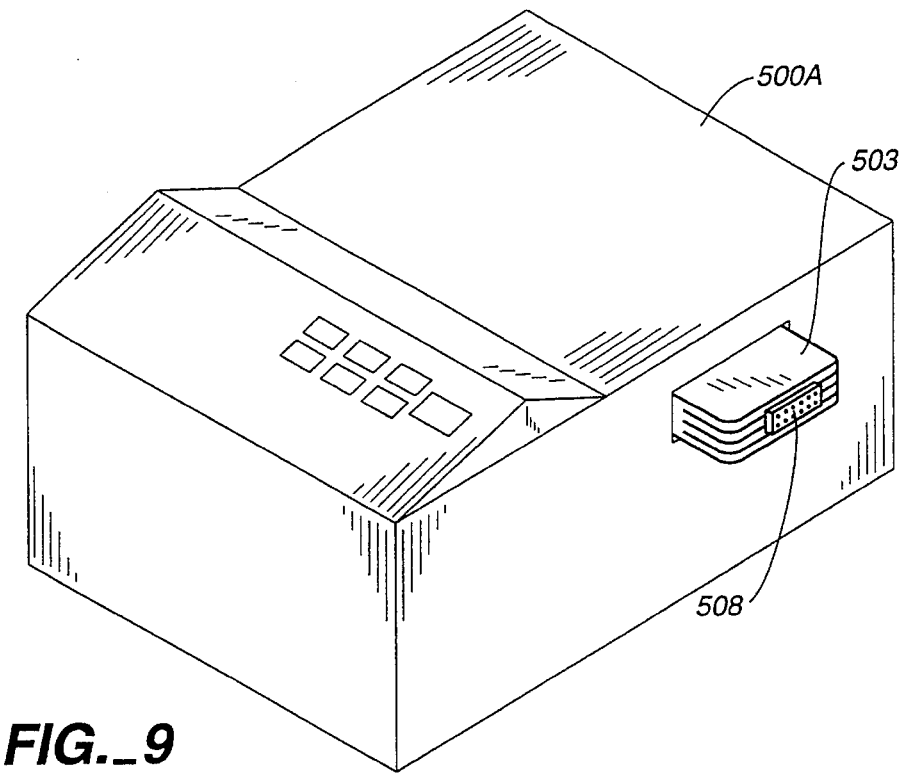
FIG._9
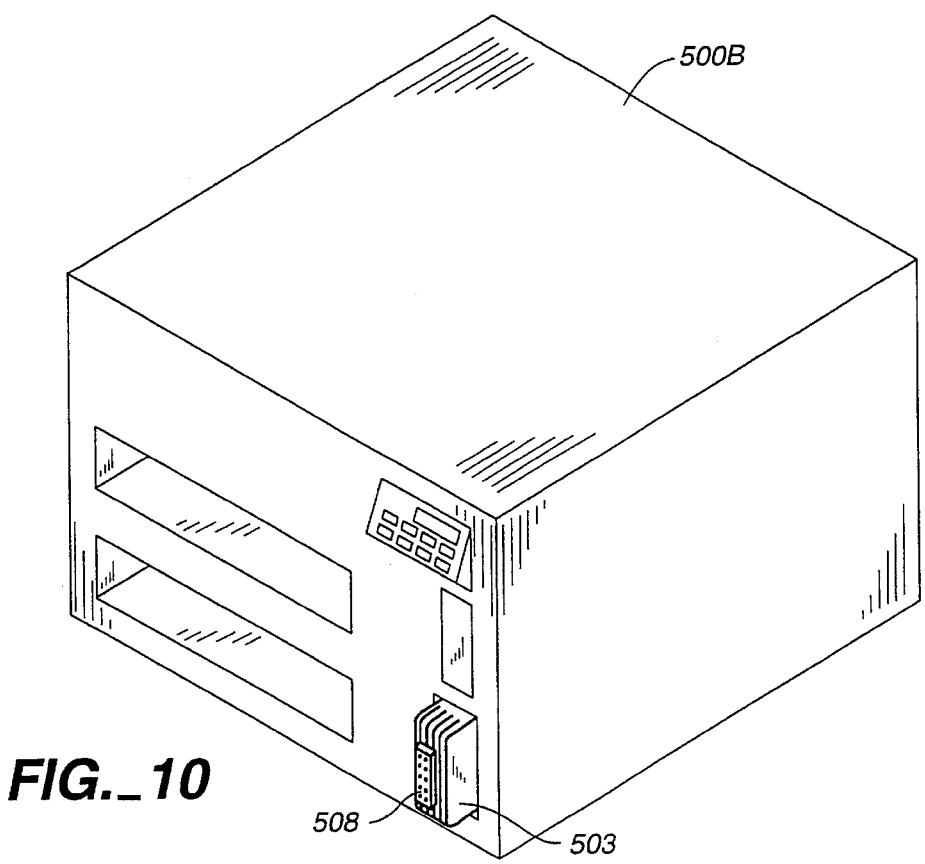
FIG._10

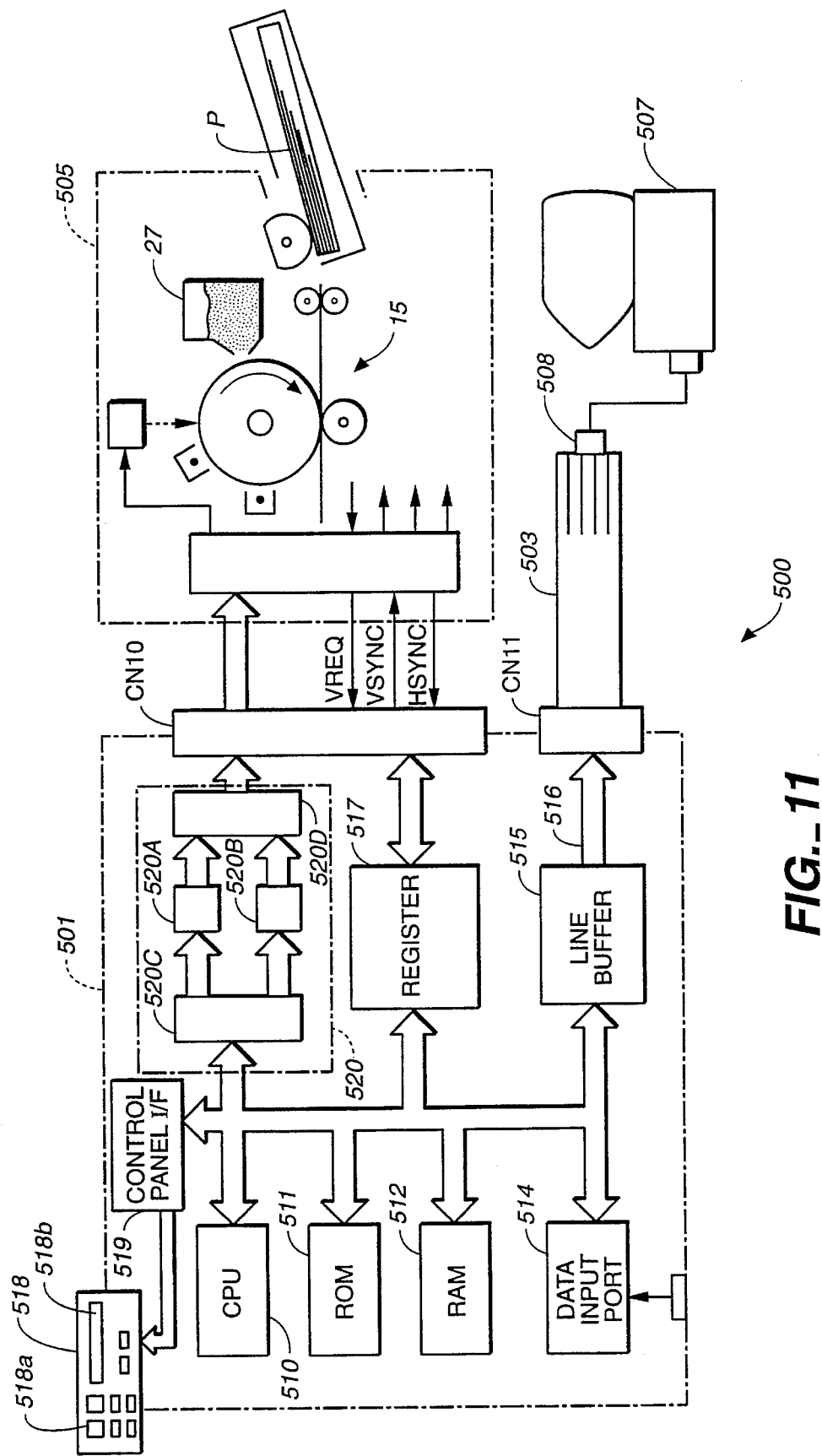
FIG._11

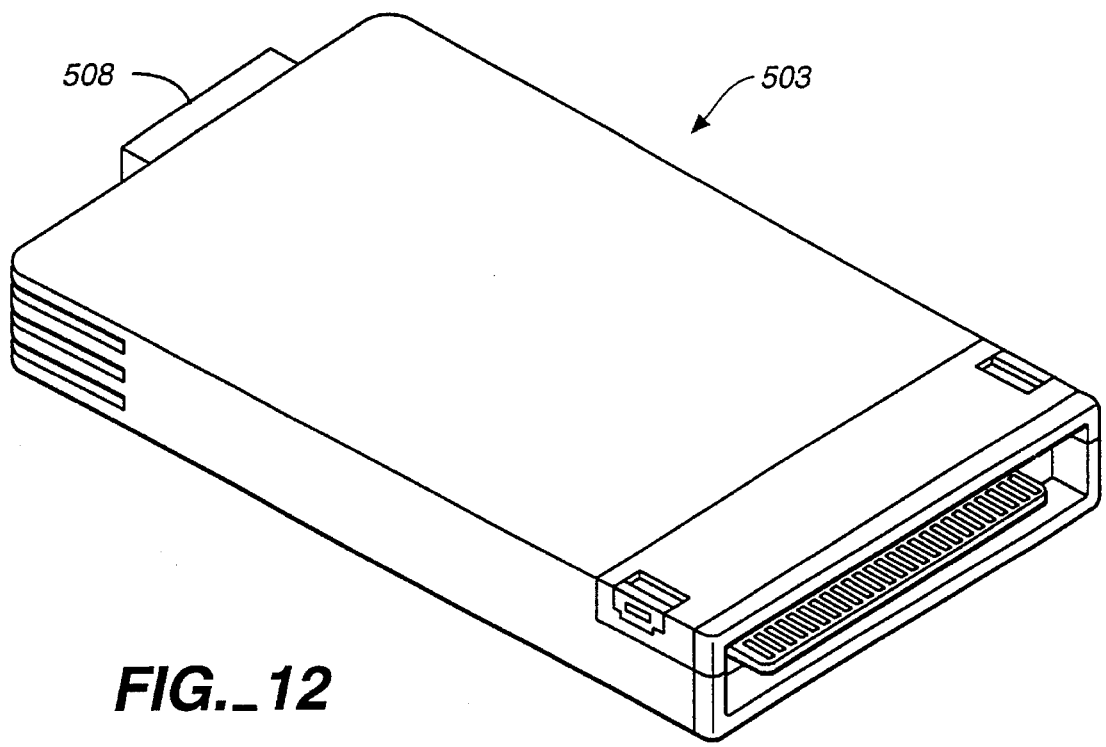
FIG._12
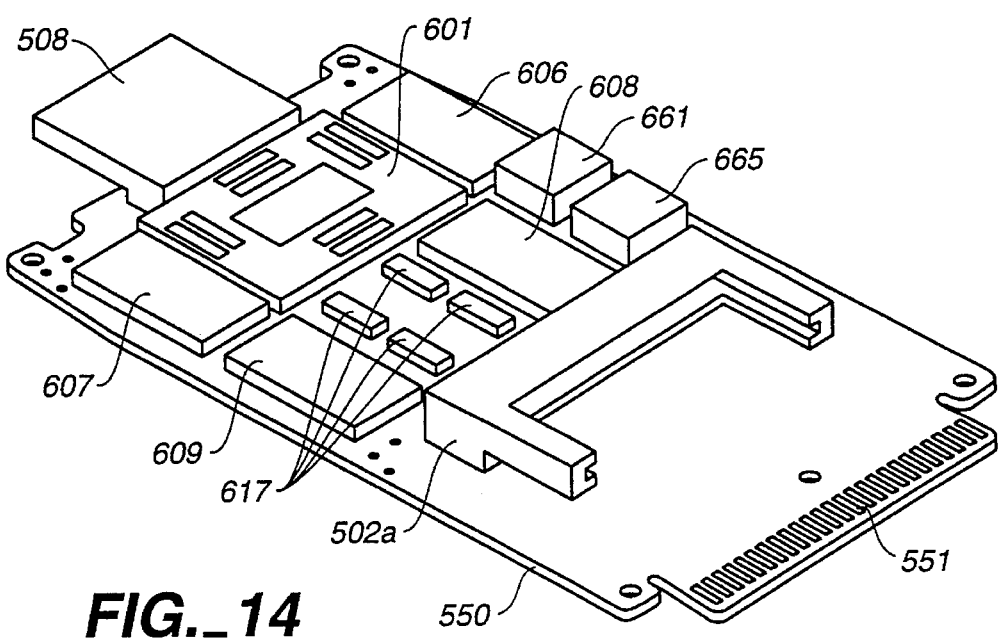
FIG._14

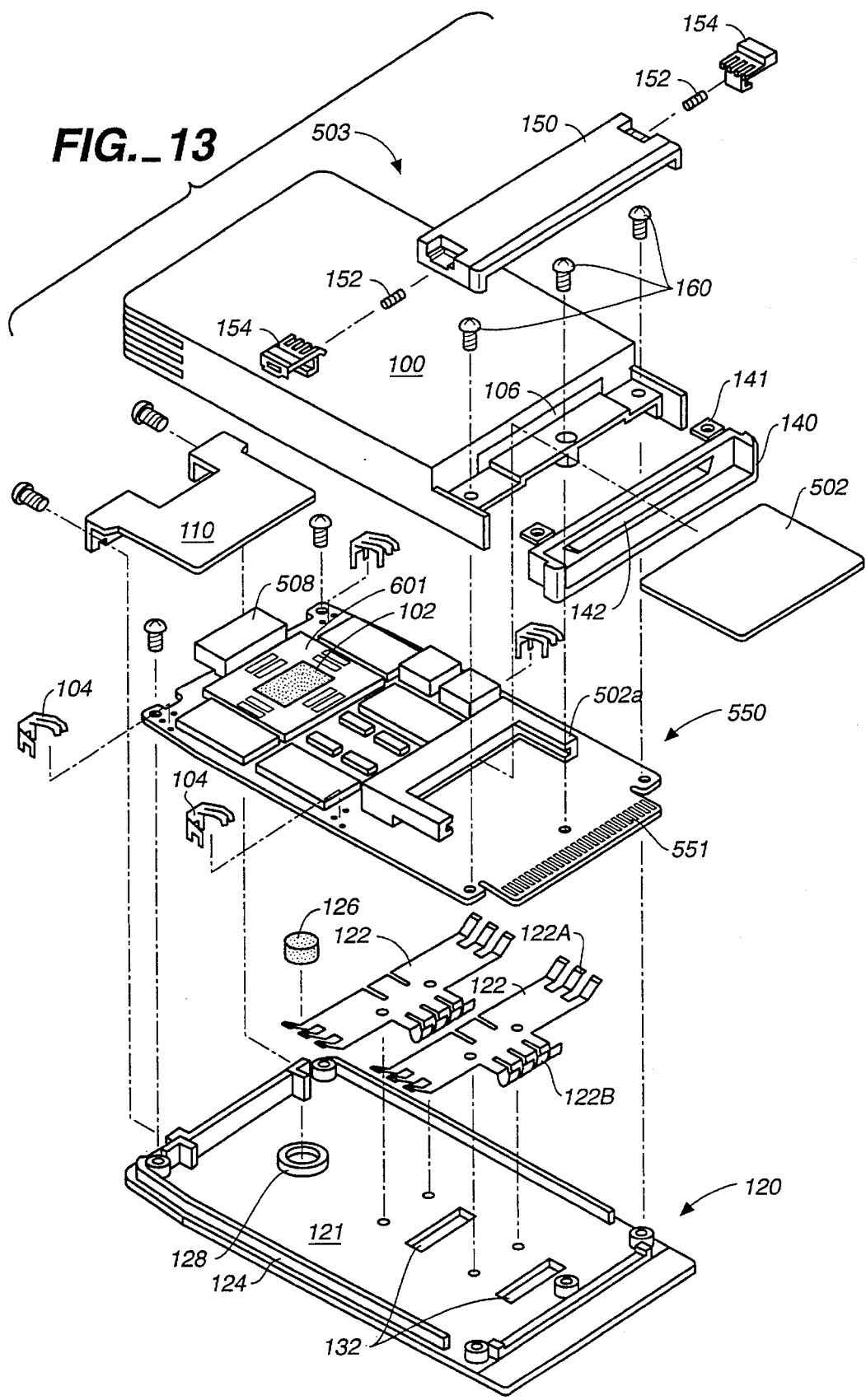
FIG._13

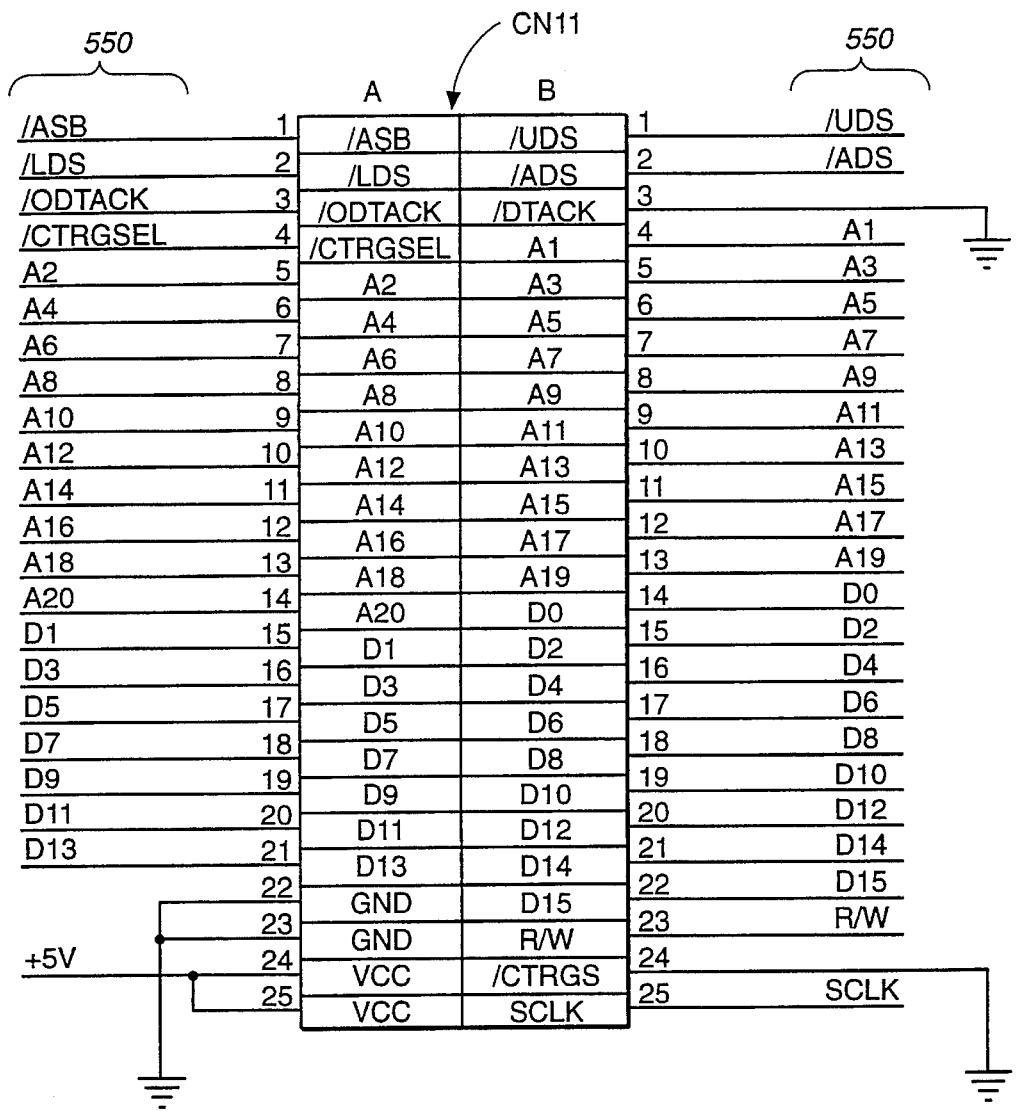
FIG._15
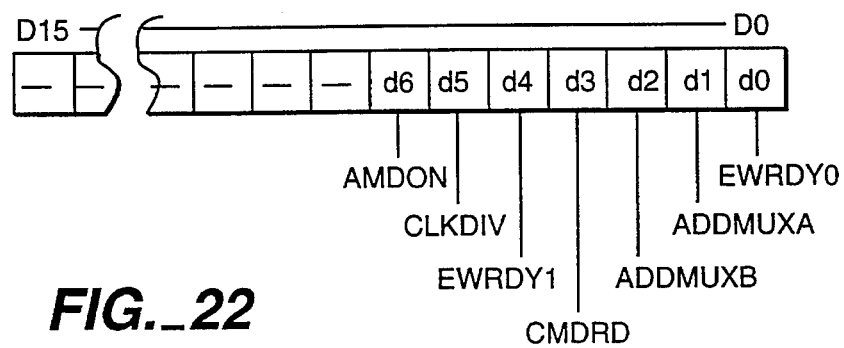
FIG._22

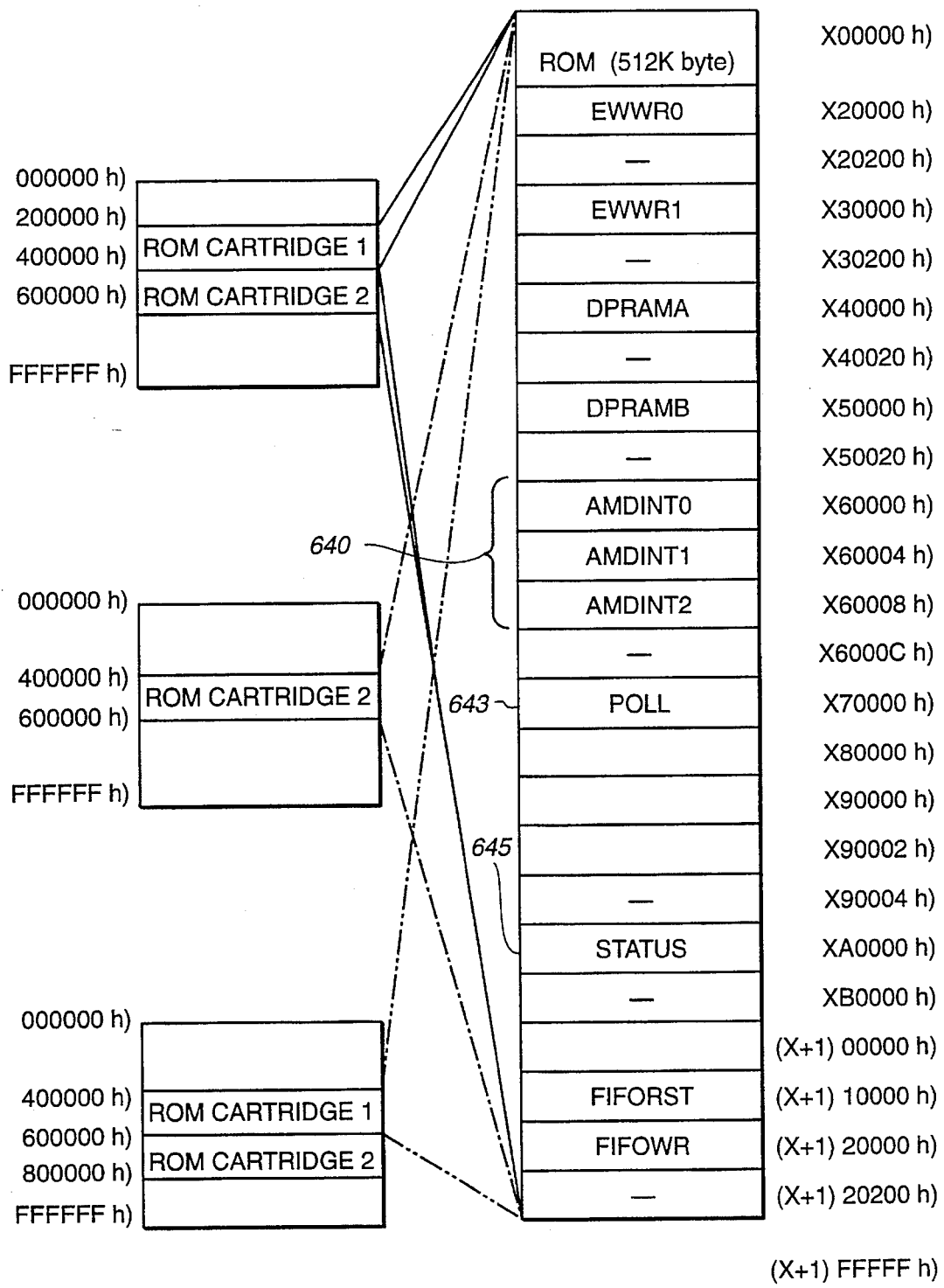
FIG._16

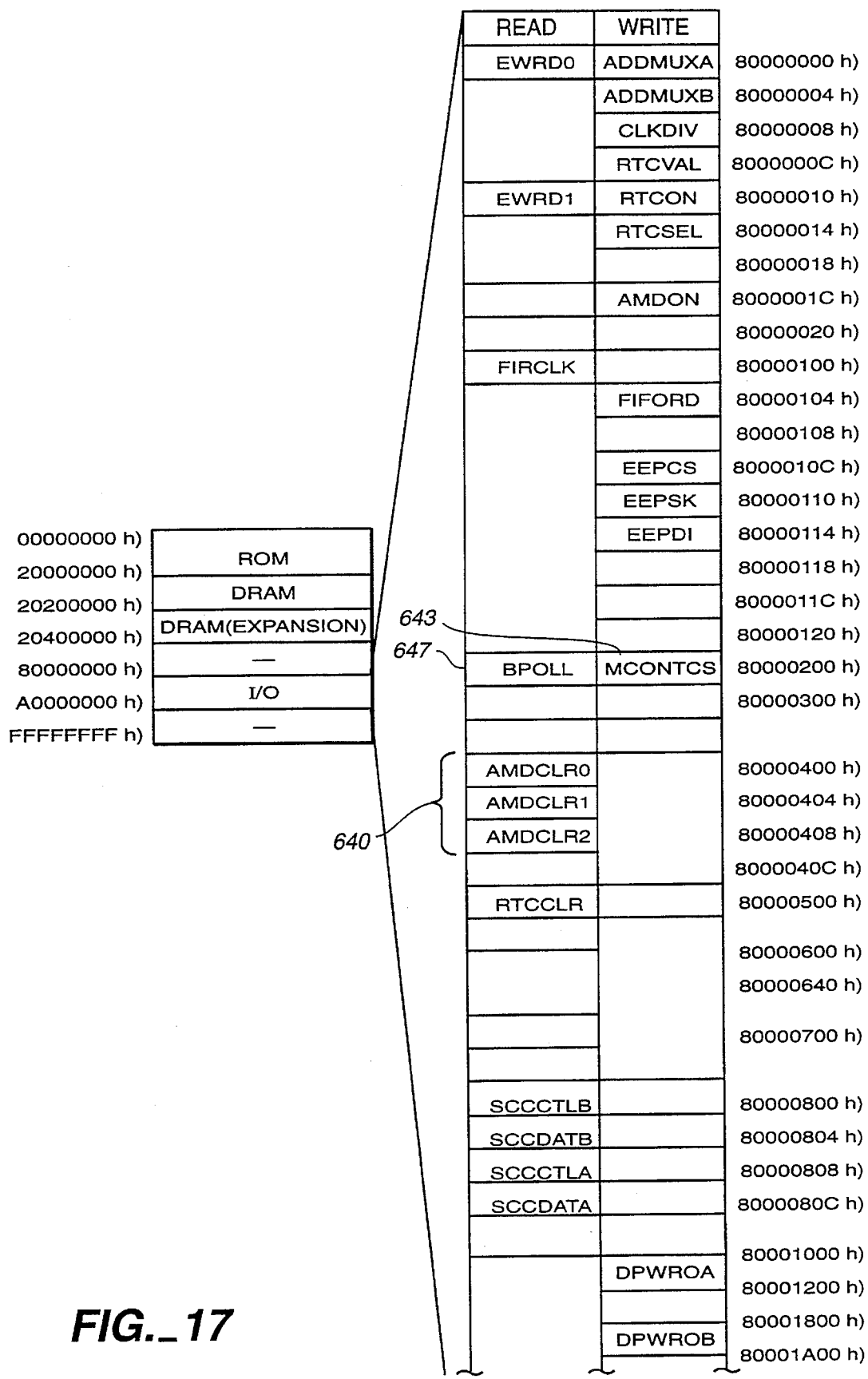
FIG._17

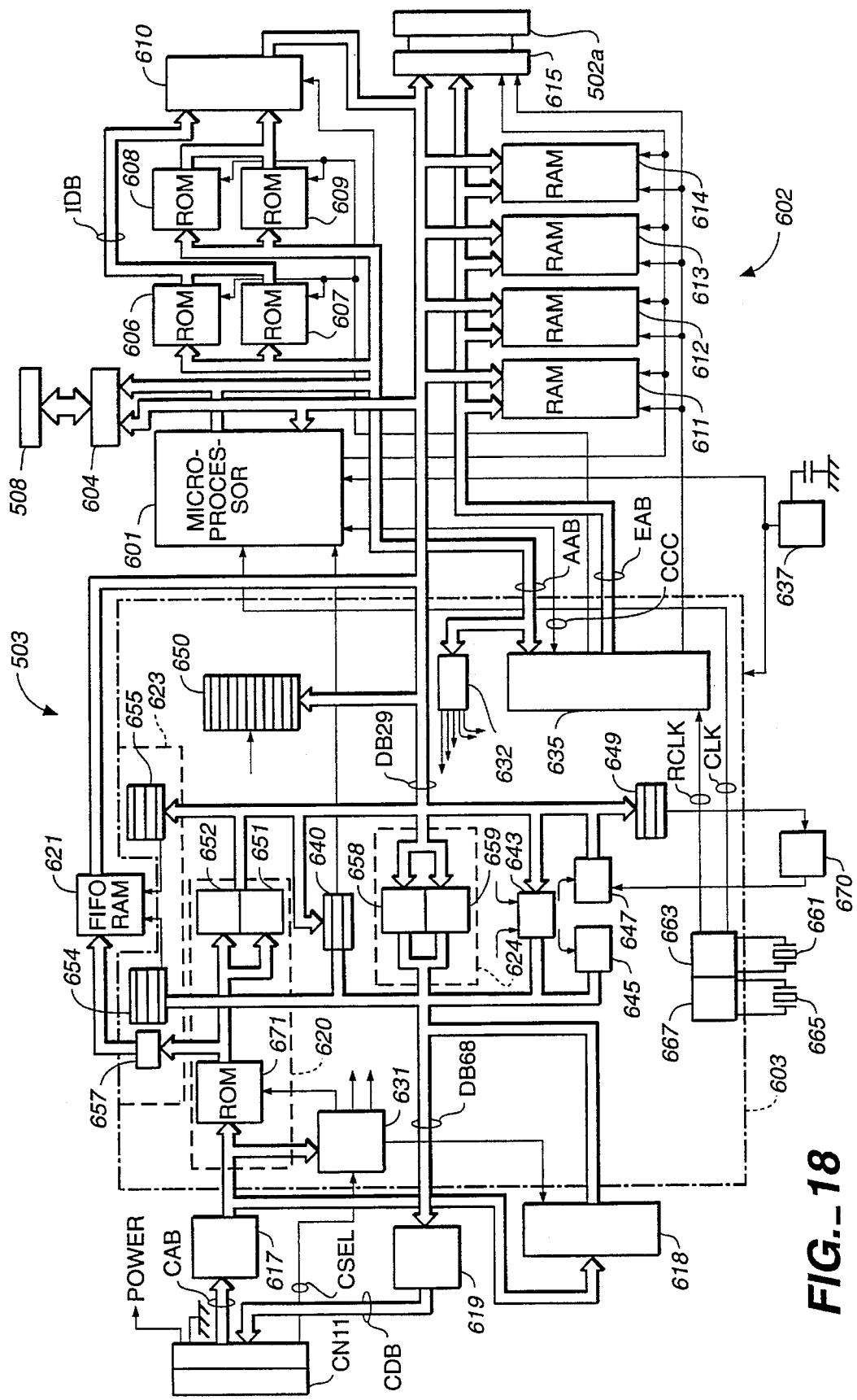
FIG._18

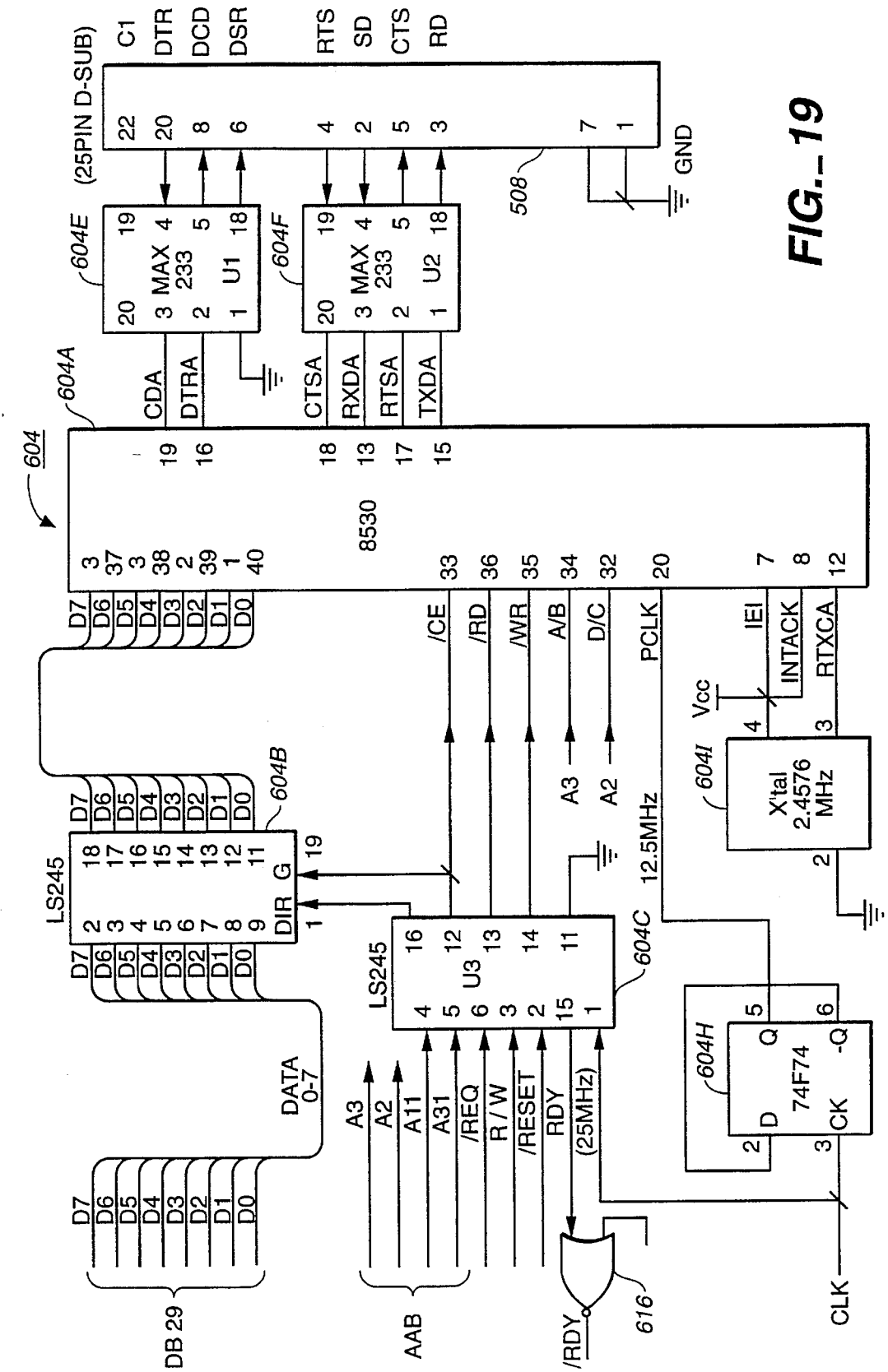
FIG._19

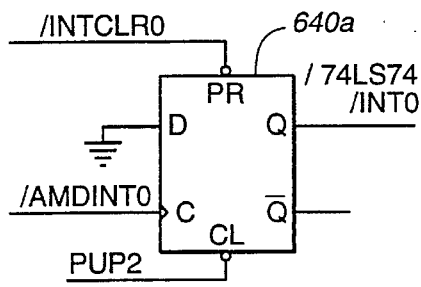
*FIG._20A*
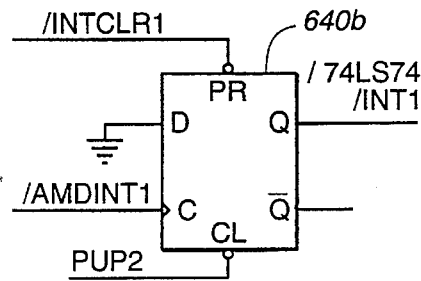
*FIG._20B*
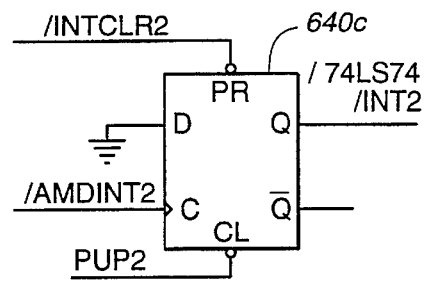
*FIG._20C*
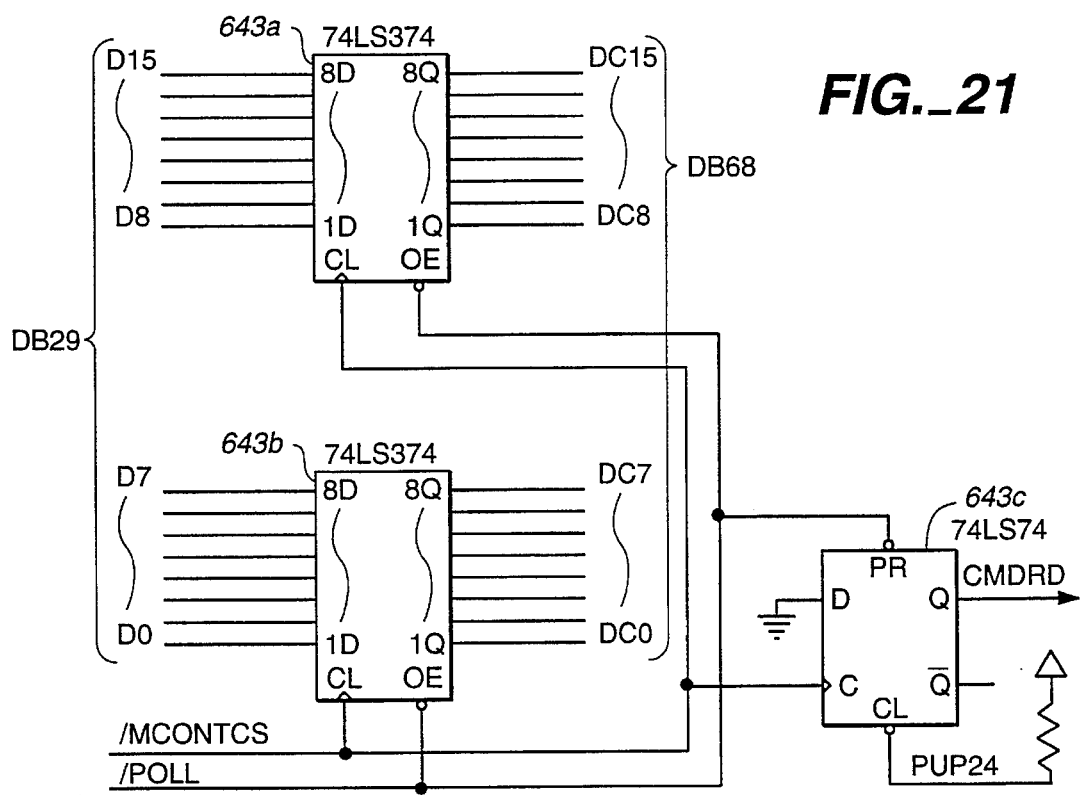
*FIG._21*

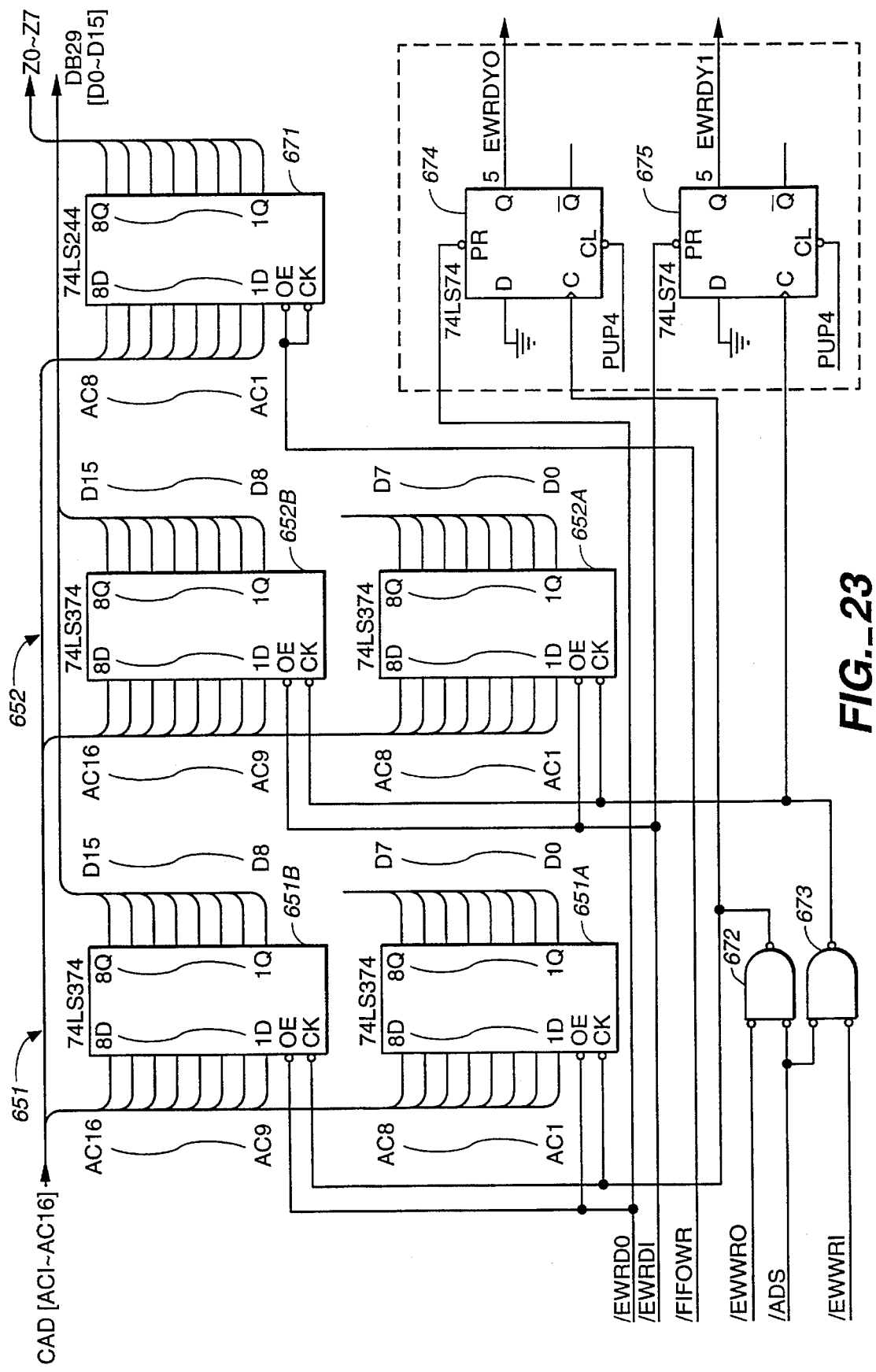
FIG._23

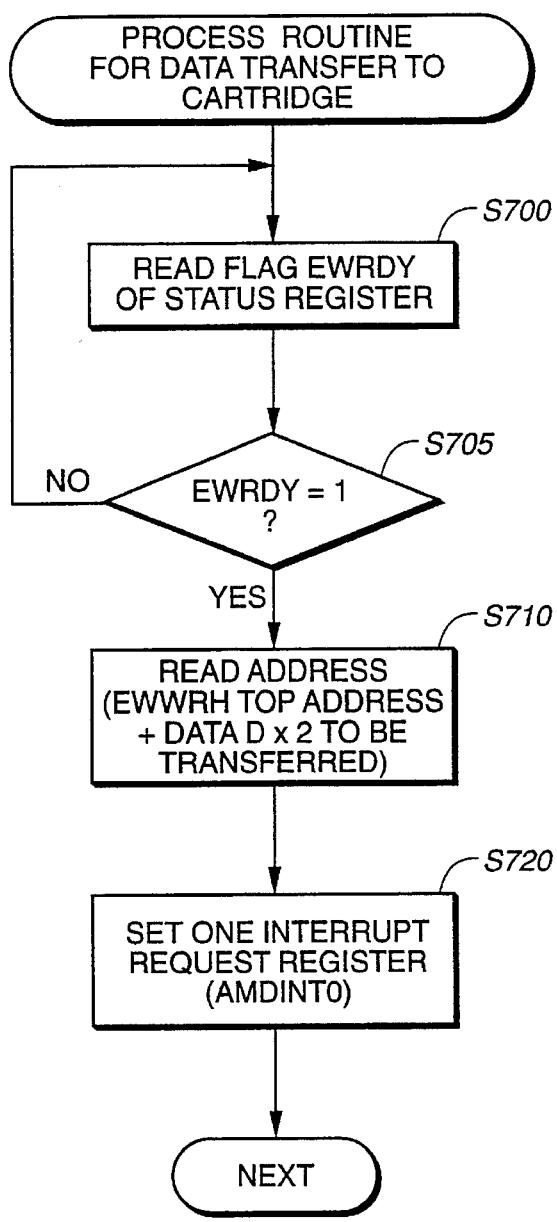
FIG._24
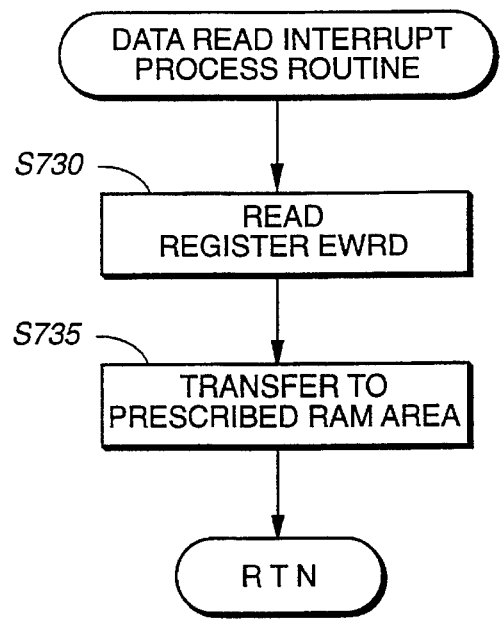
FIG._25

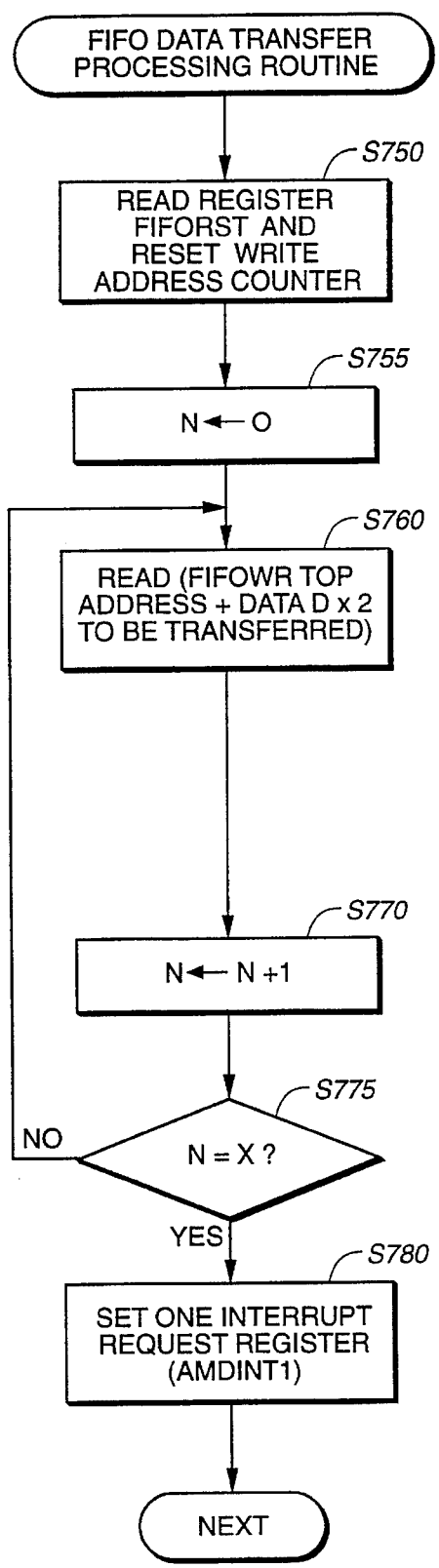
FIG._26
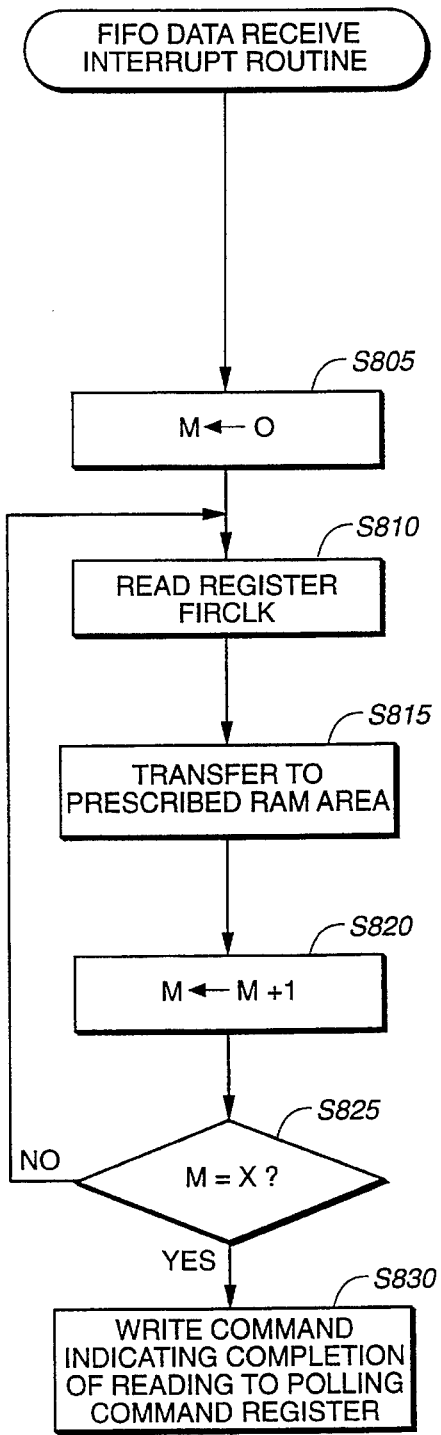
FIG._27

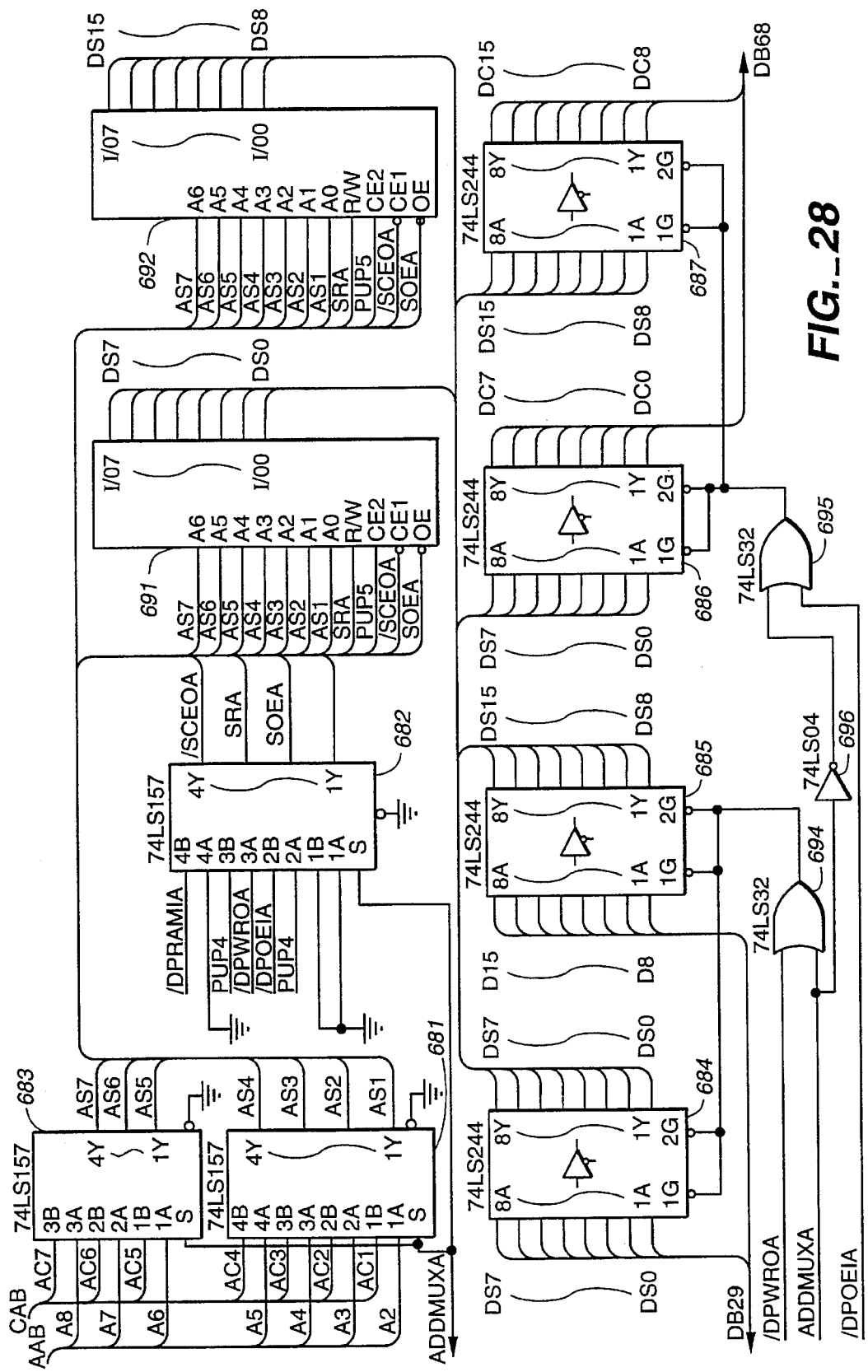
FIG._28

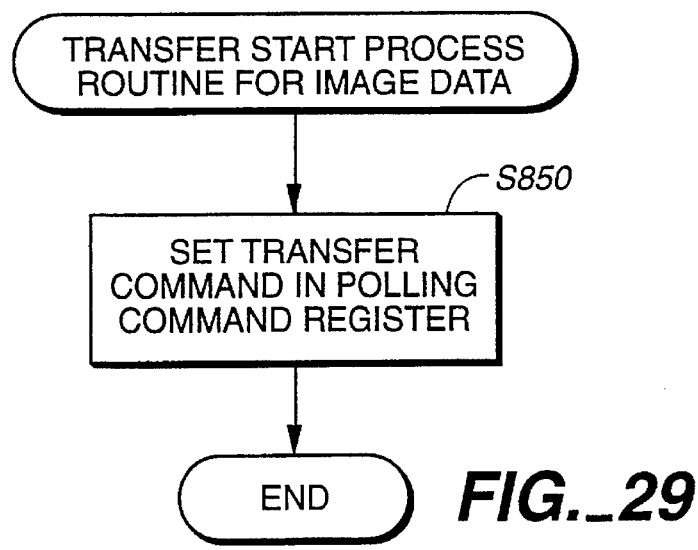
FIG._29
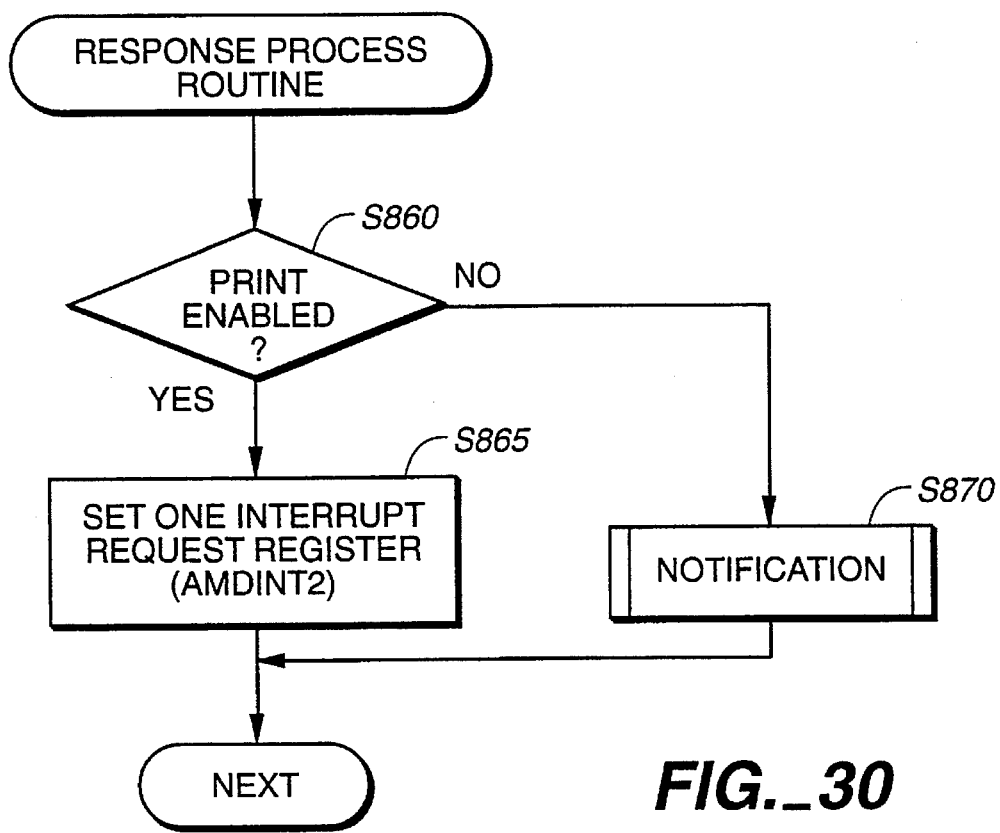
FIG._30

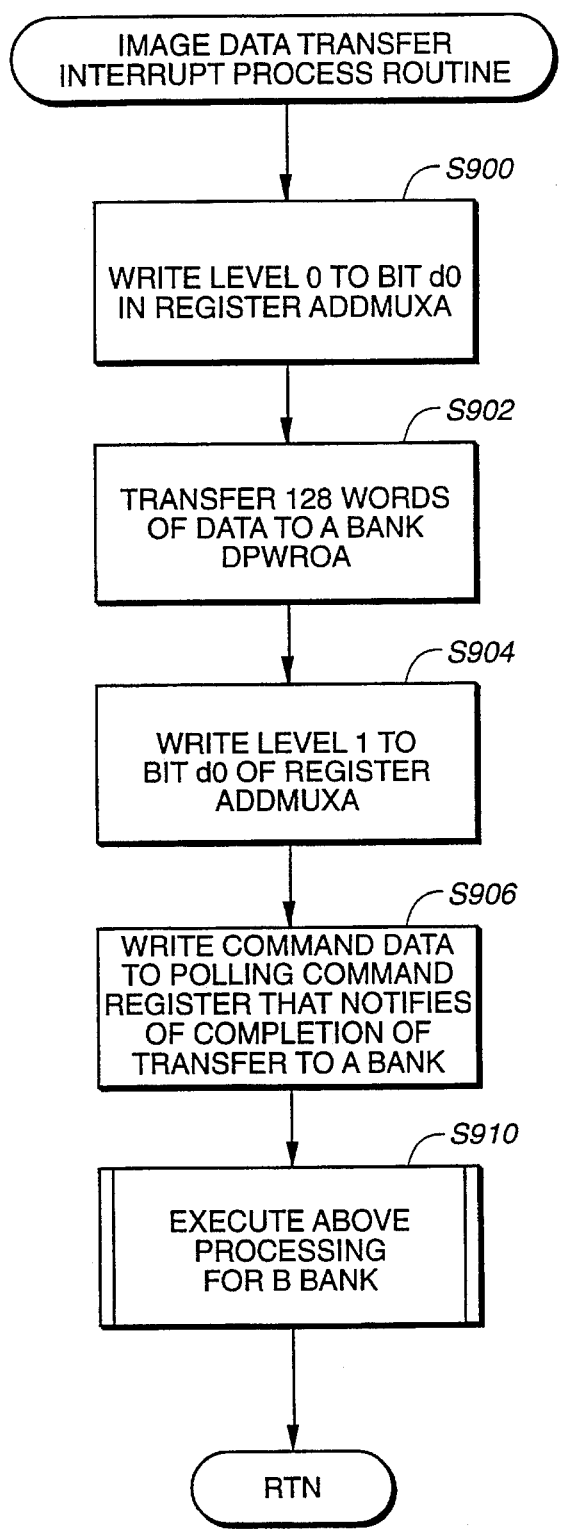
FIG._31
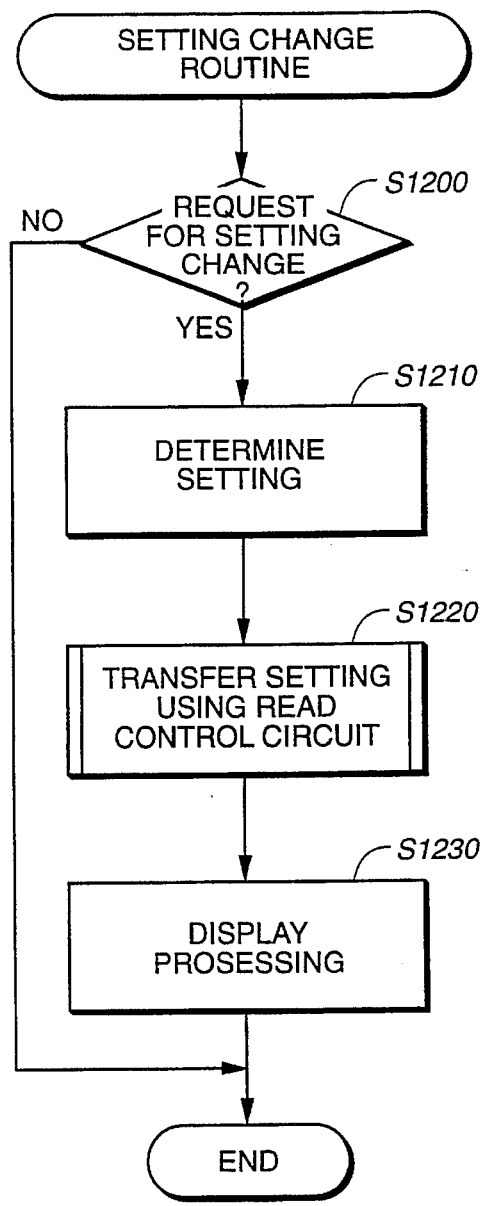
FIG._34

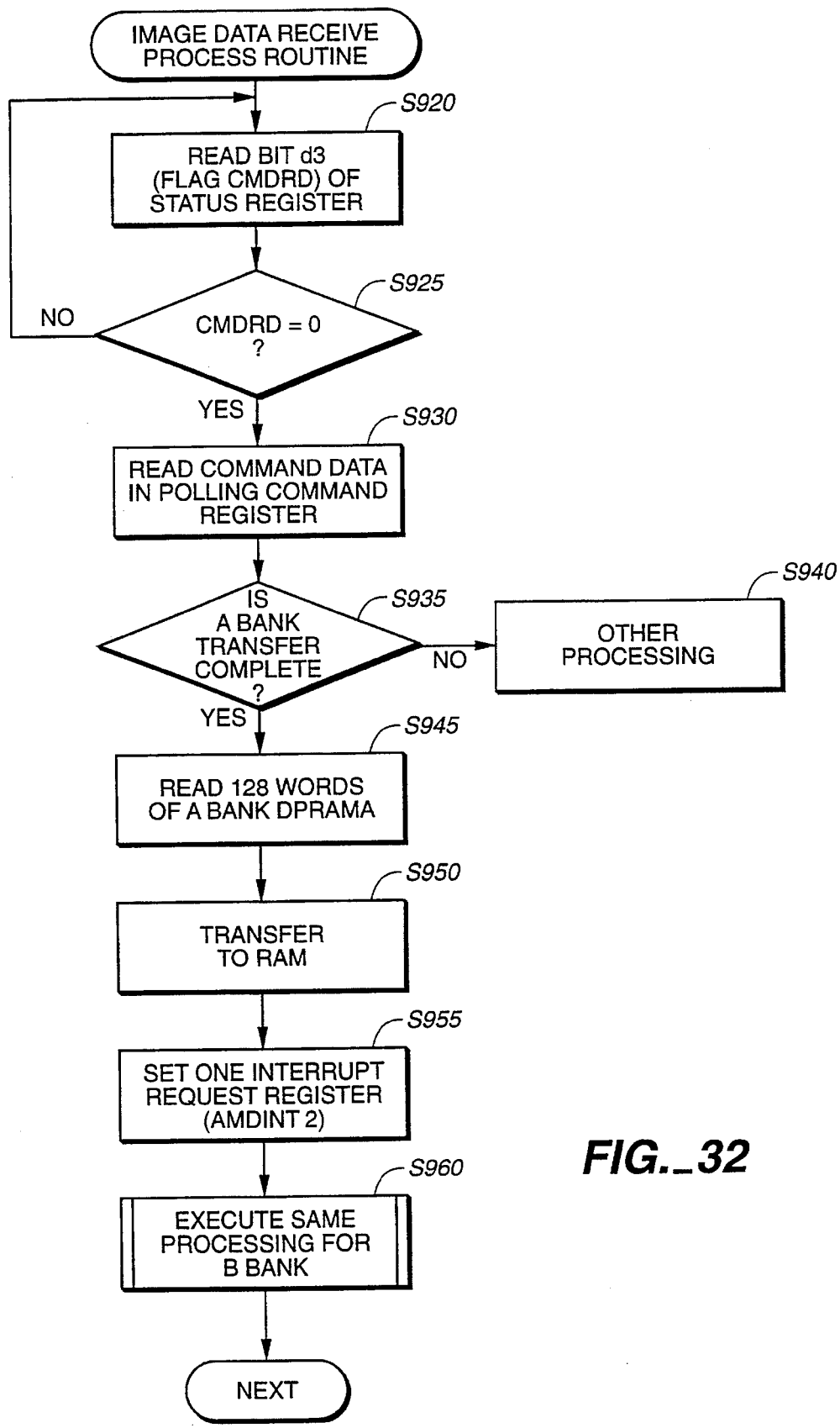
FIG._32

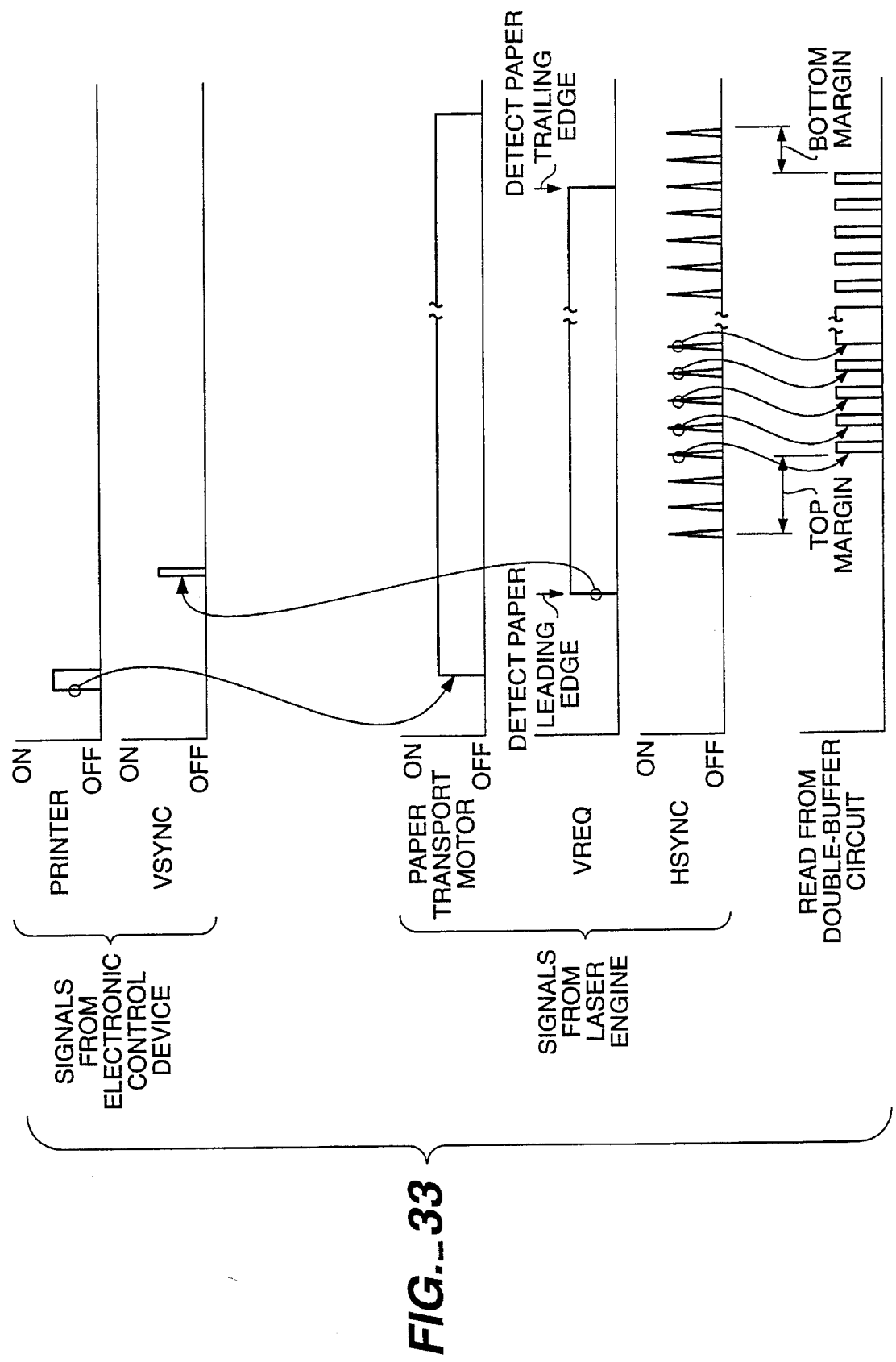
FIG._33

ACCESSORY CONTROL DEVICE AND INFORMATION PROCESSING METHOD

CROSS REFERENCES TO RELATED APPLICATIONS

This application is also related to the following other applications:

"INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING", Wakabayashi et al., U.S. Ser. No. 07/816,455, filed Dec. 30, 1991 (P16491a).

"INFORMATION PROCESSING DEVICE IN AN ELECTRONIC APPARATUS UTILIZING AN ACCESSORY CONTROL DEVICE AND METHODS OF APPLICATION", Wakabayashi et al., U.S. Ser. No. 07/883,753, filed May 15, 1992 (P16655a).

"INFORMATION PROCESSING DEVICE IN AN ELECTRONIC APPARATUS UTILIZING AN ACCESSORY CONTROL DEVICE AND METHODS OF APPLICATION", Wakabayashi et al., U.S. Ser. No. 07/895,537 (P16646a), filed Jun. 8, 1992.

"APPARATUS TYPE IDENTIFICATION DEVICE AND METHOD THEREFOR", Wakabayashi et al., U.S. Ser. No. 07/908,671 (P16619a), filed Jul. 2, 1992.

"INFORMATION PROCESSING DEVICE AND THE ACCESSORY CONTROL DEVICE AND INFORMATION PROCESSING METHOD IT USES", Wakabayashi et al., U.S. Ser. No. 07/910,590 (P16628a), filed Jul. 8, 1992.

"ADD-ON ELECTRONIC DEVICE AND ELECTRONIC SYSTEM", Wakabayashi et al., U.S. Ser. No. 07/854,643 (P16637a), filed Jul. 1, 1992.

"INFORMATION PROCESSING DEVICE AND THE ACCESSORY CONTROL DEVICE AND INFORMATION PROCESSING METHOD IT USES", Wakabayashi et al., U.S. Ser. No. 07/910,851 (P16664a), filed Jul. 7, 1992.

"TEMPERATURE CONTROL FOR ADD-ON ELECTRONIC DEVICES", Wakabayashi et al., U.S. Ser. No. 07/907,988 (P16673a), filed Jul. 1, 1992.

"INFORMATION PROCESSING DEVICE AND THE ACCESSORY CONTROL DEVICE AND INFORMATION PROCESSING METHOD IT USES", Wakabayashi et al., U.S. Ser. No. 07/911,558 (P16682a), filed Jul. 7, 1992.

The applications listed above are incorporated herein by reference thereto.

BACKGROUND OF THE INVENTION

1. Field of the Invention

The present invention relates to electronic devices used for information processing that employ an accessory control device, and to information processing methods used in such devices, and more particularly to efficient reception and processing of information from external sources by such devices.

2. Related Technical Art

In recent years, digital electronic equipment, such as, personal computers, word processors, work stations, and other electronic equipment using built-in microprocessors, such as printers, facsimile machines, memo devices, musical instruments, cooking equipment, and cameras, has found extensive use throughout large segments of society. In addition, other widely used apparatus such as automobiles, robots, numerically controlled machines, and a variety of other electrified products, now make use of such microprocessor technology.

The application of programmable digital logic makes it possible to have more flexible control as compared to that obtained with simple feedback type controls previously used with various fixed hardware designs. In addition, when using programmable logic, essential operating functions are easily altered by simply changing command software. One advantage of this approach is that totally different control operations are obtainable for a given piece of equipment or hardware by simply modifying the contents of program storage or memory elements, such as ROMs, that store specific processing or program steps, or by loading a new program in main memory from an external device such as a floppy disk. Moreover, smaller incremental changes in function, such as occur for design revisions and upgrades, can be advantageously implemented by only upgrading software.

However, the ultimate capabilities of processor controlled electronic equipment are determined by the capabilities of the processor itself. That is, the throughput of each processor is limited by operating characteristics such as the maximum number of processing steps obtainable per unit time, the maximum number of data bits that can be processed at one time, the width of any data or command transfer buses, and so forth. As a result of these limitations, achieving improvements by merely upgrading software versions is at best limited to improving equipment ease of use. Realistically, it has not been possible to achieve significant improvements in operating functionality for existing electronic equipment.

At the same time, improving or upgrading software versions often requires replacing a ROM or other memory element in which the software is "burned in" or contained. It is much more difficult to obtain access to or change software when replacement of such code containing ROMs is required. As a result, revising software to improve equipment operation is actually very difficult unless the particular piece of electronic equipment is already scheduled for a ROM exchange, a different ROM version, at the time of its initial design, or unless the software can be supplied on a replaceable medium such as a flexible disk and used to modify stored program material.

For some applications, devices called "accelerators" are used to improve overall equipment function, operability, or capabilities by completely replacing key control components such as microprocessors which otherwise impose limits on operation. This type of hardware "upgrade" is commonly encountered with personal computers. However, this approach requires replacing components, such as a microprocessor, generally located on a motherboard within the apparatus, and represents a task that is beyond the skill of most equipment users.

In electronic devices intended for use with personal computers, a connector is often provided for installation of circuit cards containing ROM or RAM, font cartridges, etc. If an accessory control device could be mated to this connector, the functionality of the electronic device could then be improved, added to, or changed. Unfortunately, an examination of data transfer buses used for such connectors reveals that many of them use read-only signal lines, as viewed by an internal processor, in which case an accelerator or control device cannot use the connector to receive data from the processor within the electronic device.

Furthermore, for typical consumer electronic equipment such as the previously mentioned printers, facsimile machines, musical instruments, cooking equipment, cameras, automobiles, etc., absolutely no consideration is commonly given to providing for such improvements or upgrades in functionality, and no such hardware option exists. A good example of this lack of planning is seen in relation to page printers which are manufactured for use with computers.

In recent years, page printers, such as laser printers, have enjoyed widespread distribution and are rapidly becoming the common, leading, device for high-speed data and image output from computers. The resolution of laser printers typically ranges from 240 to 800 dots per inch (dpi), and printing speed is on the order of several pages a minute. Such printers principally employ an electrophotographic printer element, such as a xerography unit, which uses a photo-sensitive drum as part of a printing engine. After the printer has received and stored one page of image data (or blank area as desired), image processing steps; that is, electrostatic charge, exposure, toner application, and image transfer; take place continuously in synchronization with rotation of the photo-sensitive drum.

Therefore, page printer memory capacity for image development or processing must be sufficient to store at least one page of image data at a time. If no image data compression is employed, this capacity is determined by the printer resolution being used and the page size to be accommodated. For example, if a resolution of 300 dpi and a page size of 8 by 10 inches are used, the printer may handle as much as 8×300×10×300 or 7,200,000 dots or pixels, of image data. If the print or image input data is in the form of a bit mapped image, the printer only needs to accept and sequentially store this data before image processing. The processing speed for this type of operation generally depends on, and is limited by, the data transfer rate. Since parallel data transfer, such as that complying with the Centronics specification standard, occurs at a considerably high rate, it is unlikely that data transfer of bit mapped images will occur at a slower rate than the printing capability of the xerographic unit.

However, where printers receive and process other types of data, such as character codes, line positions, and line and character pitch, and then develop this data into a page image; or receive programs that describe the page using a page description language (PDL) and then interpret and process this information to generate a page image, it is necessary to perform arithmetic processing and generation of bit mapped images from the input print data. In comparison to directly transferring a simple bit mapped image, the extra image processing overhead incurred by such processing imposes a major reduction in overall printing speed. That is, the image output speed of the printer is now substantially determined, or limited, by the speed with which the processor performs image processing and memory accesses which combine to create much slower transfer rates than the xerography unit is capable of handling, resulting in a major reduction in printing capability.

For example, in a page printer capable of printing ten pages a minute, no more than six seconds are allowed for processing image data for each page to be printed to print at full speed. Processing 0.9 megabytes of stored data into an image within this time span only provides for 6.67 microseconds of processing time per byte of data (6 seconds divided by 0.9 megabytes). Such short processing periods represent a processing capacity that may or may not be realizable with currently available high-speed RISC type processors. In contrast to this processing limitation, the electrostatic image and photosensitive elements of a laser printer are often capable of easily printing ten or more pages per minute. As a result, under the current state of the art, the processing capability of a printer image data control unit represents a major bottleneck in improving overall printing speed.

In many cases image developing throughput is always less than the xerography unit throughput. Even if a processor that can provide image data developing throughput is obtained as microprocessor technology advances, it is generally impossible to improve printer functionality retro-actively. As discussed, while some page printers can have their functionality improved by installing a font or program cartridge in an expansion slot, the read-only nature of the cartridge connector data bus prevents data from being transferred to the cartridge and processed.

In addition, an examination of the method used to communicate data between a typical printer and computer reveals that even if the computer is equipped with a high speed interface such as an Ethernet or other type of network circuit board, data can only be transferred to the printer at low speeds, due to the configuration of the typical standard Centronics printer interface used. This results in a throughput bottleneck in the system.

What is needed is a new method and apparatus for realizing altered electronic device functionality and increased image processing throughput.

SUMMARY OF THE INVENTION

In order to solve the above, and other, problems encountered in the art, one purpose of the present invention is to provide an add-in accessory control device for altering basic electronic device functionality that has increased data throughput.

An advantage of the cartridge is that image processing and data throughput occur at higher speeds.

An additional purpose of the invention is to offer a method of controlling data transfer to the electronic device that allows high speed data input from external sources.

Another advantage of the invention is that a cost effective minimum complexity solution is provided for high speed data transfer and high quality image production from existing equipment.

These and other purposes, objects, and advantages are realized in an accessory control device for use in an electronic apparatus which has a first processor capable of performing certain predefined logical operations, such as image data development and printing control, in accordance with processing steps stored in a first memory connected thereto. The accessory device receives data directly from external sources using a communication interface or device, and has a second processor that performs processing on received data independent from the first processor.

The accessory control device is coupled to a connector in the electronic apparatus that has a signal line capable of exchanging data with the first processor, and transfers the results of data processing to the electronic apparatus for further use. In general, the accessory control device receives data directly, which would otherwise require processing by an electronic device, and processes it according to internally stored or retrieved programs, thus making it possible to improve, add to, or change the functionality of the target electronic apparatus through alternative data processing.

An information processing device is formed by mounting the accessory control device in an electronic device, storing routines for execution by the second processor, using received data, in the second memory, and providing data output elements that transfer the results of the second processor data processing to the electronic device. Therefore, the resulting information processing device is able to achieve a level of data processing different from that of the electronic device alone. In addition, data that cannot be normally received or processed by the electronic device can now be received and processed.

Assuming that the received data contains data attributes that cannot be readily or effectively processed by the first processor of the electronic device, procedures can be stored in the second memory for use in processing such data. For example, where the electronic device is a printer which cannot handle a program or data described by a page description language, a page description language interpreter for such use can be provided in the second memory of the accessory control device which accommodates such data processing.

In further aspects of the invention, a data output controller is used to output data processed by the second processor to the electronic device and a processing information output element or circuit is used to output information regarding certain data processing status information to the electronic device while the second processor is processing data in the accessory control device. Typical information regarding data processing which might be output is, the amount and identification of the data being processed, or remaining processing time, whereby the electronic device can receive certain desired information regarding the processing taking place in the accessory control device. In addition, the electronic or accessory control devices may be provided with a console panel that displays the prescribed information, so as to make it possible to display the processing status information so that a user can easily obtain information regarding accessory control device processing. In the alternative, it is also possible to configure the accessory control and electronic device interface so that information regarding the electronic device can be output to the accessory control device. Such information could include control information from a console panel in the electronic device or error signals for the electronic device, which are used to alter the operation or data transfer of the accessory control device.

If the electronic device connector signal line includes at least some of the address signal lines for the first processor, and a data bus connected to the connector is a read-only type, as seen from the first processor point of view, it is difficult to have the electronic device send data to the accessory control device. However, the electronic device can be configured to reflect or encode the desired output information or data within address values for addresses which are provided to the accessory device using the read-only data bus in read processing for those addresses. The accessory control device is constructed with elements that extract the information incorporated in those addresses as received, in order to receive data using a read-only bus.

The accessory control device can use RAM to store programs or data, a program development element that develops received data in RAM as a program, and a control transfer element that transfers control of the second processor to a developed program, whereby a program received from an external source can be executed in the accessory control device. The program can also be structured as debugging program, a program for correcting data processing routines stored in the second memory, a program for effecting a more functional routine than previously stored routines, etc.

The accessory control device can be equipped with a connector capable receiving additional or expansion type memory such as an IC type memory card, which can also utilize a ROM to store procedures or programs for use in data processing or a RAM capable of storing data. In addition, a control circuit can be provided in the electronic device that transfers control of the first processor to programs or processing routines stored in the memory used by the accessory control device according to a prescribed timing.

As method of processing information, the accessory control device can be mounted in the form of a cartridge in a connector of the electronic device, receives data, such as print data, directly from external sources and performs processing on the data different from the first processor using its second processor, and routines stored in the second memory and the results output to the electronic device. The routines being executed can include for example, a page description language interpreter which is used to develop image data, and provide the resulting image data to the electronic device which performs printing.

The information processing device, accessory control device, and information processing method described above can each be applied to various electronic apparatus for providing altered data processing capabilities. For example, the electronic device can be a printer that generates a print image from data received from another source and performs printing, and the accessory control device is configured as a cartridge mounted in a connector of the printer, and the second memory stores a page description language interpreter for use interpreting print data received through the communication interface and developing image data. In this case, a processing function can be easily added to a printer that cannot process a page description language, or the processing capability of an existing page description language can be easily changed or improved.

The structure of the present invention is applicable to electronic apparatus other than printers, and can expand features or operating characteristics of many such devices. For example, when applied to facsimile machines, the accessory control device can be configured to accommodate type G4 compatible facsimile communications. This makes it possible to provide G4 compatibility to a facsimile machine that can only process up to type G3. Similarly, when applied to musical instruments, the accessory control device can be provided with a MIDI-compatible interface to facilitate the addition of MIDI functions to musical instruments.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 illustrates a block diagram of one embodiment of a printer using an accessory control device constructed according to the principles of the present invention;

FIG. 2 illustrates a block diagram of an electronic control device for us in the printer of FIG. 1;

FIG. 3 illustrates an exterior perspective view of an accessory control device in the form of an add-on cartridge as attached to a printer;

FIG. 4 illustrates a block diagram of the internal configuration of the cartridge of FIG. 3;

FIG. 5 illustrates a flowchart of processing steps used by the cartridge of FIG. 4;

FIG. 6 illustrates a block diagram of an alternative high speed communication configuration for the external connection used in the apparatus of FIG. 4;

FIG. 7 illustrates an additional high speed communication configuration for use in the apparatus of FIG. 4;

FIG. 8 illustrates a block diagram of a display circuit for use in the apparatus of FIG. 4;

FIG. 9 illustrates a perspective view of a laser printer using a second embodiment of the invention;

FIG. 10 illustrates a perspective view of another laser printer for use with the second embodiment;

FIG. 11 illustrates a block diagram of an overall configuration for the printer of FIG. 9;

FIG. 12 illustrates a perspective view of an add-on electronic cartridge useful for implementing the embodiment of FIG. 9;

FIG. 13 illustrates an exploded perspective view of the cartridge of FIG. 12;

FIG. 14 illustrates a perspective view of elements on a circuit board used in the cartridge of FIG. 13;

FIG. 15 illustrates signal assignments for a connector CN11 used in the printer of FIG. 11;

FIG. 16 illustrates an address map for the cartridge of FIG. 12 from the point of view of an electronic control device in the printer;

FIG. 17 illustrates an address map for the cartridge of FIG. 12 from the point of view of a microprocessor in the cartridge;

FIG. 18 illustrates a block diagram of a circuit for implementing the invention in the cartridge of FIG. 12;

FIG. 19 illustrates a block diagram of a communication control section for the circuit of FIG. 18;

FIGS. 20A, 20B, and 20C illustrate circuit diagrams of exemplary interrupt request registers useful for implementing the circuit of FIG. 18;

FIG. 21 illustrates a circuit diagram for an exemplary polling command register useful for implementing the circuit of FIG. 18;

FIG. 22 illustrates typical contents of status registers used in implementing the circuit of FIG. 18;

FIG. 23 illustrates an exemplary circuit configuration for a read control circuit used in implementing the circuit of FIG. 18;

FIG. 24 illustrates a flowchart of steps performed by an electronic control device for realizing data transfer using a read control circuit;

FIG. 25 illustrates a flowchart of steps performed by cartridge circuitry for realizing data transfer using a read control circuit;

FIG. 26 illustrates a flowchart of processing steps performed by the electronic control device of FIG. 11 for realizing data transfer using a FIFO control circuit;

FIG. 27 illustrates a flow chart of processing steps performed by the cartridge for realizing transfer using a FIFO control circuit;

FIG. 28 illustrates an exemplary double-bank control circuit;

FIG. 29 illustrates a flowchart of processing steps used for beginning data transfer using the double-bank control circuit of FIG. 28;

FIG. 30 illustrates a flowchart of response processing steps executed in the electronic control device of FIG. 11;

FIG. 31 illustrates a flowchart of processing steps executed by the electronic control device of FIG. 11 for realizing data transfer using the double-bank control circuit of FIG. 28;

FIG. 32 illustrates a flowchart of processing steps executed in the cartridge for realizing data transfer using the double-bank control circuit of FIG. 28;

FIG. 33 illustrates a timing chart for the control of the laser engine of FIG. 11 during image data printing; and FIG. 34 illustrates a flowchart of a routine used for changing settings stored in an EEPROM.

DESCRIPTION OF THE PREFERRED EMBODIMENTS

Exemplary embodiments of the present invention are disclosed below in relation to: the physical structure and components used; alternative embodiments; overall printer and add-on cartridge combined structure; method of data communication; and certain other aspects of applications of the invention.

The invention is disclosed and embodiments are described, along with related background and implementation material, in relation to the following general outline.

I First Embodiment
  A. Overall Configuration
  B. Configuration and Operation of Electronic Control Device
  C. Cartridge Configuration
  D. Transfer and Development of Data
  E. Electronic Control Device Operation
  F. Effectiveness of First Embodiment
  G. First Exemplary Modification of First Embodiment
  H. Second Exemplary Modification of First Embodiment
II Second Embodiment
  A. Overall Configuration
  B. Physical Structure
  C. Cartridge Address Space
  D. Internal Cartridge and Communication Controller Configuration
  E. Data Transfer Controller
  F. Registers
  G. Read Control Circuit Configuration and Operation
  H. FIFO Control Circuit Configuration and Operation
  I. Double-Bank Control Circuit Configuration and Operation
  J. Image Data Printing
  K. Effectiveness of Second Embodiment
  L. Alternative Embodiments Each section teaches certain aspects of the invention and its useful application to the laser printer or page-type printer art. In addition, the description is followed by an Appendix A which lists the numerals used in the figures along with corresponding element descriptions.

I First Embodiment

A. Overall Configuration

A first embodiment of the invention is presented in FIG. 1 and is one in which the invention is applied to a laser or page-type printer. FIG. 1 illustrates a generalized block diagram of a main printer unit 1 with an add-on or add-in cartridge 3 installed. As shown in FIG. 1, main printer unit I has a connector 6 which is used to connect to a computer 5, and for normally receiving data used for printing images. However, as part of the invention, cartridge 3 also has a connector 7 which is configured for connection to a high speed communications source, such as a local area network (LAN), through a cable 8. The local area network can be configured using one of a variety of known protocols and designs such as, but not limited to, Ethernet (a trademark of Xerox), etc. As shown in FIG. 1, a workstation 9 is also connected to the local area network, and cartridge 3 can receive data directly from workstation 9, or other systems connected to the network. The process of communicating between cartridge 3 and workstation 9 is discussed further below.

Main printer unit 1 is a so-called "page printer" which uses a xerographic method of output image formation, to create an image on a medium such as paper P, based on received print data. Housed within main printer 1 is an electronic control device 10 which receives input print data and develops an output image, an address bus for electronic control device 10, a connector 11 coupled between an add-on cartridge 3 and control device 10, semiconductor laser device 12, which is connected to and driven by electronic control device 10, and a xerography unit 15. Xerography unit 15 uses a photosensitive drum 14, a paper cassette 17 to house paper P, a media transport mechanism 19 to move paper P into contact with the outer circumference of photosensitive drum 14, a thermal fixing roller 21 to heat toner transferred to paper P in order to fix an image, and an output tray 23 to receive ejected paper P containing a printed image.

A charging unit 25 is used to charge the surface of photosensitive drum 14 in xerography unit 15, which charge is then dissipated in various areas by a laser beam from semiconductor laser device 12. That is, control device 10 provides signals to laser device 12 in synchronization with rotation of photosensitive drum 14 which generates a laser beam pattern that alters the charge on the surface of drum 14 in accordance with the print or image data. Areas corresponding to an image to be printed are irradiated with the laser beam to form a latent image.

A toner unit 27, which is itself typically charged, contains an electrically charged toner which is applied to the drum in those areas or regions where the surface charge has been dissipated. Areas irradiated by the laser beam loose their charge so that toner or toner material having the same electrical charge polarity as the original charged surface of photosensitive drum 14 is only transferred to those areas on the drum where the charge has been dissipated. In other words, the charged toner is deposited where it is not repelled by a residual surface charge. A toner removal unit 29, then removes toner remaining on photosensitive drum 14 after toner transfer to paper P.

One sheet of paper P is pulled from paper cassette 17 in synchronization with the rotation of photosensitive drum 14 and transported to photosensitive drum 14 by transport mechanism 19. Since paper P is transported between photosensitive drum 14 and a transfer roller 30, a majority of the toner on photosensitive drum 14 is transferred to paper P. Paper P is then transported to a heat fixing roller 21 with the toner on its surface, and the toner is melted by heat and fixed or fused to the surface of paper P. This is a brief explanation of the printing process employed by main printer unit 1, but the invention is not limited to laser printers and can also be applied to printers that use LEDs for exposure of photosensitive drum 14, or those that use an ink jet or other method for forming images on an output medium during printing.

B. Configuration and Operation of Electronic Control Device

One configuration for electronic control device 10 as built into printer 1, is discussed next in relation to FIG. 2. As shown in FIG. 2, electronic control device 10 is configured as an arithmetic logic operation circuit centered around CPU 31, which is a commonly used processor that performs all system processing, and is connected to a series of other elements through an address bus 32, data bus 34, and control signal bus 36. Such elements include an address decoder 41, a ROM 43, a dynamic RAM (DRAM) 45, a memory control unit (MCU) 47, an I/O port 49, a laser I/F 51, and a connector 11. Each element is connected to the three busses 32, 34, and 36 in such a way that it can read and write to each bus, but only connector 11 is provided with a bus driver 52 positioned between it and data bus 34. As seen from the CPU point of view, cartridge 3, which is connected to connector 11, is a read-only device.

Address decoder 41 operates to decode address signals generated by CPU 31, and when a certain address is specified, it outputs a select signal to ROM 43, DRAM 45, I/O port 49, and laser UF 51 according to assignments of memory space. ROM 43 contains a data or image production type of processing program, and CPU 31 normally operates according to the program steps or operations stored in ROM 43. DRAM 45 is used to develop the image data into an output image by storing image data until a page is ready for printing. Since it is necessary to store image data for at least one page, DRAM 45 generally has a 2 megabyte capacity in this embodiment.

MCU 47 analyzes control signals provided by CPU 31, and outputs control signals for ROM 43 and DRAM 45, read-write signals for memory and the I/O port, and determines memory element refresh timing for DRAM 45.

MCU 47 is connected to and receives a signal from a refresh timer 53. If MCU 47 determines that the received signal is requesting refreshing during a time interval in which it is possible to carry out refresh, then MCU 47 outputs address values to DRAM 45 which are to be refreshed, using multiplexer 55. Print data is received from external computer 5 through I/O port 49 which also serves as an interface for the printer motor, etc., not shown, for xerography unit 15. A laser controller interface I/F 51 is connected to cartridge 3, and used to drive semiconductor laser device 12. Electronic control device 10 is also provided with a timer 57 which is connected to connector 11 and CPU 31.

The basic function of main printer unit 1, as equipped with electronic control device 10, is to develop print data (data already developed into a bit mapped image) that is received from external computer 5 through I/O port 49 and stored in internal DRAM 45, and control xerography unit 18. That means that printer unit 1 drives semiconductor laser 12 when enough data for one printed page has been prepared so that the image data are printed substantially as is. In addition to such basic functions, main printer unit 1 is capable of being expanded to perform higher level printing operations using a cartridge connected to connector 11. In this situation, a cartridge 8 having a built-in processor as described below can be connected to the printer, in addition to existing cartridges such as font cartridges and those containing programs for interpreting a page description language.

C. Cartridge Configuration

An external view of cartridge 3 associated with a printer is shown in FIG. 3. As shown in FIG. 8, a cartridge 8 is installed in connector fitting 61 of main printer unit 1. As also seen in FIG. 8, in this particular embodiment, that portion of cartridge 8 that extends or protrudes out of from the housing of main printer unit 1 has a generally trapezoidal-shaped longitudinal section, in contrast to the rectangular solid shape of the end inserted within connector fitting 61. When cartridge 3 is inserted within connector fitting 61, the connector on the end of the cartridge 3 engages with and is electrically connected to connector 11. In this configuration, the raised portion of cartridge 3 moves to a position that brings it nearly in contact with the surface of the printer housing. The front part of cartridge 3 that protrudes from the printer housing is shown having inclined top surface to prevent objects from being inadvertently placed on it, so as to protect the cartridge from damage or dislodgment during use.

A discussion of the internal configuration of cartridge 3 is presented next in relation to the block diagram of FIG. 4. In FIG. 4, cartridge 3 is shown employing its own CPU 71, which is a different and independent processor from CPU 31 which is used within the electronic control device 10. CPU 71 is typically configured using a RISC type architecture, which is suited to the processing demands of page description languages, although not necessary. An address bus CAD and a control signal bus CCT are both connected to CPU 71 and to a ROM 73 which contains a page description language processing program, a RAM 75 where data are stored, a gate array 77 which performs switching of the address bus, etc., a serial I/O port (SIO) 78 which controls communications, and a latch 79 for latching data. The output of latch 79 is connected to a data input side "D" of a one-way first buffer 87. SIO 78 is connected to a Local Area Network or LAN connector through a network receiver 82 and a network driver 84. Using control data provided by control signal lines connected directly to connector 7, SIO 78 receives data for printing from other devices, e.g., workstation 9, which are also connected to the LAN.

When cartridge 3 is installed or inserted into connector 11 of main printer unit 1, an address bus PAD, a read-only data bus PD, an interrupt signal line IA and a timer 57 signal line TB of electronic control device 10 are each connected to connector 90 of cartridge 3. Address bus PAD is also connected to address decoder 80 and a ROM 86. Data bus PD is connected to the data output "O" side of two one-way buffers 87 and 88. The outputs of buffers 87 and 88 are each controlled by a control signal received from address decoder 80. That is, address decoder 80 analyzes addresses provided by CPU 31 of electronic control device 10, and determines if the address is intended to access ROM 86, in which case it outputs a control signal to an enable terminal "OE" of buffer 88 to enable its output. If, on the other hand, decoder 80 determines that the address is intended for accessing latch 79, then it supplies a control signal to an enable terminal of buffer 87 to enable its output. Therefore, access by CPU 31 causes either the contents of ROM 86 or data being held in latch 79 to be output on data bus PD.

Since the contents of ROM 86 can be read out directly by CPU 31 in this manner, cartridge 3 can shift control of CPU 31 residing in electronic control device 10 to the program stored in ROM 86. Moreover, by executing that stored program, the data prepared by CPU 71 and stored in RAM 75 within cartridge 3, can be read directly by CPU 31. This process is explained further below.

D. Transfer and Development of Data

When cartridge 3 is inserted in main printer unit 1 and power is applied or turned on, CPU 31 performs prescribed initialization processing and then reads data from a previously determined specific address location. This address is the address space assigned to the slot or receptacle used for the plug-in cartridge. When a cartridge is inserted, data to be prepared for printing are read according to the type of cartridge, either font or program. If cartridge 3 is a program type cartridge, then CPU 31 recognizes this configuration and transfers control to ROM 86 within cartridge 3. More specifically, CPU 31 jumps to a specific address in the address space assigned to ROM 86, and executes a program stored below that address.

CPU 71 located within cartridge 3, however, continually receives data from the local area network according to interrupt handlers based on requests from SIO 78, and additionally performs the processing steps shown in FIG. 5 after powering on. The received data is sequentially stored in a prescribed area within RAM 75, which is repeated until an indication is received that data transfer is complete. Here, the data received by cartridge 3 from a workstation 9, etc., over the local area network is a program (hereafter called a script) which is described by a page description language, e.g., PostScript (trademark of Adobe Systems). The completion of data transfer is defined by commands specific to the page description language, such as the command SHOW PAGE in PostScript.

When CPU 71 detects the completion of data transfer, it initiates a processing routine shown in FIG. 5, in which the prescribed data is first stored in latch 79, and the interrupt signal IA is also output to notify electronic control device 10 that data is to be transferred in a step S91. Since CPU 31 is executing the program stored in ROM 86, an interrupt handler program corresponding to interrupt signal IA is supplied to it as well as cartridge 3. In this interruption processing, the address corresponding to latch 79 is accessed and data prepared by CPU 71 is read. By analyzing this data, CPU 31 knows whether or not cartridge 3 is currently developing data generated by the page description language.

CPU 71 interprets the script stored in RAM 75 according to the program (a PDL interpreter) for interpreting the page description language stored in ROM 73, and generates the image in a step S92. The developed image is then stored in a prescribed area within RAM 75. When image development is completed, CPU 71 sets or loads the prescribed data in latch 79 and also outputs interrupt signal IA in a step S93, so as to notify CPU 31 of image development completion. Following this notification, transfer of the image to electronic control device 10 is commenced and continues until all of the image data are transferred in steps S94 and S95. The transfer of image data is performed sequentially by setting data in latch 79 and outputting interrupt signal IA.

Upon completing the transfer of all of the image data, CPU 71 sets data in the latch 79 again to indicate that the transfer is complete, and outputs interrupt signal IA in a step S96, after which it terminates this routine and looks for the next routine to be processed.

E. Electronic Control Device Operation

For electronic control device 10 to receive the results of the above processing from cartridge 3, it accesses a prescribed address and receives one byte of the resulting image data held in latch 79 each time interrupt signal IA is received, and stores this data sequentially in a prescribed area within DRAM 45. When electronic control device 10 receives notification that the transfer of all image data from cartridge 3 is complete, it means that the image data developed in cartridge 3 are now all stored in DRAM 45. Here, electronic control device 10 executes commands or processing steps that result in the xerography unit 15 being driven according to the image data and the image is printed on one sheet of paper P. Since in this condition CPU 31 is executing a program stored in ROM 86, main printer unit 1 cannot perform normal processing and receive data from computer 5 through connector 6 and print it, at this time.

F. Effectiveness of First Embodiment

Using this embodiment of printer 1 and cartridge 3 as described above, and installing cartridge 3 in connector 11 of electronic control device 10, allows cartridge 3 to receive a script described by a page description language from other equipment connected to the local area network, such as workstation 9 in this case. Printer 1, using cartridge 3 prints a developed image from this script on paper P. Therefore, several advantageous effects are obtained.

First, since a CPU within the cartridge is used to interpret data received over a LAN and develop it into an image, throughput for PDL processing is greatly improved, as compared to when the cartridge simply supplies a PDL processing program. A higher level page description language can also be supplied by the cartridge in this configuration. Second, cartridge 3 has its own communication capabilities independent of the printer, which can accommodate a communication protocol not supplied in the main printer. In this connection, the printer can be connected to an Ethernet port, which is otherwise not provided for in the original printer design. Third, since cartridge 3 receives print data directly from an outside source such as a workstation, there is no need to transfer the data to the cartridge from the main printer. This facilitates the use of cartridge in an existing printer whose design did not contemplate the use of a cartridge equipped with an on-board processor.

In addition to the ability to accommodate new communication protocols, a more effective utilization of the printer can be realized.

Normally, as the functionality of computers improves, printers become a bottleneck, and in many cases the entire printer itself must be replaced when computer functionality is upgraded. However, the present invention provides an extremely cost effective method for improving printer performance in addition to adding a high-speed, increased-feature processor. This surmounts a larger problem created by computer advancement and extends the useful life of a printer.

G. First Exemplary Modification of First Embodiment

In the embodiment described above, communication with a local area network is normally performed using SIO 78. CPU 71 managed communication, however, may not be able to keep up with the data transfer rates of higher speed data transfer, such as in a high speed local area network or Centronics or other type of parallel transfer protocol. A block diagram of one configuration for a communication section 200 capable of accommodating such higher speed communications or data transfer rates is shown in FIG. 6.

The configuration shown in FIG. 6 uses a Centronics type interface, and input signals connected to or transferred by a connector 210 include 8-bit wide data having bits D1 through D8, a strobe signal STB, and output signals including a busy signal BUSY and error signals Err and PE.

Communication section 200 uses latches 212 to hold data bits D1 to DS, a FIFO memory 215 to store and provide the data, in a first-in-first-out order, and a 16-bit tristate buffer 217 which receives an 8-bit output of FIFO memory 215 as a lower 8 bits of the input. A gate array 220 is used to provide a latch signal LA to latches 212, read and write signals FR and FW, respectively, to FIFO memory 215, and a control signal RB to tristate buffer 217 to effect operation of communications section 200. Gate array 220 also provides signal BUSY, etc., to connector 210. Signal FF, which indicates that FIFO memory 215 is full, is output from FIFO memory 215 to gate array 220, and the signal FE, which indicates that FIFO memory 215 is empty is output to an upper prescribed bit of tristate buffer 217. The read side of the FIFO memory 215 is assigned a prescribed address or series of addresses as seen from the point of view of CPU 71. By outputting a prescribed address signal on address bus PAD, CPU 71 not only reads data, it also enables the output of tristate buffer 217 so that it can read both the data and the status of signal FE on data bus CD.

Operation of communication section 200 is explained further below. On the input side for data, busy signal BUSY output from connector 7 is monitored. When this busy signal is inactive, data to be transferred are output, and strobe signal STB becomes active according to established timing. When strobe signal STB is active, gate array 220 makes latch signal LA active, whereby data D1 to D8 are held in latch 212. A prescribed time period after latch signal LA becomes active, FIFO write signal FW is also made active and data are written to FIFO memory 215. Upon completion of this data transfer, gate array 220 makes the signal BUSY inactive when the FIFO memory 215 becomes full, i.e., except when signal FF is active. In this manner, data are sequentially transferred from external sources or equipment.

CPU 71, on the other hand, accesses the address assigned to FIFO memory 215 according to prescribed timing. Gate array 220 makes the FIFO read signal FR and buffer control signal RB active when it receives the address signal. As a result, if there is any data remaining in FIFO memory 215, not only are they read out, but the output of tristate buffer 217 is enabled. At this time, CPU 71 can read one word of data on data bus CD, the lower eight bits of which are data residing in FIFO memory 215 and an upper prescribed bit represents the signal FE. Therefore, the presence of data remaining in FIFO memory 215 can be determined and stored in RAM 75. Error signals Err, PE, etc., as output by gate array 220, are also assigned prescribed addresses as seen by CPU 71, and can also be controlled as required.

Using communication section 200, as described, data transferred from external equipment can be received at high speed. Moreover, since FIFO memory 215 is used for data transfer, it can be completely isolated from data transfer between external equipment and CPU 71; e.g., complicated processing can be realized such as receiving a script for a subsequent image while CPU 71 is developing current image data. If FIFO memory 215 operates sufficiently fast, latches 212 can even be omitted.

In this example, the communication section was realized using hard-wired logic, but as shown in FIG. 7, it can also be easily realized using a single-chip microcomputer 310 which employs built-in ROM, RAM, etc. In this configuration, address signal PAD is analyzed by an address decoder 312, and one of its outputs is connected to an enable terminal of a tristate buffer 315 while the other outputs are connected to each input terminal of a set of three R/S type flip-flops 317, 318, and 319. R/S flip-flops 317 to 319 are used to control signal BUSY which indicates a busy state, and two error signals Err and PE, respectively.

In this configuration, single-chip microprocessor 310 essentially combines the functions of gate array 220, latch 212, and FIFO memory 215 of communication section 200 into a more compact structure. Microprocessor 310 takes the input port signal from connector 330 and outputs data to data bus CD using tristate buffer 315 according to the values specified by address signal PAD and control signal CCT as supplied by CPU 71. Signal FE, which indicates valid communication data, is output as a prescribed upper bit position of the data output to data bus CD. Indicating that the lower eight bits are valid at that time, is the same as shown for the configuration in FIG. 6. A configuration is also possible in which two bytes of data are combined inside of single-chip microprocessor 310 and output as a single data word.

H. Second Exemplary Modification of First Embodiment

Another modification of the first embodiment is explained next. In this example, a structure for displaying information, or a display section, is also included in cartridge 3, in addition to the structures shown in FIGS. 1 to 4. An exemplary display section 400 is shown in FIG. 8 which comprises a dual-port memory 410, a display controller 420, and a liquid crystal display 430. The dual-port memory 410 replaces part or all of RAM 75 shown in FIG. 6, and is used to store image data. CPU 71 stores image data interpreted and generated according to the page description language interpreter within a prescribed area of dual port memory 410 by outputting the necessary signals on address bus CAD, data bus CD, and control signal bus CCT.

Display controller 420 outputs address signal IA for reading data sequentially from dual port memory 410, inputs serial data ID output from dual-port memory 410, converts it to a video signal VD, and outputs it to liquid crystal display 430 together with a synchronization signal SYF. In the alternative, an EL panel, a plasma display, a compact CRT, or other type of display device can be used in place of liquid crystal display 430.

In this configuration, the image data generated by CPU 71 can be confirmed or otherwise monitored before it is printed by main printer unit 1. This is accomplished by providing liquid crystal display 430 on cartridge 3 where it can be easily viewed Therefore, the image to be printed can be confirmed before being printed on paper P, and by making it possible to stop printing at that point, printing of an otherwise useless image, due to an error in the PDL processing, can be prevented. A compact thermal transfer printer, etc., can also be used as a display device. In this case, the image can be printed out at high speed and low density for previewing before printing in a final form on main printer unit 1.

Since display devices for video images are widely used throughout the world, a configuration should be employed that employs a video connector for outputting a video signal to other equipment. In this latter situation, the display on cartridge 3 can be omitted if desired. Furthermore, configuring the cartridge to be able to output image data read out from memory 410, by the display controller 420, to an external computer can also be considered. This would allow data transfer either directly or by using a communication line for display on another display device.

II SECOND EMBODIMENT

A. Overall Configuration

An explanation of a second embodiment of the invention is provided next which employs a cartridge 503 as an accessory control device in a laser printer 500, as a target electronic device. Perspective views of first and second types of main printers 500a and 500b are illustrated in FIGS. 9 and 10, respectively, each having a cartridge 503 installed. For ease of explanation below, a main printer unit is simply referred to as a laser printer 500.

A configuration is used in which cartridge 503 has a connector 508 and print data are input directly into cartridge 503 from a workstation 507 or similar external source. Laser printer 500 uses a xerography unit, as in the first embodiment previously described, and as shown in FIG. 11, the photosensitive drum section functions independently as a laser engine 505. Electronic control device or circuit 501, exercises control over operation of the entire laser printer, and can perform or execute printing only by sending commands to laser engine 505 through connector CN10, and then transferring image data to a prescribed buffer.

As shown in FIG. 11, electronic control device 501 is equipped with a commonly known microprocessor or central processing unit (CPU) 510, here chosen to be a MC68000 type processor which is manufactured by Motorola. Control circuit 501 also employs a ROM 511 to store programs for execution by the printer CPU; a RAM 512 to store post development print and image data; a data input/output port 514 to receive print data from external sources or equipment directly which are not equipped with the cartridge 503; a line buffer 515 attached to a bus line 516 for transferring data exchanged with cartridge 503; a register 517 for exchanging command and status data with laser engine 505; a console panel interface FF 519 for providing interface control between laser printer 500 and a console panel 518; and a double buffer circuit 520 for retaining image data to be transferred to laser engine 505. The bus line and control line configurations are otherwise substantially the same as in the first embodiment and are simplified in this figure for purposes of clarity in illustration.

Console panel 518 has a set of six control switches or keys 518a used for certain printer operator input and a small display 518b, typically of the liquid crystal type capable of displaying 16 characters (8 characters by 2 lines), for information output or feedback.

As also seen in FIG. 11, an exemplary double buffer circuit 520 is used which makes use of two RAMs, RAM 520A and RAM 520B, which each typically accommodate up to eight lines of print data for laser engine 505, which corresponds to 4 kilobytes of memory capacity. A memory write controller 520C is used to alternately write image data to one of these RAMs from CPU 510. A memory read controller or control section 520D alternately reads data from each of the two RAMs, 520A and 520B, and transfers that data to laser engine 505 where it is converted into video signals in synchronization with the rotation of the photosensitive drum in order to print data. Two RAMs 520A and 520B are provided, and reading and writing of data takes place alternately, because CPU 510 and laser engine 505 are configured to access memory, these RAMs, independently.

After CPU 510 writes data to one of the RAMs, it sets a flag in a specific bit position of register 517 to show the presence of new data. Laser engine 505 then checks this flag and responds by reading image data stored in the RAM from the appropriate addresses to which it was written. During the reading process, the laser engine sets another flag bit in register 517 to inform CPU 510 which RAM is being read to prevent access before the reading operation is terminated. Since only one RAM is being accessed by laser engine 505 at this time, CPU 510 writes the next eight lines of image data to the other RAM during this period. After the process of reading data from one RAM is complete, laser engine 505 resets the appropriate flag bit and proceeds to read data from the other RAM. The speed at which CPU 510 writes data is faster than the speed at which laser engine 505 reads data, that is, the print execution speed. Therefore, a memory access conflict or interference between the two is generally automatically avoided and the transfer of one page of image data takes place simply and reliably.

As stated, cartridge 503 is connected to control device 501 through connector CN11. A line buffer 515, which has a bus driver (not illustrated) mounted somewhere along data bus 516, acts as a buffer that transfers data from connector CN11 to CPU 510.

The relationship between the laser printer 500 and the cartridge 503 mounted in it is the same as in the first embodiment, in that, when power is turned on or applied to printer 500, electronic control unit or device 501 determines if a cartridge 503 is installed in connector CN11. If a cartridge is detected, after being reset or performing initialization etc., control device 501 executes a jump to a pre-specified address of a ROM provided in cartridge 503 (discussed later). Subsequent to this jump, control device 501 sequentially executes processing steps provided by cartridge 503. Cartridge 503 interprets the program generated by the PDL and output to laser printer 500 from work station 507, develops it into image data, and transfers it to control device 501 so that the appropriate printing occurs using laser engine 505, the same as in the first embodiment.

B. Physical Structure

A perspective view of one embodiment of a printer-cartridge-type of add-on electronic device which is constructed and operating according to a second embodiment of the present invention is illustrated in FIG. 12. An exploded perspective view of this cartridge is then illustrated in FIG. 13. The cartridge (503) illustrated in FIG. 12 is designed for insertion into an expansion slot of the type commonly found on many laser printers for adding font capabilities. However, as discussed further below and in the co-pending patent applications listed above, the inventive cartridge is also equipped with a connector 508 on an opposite side from the one inserted in the printer opening, and is able to receive print data directly from workstation 507 to which it is connected, process and develop the received data into image data, and provide the results to the printer for producing an output image.

In FIG. 13, a cartridge 503 is shown having a multi-layer printed circuit board 550, called printed circuit board below, mounted inside of or sandwiched between a generally U-shaped upper casing, shell, or housing 100 which has a recessed edge and a mating, plate-like, lower casing, shell, or housing 120. A cap or end cover composed of a lower cap 140 and an upper cap 150, is mounted on one side, or end, of the cartridge adjacent to a connector end of printed circuit board 550. A circuit element, component, or device, such as a microprocessor 601, is shown installed on printed circuit board 550. The cartridge end where caps 140 and 150 are located is referred to as the front of the cartridge and the opposite end of the cartridge, where the microprocessor 601 is positioned, is referred to as the rear of the cartridge.

Upper case 100, lower cap 140, and upper cap 150 are typically made from a lightweight, easily manipulated material such as , but not limited to, ABS resin. Manufacturing the cartridge casings from non-metallic material provides a low cost advantage for providing a less expensive case, and making it lighter in weight and easier to transport or carry. Lower case 120 is typically manufactured from a lightweight metallic material such as aluminum. Aluminum is preferred because it has a high thermal conductance rate and is very effective at conducting heat to the outside of the cartridge.

A conductive layer is formed on the inside surface of upper case 100, which together with lower case 120 constitutes a frame ground. An exemplary conductive or metallic material for the conductive layer on upper case 100 is electrodeless copper-nickel plating. In the alternative, the conductive layer can also be formed by using vacuum deposition of a conductive coating material, such as aluminum, or by applying a conductive paint or other liquid based coating material containing metal or conductive material. Alternatively, upper case 100 can be manufactured from a conductive plastic material which does not require a conductive coating.

An insertion plug 551 is formed on a top or bottom surface of the front end of printed circuit board 550, and consists of a series of electrodes or contacts arranged in parallel on surfaces of the board for contacting matching electrical contacts inside the printer cartridge slot. The number of contacts is determined by the corresponding size of a matching connector conventionally provided in the printer. Plug section 551 may also employ orientation slots or guides, if also used in the printer.

In this embodiment, microprocessor 601 and other circuit elements are shown installed toward the rear of printed circuit board 550, or the end opposite insertion plug 551. Microprocessor 601 is typically secured in this location by soldering processor connection pins 601p to contact pads on printed circuit board 550 after insertion through contact/ mounting holes or vias. However, it is contemplated that other mounting techniques may be employed such as surface mounting technology or, where space permits, a socket assembly could be provided. Four springs 104 are secured to outer edges of printed circuit board 550. Two of the springs 104 are mounted near the center of the board and have spring leafs oriented substantially parallel to the direction of insertion for the cartridge. The other two springs are mounted at or near the rear of cartridge 503. Springs 104 are used to electrically connect ground potential conductors, traces, or wiring on printed circuit board 550 and the conductive layer on the inside surface of upper case 100.

Two grounding springs 122 are shown mounted toward the front of lower case 120 for obtaining grounding contact or a ground connection with a frame of the printer or other receiving electronic apparatus. Springs 122 are typically secured in place by fasteners such as rivets 123. Springs 122 have a shape that approximates a bird with its wings spread. First curved extensions or components 122a, which would correspond to right and left wings, each arch upward from the edges of a main spring body, while a second curved extension 122b, corresponding to a bird's feet, extends downward :from the main spring body in the shape of a semicircular arc. First curved extensions 122a act to electrically connect lower case 120 with ground or fixed potential conductors on printed circuit board 550. Second curved extension or component 122b protrudes through generally rectangular openings 132 formed in lower case 120 and extends outside of cartridge 503. At least one of the two, or more, spring extension 122b makes electrical contact with a conductive frame or grounding member within the printer adjacent to the cartridge, and electrically connects lower case 120 with a grounding element of the printer to provide an adequate ground for cartridge 503.

A wall-shaped mating member 124 is provided around the periphery of lower case 120 which extends upward from plate member 121. Mating member 124 mates with the sides of upper case 100 by fitting inside of the walls of upper case 100 and completes the nearly rectangular case structure.

In order to exert an upward bias to, or bending force on, printed circuit board 550, a resilient or compressible bias element 126 is placed on a bias retainer 128 on an inner surface at the rear of lower case 120. Bias element or piece 126 is typically formed from a cylindrically shaped compressible, elastic, or resilient material such as silicon rubber and presses against printed circuit board 550 in an area directly beneath microprocessor 601 to push this area, and, thus, microprocessor 601 upward. However, those skilled in the art will recognize that other compressible or elastic materials may be used for this bias (pressure) function.

A sheet of heat dissipating material 102, such as a piece of silicon rubber, is disposed between an upper surface of microprocessor 601 and an inner surface of upper case 100 to improve the closeness of fit or thermal contact between these elements and, therefore, the corresponding thermal conductance. Material having good thermal conductance is used for manufacturing heat dissipating material 102, such as silicon rubber but other materials may be used, as long as they effectively conduct heat.

A heat dissipation plate 110, made from thermally conductive material such as aluminum, is also mounted on lower case 120 so that it covers the top of microprocessor 601. As compressible bias element 126 pushes upward on printed circuit board 550, microprocessor 601 is also pushed upward, increasing the surface contact pressure between microprocessor 601 and heat dissipating material 102, and between heat dissipating material 102 and heat dissipation plate 110. As a result, heat generated by microprocessor 601 is efficiently transferred to lower case 120 through heat dissipation plate 110 where it is dissipated to the surrounding environment.

During assembly, two springs 122 are first secured to lower case 120 and silicon rubber bias element 126 is mounted in retainer 128. Various circuit elements are mounted on printed circuit board 550 and the four springs 104 are inserted in their respectively prescribed holes and secured in place, typically by soldering. Printed circuit board 550 is then mounted on lower case 120, and the rear corners (microprocessor 601 side) are secured in place with screws. Heat dissipation plate 110 is also secured to the side of mating member 124 on lower case 120 using fasteners such as screws. Upper case 100 is then mated with lower case 120, and lower cap 140 is inserted. At this time, two projections or mounting tabs 141 extending from the back of lower cap 140 have through-holes that are inserted under corresponding holes in upper case 100. In this configuration, plug 551 extends through a narrow slot 142 formed in lower cap 140. Upper case 100 is secured in place, typically at three locations toward the front end, using screws 160. Finally, cartridge 503 is completed as shown in FIG. 1 by fitting upper cap 150 on upper case 100, which covers the screws 160 and an expansion memory slot 106. At this time, two projections or mounting tabs 141 extending from the back of lower cap 140 have through-holes that are inserted under corresponding holes in upper case 100. In this configuration, plug 551 extends through a narrow slot 142 formed in lower cap 140. Upper case 100 is secured in place, typically at three locations toward the front end, using screws 160. Finally, cartridge 503 is completed as shown in FIG. 12 by fitting upper cap 150 on upper case 100, which covers the screws 160 and an expansion memory slot 106.

One button lock 154 is provided on each side of upper cap 150. Springs 152 are disposed inside of the button locks and push button locks 154 toward an outer edge of the cartridge and upper cap 150. In the outer most position or extension of the button locks, tabs on the button locks interact with or engage retention elements formed on upper case 100 and lock upper cover 150 in place. When button locks 154 are manually pressed inward, the tabs on the button locks are released from the retention elements, releasing cover 150.

An IC card 502 is also shown in FIG. 13 which is used as an expansion memory device and employs multiple dynamic RAM elements. IC card 502 can be installed in cartridge 503 as required or desired to perform various tasks. When inserting IC card 502, upper cap 150 is first removed to gain access to an expansion card insertion slot 106 provided in upper case 100. IC card 502 is inserted through slot 106 into an IC card connector 502a mounted on printed circuit board 550. Whenever upper cap 150 is attached, cartridge 503 again appears as shown in FIG. 12. In this embodiment, an IC card is inserted by simply removing a small removable upper cap 150. Therefore, use of an IC card does not require disassembly of the upper and lower cases, thus simplifying memory expansion. Further, by disposing upper cap 150 at the front of cartridge 503, IC card 502 cannot be inserted or removed once cartridge 503 is inserted in main laser printer unit. This minimizes potential for damage and task interruption, caused by improper removal or insertion of the IC card.

An enlarged perspective view of printed circuit board 550 is shown in FIG. 14. In FIG. 14, microprocessor 601 is shown as being attached toward the rear of an upper surface of printed circuit board 550, and insertion plug 551 is formed at other end. A connector 508 is attached at the rear end and on top of printed circuit board 550 so that it is adjacent to microprocessor 601.

A series of ROMs 606, 607, 608, and 609, are shown positioned near microprocessor 601 generally along the edges or sides of printed circuit board 550. These ROMs are used to store one or more control programs, etc., for execution by microprocessor 601. Four address buffers 617 are also shown mounted adjacent to microprocessor 601 in a square configuration in the center of printed circuit board 550. Two clock oscillators 661 and 665 form the basic timing elements for microprocessor 601 and other components and are disposed along one edge. IC card connector 502a is positioned between tristate buffers 617 and plug section 551, offset slightly from board center toward the front. ASIC (application specific LSI) devices, which include control circuits, registers, etc., and ROM for storing processing programs for use by the printed (main printer ROM), and other circuit elements are mounted on the underside of printed circuit board 550. For clarity in illustration, any wiring or interconnect patterns present on the top and bottom surfaces of printed circuit board 550 have been omitted. For all of the circuit elements or components described above, the specific configurations, whether parallel, grouped, or irregular, are for purposes of illustration, and are not intended as a limitation inasmuch as other configurations are also contemplated within the teachings of the invention.

Due to its complexity and the interconnection density, microprocessor 601 is typically manufactured or packaged as a pin grid array (PGA) type of device. However, those skilled in the art will readily understand that other package types such as the SOJ, SOP, and QFP (Quad Flat Pack) styles can be employed as desired within the teachings of the invention. An exemplary microprocessor 601 is the Am29030, with a typical operating clock speed of 25 MHz, which is a RISC type microprocessor manufactured by Advanced Micro Devices (referred to as AMD).

As stated above, cartridge 503, is configured to be inserted into a cartridge slot otherwise used for providing printer font information. Common font cartridges merely hold a ROM, or ROMs, in which font data is stored and then used to recreate the font "style" for given text. In contrast, cartridge 503, contains control circuitry in the form of microprocessor 601, ROMs 606 through 609, ROM 618, some ASIC-type circuitry which provide programmed processing functions for print data, and a communication circuit. The communication circuit is described in detail below.

The printer connector into which cartridge 503 is inserted is configured according to predefined font cartridge connection specifications. According to these specifications, the printer receptacle or connector is provided with read only lines, in the form of an address bus, for reading data from the cartridge into the printer, but no signal lines for transferring data from the printer to the cartridge. However, the cartridge used for this embodiment provides the ability to receive print data from external workstation 507 through connector 508, develop it into image data using microprocessor 601 and associated circuitry, and transfer the processed data to electronic control device 501 of the printer. In addition, the cartridge is configured with the capability to receive some data directly from electronic control device 501. Therefore, it is necessary to transfer print data from the printer to the cartridge using the read only lines in the connector. As a result, special processing is required by the printer microprocessor.

When cartridge 503 is inserted into the font cartridge or expansion slot of the printer, the processor inside the printer reads identification data stored in a ROM or ROMs in cartridge 503 (618), such as during printer or software initialization, or when power is applied to the printer. At this point the cartridge ROM exerts control over printer data processing within the printer. In response to the identification data, the printer processor begins processing image data according to processing programs or algorithms stored in and provided by ROMs 616 to 609. That is, the printer processor executes special processing according to the programs stored in ROM.

This special processing consists of generating addresses or address values that essentially contain one byte of print data (in the form of a PDL program), placing this address on the address bus, and communicating or transferring this address to cartridge 503 through the connector and plug 551. ASIC elements in the cartridge receive this address and extract the one byte of print data contained or encoded in the address by deciphering and storing it in RAM, as described later. One page of print data is then retrieved from RAM by microprocessor 601 and processed according to a desired PDL program and developed into image data. In this manner, developed image data are transferred from cartridge 503 to the printer and an image is printed by a xerography unit.

Microprocessor 601 can be made aware of various information regarding electronic control device 501 based on the data stored in RAM. For example, microprocessor 601 must obtain control information regarding console panel 518, and by receiving such data, can perform certain the necessary processing.

It is readily understood that it is better to use a processor that operates at speeds reasonably faster than the printer processor for microprocessor 601. The higher speed allows microprocessor 601 to receive and process data and provide image data to the printer in less time than the printer processor could process the same data. At the same time, the printer is not substantially delayed or having to wait for data and in essence have the net or effective processing speed of the printer increased. The circuitry inside of cartridge 503, and its operation, is described in greater detail below and also in the co-pending patent applications referenced above.

In line with above description, it can be seen that several anti-noise countermeasures are implemented for inhibiting the generation of electromagnetic noise or interference from or by the cartridge. These measures can be summarized as:

(1) Forming a conductive layer on inside surfaces of plastic upper case 100, while manufacturing the lower case from a metal such as aluminum so that a conductive layer or barrier is formed over the entire interior of the cartridge case to effectively block transmission of electromagnetic radiation to the outside of the cartridge.

(2) Providing a wall-like mating member 124 around the periphery of lower case 120 which fits inside of upper case 100. The result is overlapping conductive layers on the outer surface of mating member 124 and inside surface of upper case 100 that effectively block transmission of electromagnetic radiation to the exterior of the cartridge.

(3) Connecting signal and frame grounds at multiple locations to decrease any impedance between them, and to suppress the generation of high frequency eddy or stray currents.

(4) Connecting signal and frame grounds both on the sides and middle of plug 551 near through-hole 142, to reduce the wavelength of electromagnetic radiation that can be emitted from through-hole 142 (frequency is increased). This reduces electromagnetic noise in the wavelength band of interest that is typically the subject of regulations relating to electrical noise or interference.

These countermeasures are also followed by (5) providing a decoupling capacitor near the ground terminal or pin of each of the circuit elements and the power source terminal, and (6) providing a common mode choke coil in series with the power source conductor for microprocessor 601, within cartridge 503.

The wiring relationship of plug 551, formed on one end of printed circuit board 550, and connector CN11 is shown in FIG. 16. As shown in FIG. 16, plug 551 employs 25 pins on either side (sides A and B) of two sided printed circuit board 550. In FIG. 15, a signal name is used to label each corresponding pin of plug 551. A slash mark [/] affixed to a signal name indicates that the signal is active low [logical 0].

In FIG. 15, /ASB represents an address strobe signal (ASB) transmitted by CPU 510 within the printer (here a Motorola MC68000), while /UDS and /LDS represent upper and lower data strobe signals output by CPU 510. An auxiliary address strobe (ADS) or /ADS signal is an address signal generated as a result of certain parameters and the status of address strobe signal /ASB in electronic control device 501. The /ADS signal provides an indication of activity when the printer starts up or is initialized, which is different for different printers. As discussed later, in this embodiment, the printer type is determined according to activity or operation that takes place when the /ADS signal is initialized.

An output data acknowledge signal or /ODTACK signal is shown which is transferred from cartridge 503 to control device 501. A cartridge select or /CTRGSEL signal represents a signal used by CPU 510 to select cartridge 503 and access ROM 56, registers, etc., that are allocated to internal address spaces. Addresses or address signals A1 through A20, and read and write signal R/W, are both output by CPU 510, while signals D0 through D15 are provided by cartridge 503. A clock or SCLK signal is output by an oscillator (not illustrated) built into laser printer 500.

A cartridge registration or detection or /CTRGS signal is provided to laser printer 500 which is pulled down or low when cartridge 503 is inserted. As a result, CPU 510 detects the presence of cartridge 503 when inserted into connector CN11.

CPU 510 typically uses 23-bit address signals for signals A1 through A23 to specify an address word and the /UDS and /LDS signals to specify high (upper) and low (lower)

end bytes, respectively, of each word. As a result, CPU 510 is able to handle 16 megabytes of address space, generally residing at address values ranging from 000000h to FFFFFFh. Here the symbol 'h' that is attached to the end of the address denotes a hexadecimal number or unit.

C. Cartridge Address Space

Cartridge 503 is allocated some of the address space, specific address range, accommodated by CPU 510 in control device or circuit 501. CPU 510 uses addresses within a range or space bounded by the values 000000h and FFFFFFh, for a 16-megabyte address space, but part of this address range is already allocated for use by ROM. The space allocated to cartridge 503 changes depending on the specific model or type of the laser printer. In the case of Hewlett-Packard laser printers, a 2-megabyte memory capacity or address space allocation for address values ranging from say 200000h to 3FFFFFh or from 400000h to 5FFFFFh is assigned, as shown on the left side of FIG. 16.

However, as previously discussed, the typical microprocessor 601 used in cartridge 503 is an AMD model AMD29030—25 MHz which can handle 4 gigabytes of memory at address values ranging from 00000000h to FFFFFFFFh. In addition to ROM and RAM allocations within this address space, allocation occurs for various registers used for data exchange with electronic control device 501. This type of allocation is illustrated in FIG. 16. The configuration of components inside of cartridge 503 is described below along with address space requirements for both microprocessors used within the combined cartridge and printer system.

D. Internal Cartridge and Communication Controller Configuration

The internal configuration of cartridge 503 is shown in FIG. 18. In FIG. 18, cartridge 503 is configured with a centrally located microprocessor 601 for controlling all cartridge operations. The cartridge is also shown using a memory section 602 with ROM, RAM, and support circuitry, a data transfer controller 603 to control data exchange with control device 501, a communication controller or section 604 to performs data transfer with external workstation 507, and some additional circuitry.

Memory section 602 employs a series of ROMs 606 through 609, which generally aggregate to a total memory capacity of 2 megabytes, and are used to store programs for microprocessor 601 execution. A selector 610 is used to provide bank switching of ROMs 606 through 609. RAMs 611 through 614, also provide a total memory capacity of at least 2 megabytes, and are used to retain print data received from control device 501 and to also retain post developed image data. ROMs 606 through 609 are generally configured as mask ROMs, each having 16 bits by 256 kilobits of capacity, for a total of 4 megabits of memory. As shown in FIG. 17, ROMs 606 to 609 are allocated to address spaces 00000000h to 001FFFFFh. Each ROM set 606, 607, and 608, 609 forms a 2-unit bank creating a 32-bit data bus. ROMs 606 to 609 and microprocessor 601 are connected by address bus AAB and a control signal bus. Data bus IDB of each of ROMs 606 to 609 is also connected to data bus DB29 through data selector 610. Therefore, microprocessor 601 is able to read data from ROMs 606 through 609. All address signals, except the three low end bits (A0, A1, and A2) from microprocessor 601 on address bus AAB, are input to ROMs 606 and 607, and ROMs 608 and 609.

The two low end bits (A0 and A1) are not input because data is read by microprocessor 601 in units of one word, or thirty-two bits (4 byte units). In addition, since the third lowest address bit A2 is not assigned, when reading data, ROMs 606 to 609 output data simultaneously, and data selector 610 makes adjustments to data being output from the ROMs simultaneously. That is, the access of the ROMs by microprocessor 601 often takes place from consecutive addresses. Therefore, using 32-bit data words, consecutive words are read from ROMs 606 through 609. If consecutive words are actually read, the two-set ROM banks are switched in sequence by data selector 610 and the data is read consecutively. As a result, reading two consecutive words or contiguous data is extremely fast.

RAMs 611 through 614 are each generally implemented as 16 by 256 kilobit DRAMs, for a capacity of 4 megabits. As shown in FIG. 18, these RAMs are allocated to 2 megabytes of address space or addresses from 2000000h to 201FFFFFh. An additional 2 megabytes of memory can be added to cartridge 503 using expansion RAM interface 615 which is allocated to addresses from 20200000h to 203FFFFFh. An IC type RAM memory card having a capacity of up to 2 megabytes can be installed in expansion RAM connector 502a. RAMs 611 through 614 and expansion RAM 615 data lines are connected directly to a data bus DB29, which is the microprocessor 601 data bus. The RAM address lines are connected to microprocessor 601 address bus AAB through a data transfer controller 603. Register I/O, discussed later, is allocated to address spaces starting from 80000000h.

An explanation of communication controller or control section 604 is provided next. This controller is designed or constructed around a large scale integrated (LSI) communication control circuit 604A, as shown in FIG. 19, and generally uses a two-way buffer 604B disposed between data bus DB29 and data terminals D0 to D7 of control circuit 604A. A control circuit or controller 604C connected to control circuit 604A manages the timing of data exchange with microprocessor 601. Two line buffers 604E and 604F are connected to the communication input and output ports of control circuit 604A. A D-type flip-flop circuit 604H generates an operations clock PCLK for the communication control circuit by dividing down the 25-MHz clock signal CLK. A liquid crystal oscillator 604I is used to generate a fundamental clock signal RTXCA for communication timing.

An exemplary communication control circuit 604A is a part number 85C30 produced by Zilog, and an explanation of using this type of circuit for effecting communication control in combination with line buffers 604E and 604F is illustrated beginning on page 222 of Zilog's Z8000_Family Data Book, Nov. 1988, and a detailed explanation is omitted here. Control circuit 604C is configured from a programmable logic array and uses signals received from microprocessor 601 as inputs and outputs control signals which are transferred to two-way buffer 604B.

The input signals received by control circuit 604C comprise: address signals A11 and A31 from address bus AAB, request signal /REQ for memory space assigned to communication controller 604, read/write signal R/W, reset signal /RESET, and the 25-MHz clock signal CLK. The output signals generated by control circuit 604C comprise: output direction indicator signal for two-way buffer 604B, enable signal /CE for two-way buffer 604B and control circuit 604A, read signal /RD for control circuit 604A, write signal /WR, and a ready signal RDY for microprocessor 601. Ready signal RDY of communication controller 604 is logically summed with ready signals of other circuits by a NOR gate 616, and the result output to microprocessor 601 as a ready signal /RDY. This ready signal notifies microprocessor 601 that communication control section 604 has set data on the data bus DB29 in response to access by microprocessor 601.

Address signal A3 of address bus AAB is used as the signal A/B which specifies which channel (A or B) in a two-channel communication port built into communication control circuit 604A, and the address signal A2 is used as a signal C/D to specify whether data on the data bus is communication data or a command for control circuit 604A (85C30). In using these address signals, four communications-related addresses are set every four bytes beginning with address 80000800h. A series of registers are assigned to these addresses, one being a register SCCCTLB which is a control register on the B channel side of communication control circuit 604A, and a register SCCDATB which is a data register for the B channel. A register SCCCTLA acts as a control register on the A channel side of the communication control circuit 604A, and a register SCCDATA is a data register for the A channel. The A and B channels are handled internally as multiple registers depending on the data written to control registers SCCCTLA and SCCCTLB. Data registers SCCDATA and SCCDATB are handled as both input and output data registers depending on the values written to the control registers.

In communication control section 604, when one byte of data from microprocessor 601 is output to data bus DB29, the output point of channel A is specified and a write operation is performed. This data is received through two-way buffer 604B and output as serial data using line buffer 604F. When a read operation, for which the input port of the A channel is specified, is received from microprocessor 601 when serial data are received through line buffer 604E, the received data are output to data bus DB29 as a parallel signal using two-way buffer 604B.

The print data transferred from external workstation 507 by communication control section 604 are stored in a prescribed area of RAMs 611 to 614 of the data transfer controller 603 where they wait for processing by microprocessor 601. When microprocessor 601 receives all of the print data to be developed from electronic control device 501, the program stored in ROMs 606 to 609 is activated and the print data stored in the prescribed area in RAMs 611 to 614 is processed. This processing develops the image, and the result is stored as image data in a prescribed area in RAMs 611 to 614.

Returning to FIG. 16, when viewed from the perspective of control device 501, cartridge 503 ROM (ROM 618 shown in FIG. 18) is allocated to the first 512 kilobytes. That is, cartridge 503 contains programs that are to be executed by CPU 510. When cartridge 503 is inserted or otherwise installed, CPU 510 executes a jump instruction to the address specified for ROM 618 after initialization is completed. CPU 510 subsequently operates according to processing steps stored in this ROM.

When CPU 510 accesses the first 512 kilobytes of the 2 megabyte space allocated to cartridge 503, ROM 618 is accessed using an address signal output through address buffer 617 provided for the connector side of address bus CAB of cartridge 503. The commands and data stored in ROM 618 are sent to CPU 510 through data buffer 619 formed on data bus CDB of the connector. The 'X' used in labeling the FIFO (lower right) addresses in FIGS. 16 and 17 represents the four high end bits of the first address of the allocated address spaces.

E. Data Transfer Controller

A variety of control and status registers are accessed at addresses other than those addresses allocated to ROMs and RAMs in the address maps shown in FIGS. 16 and 17, and are provided for data transfer controller 603, which is described next. The controller description chiefly relates to circuitry with further reference to address maps (FIGS. 16 and 17) as appropriate.

Data transfer controller 603, shown in FIG. 18 is formed using an ASIC having around 29,000 usable gates. An exemplary ASIC found useful in manufacturing the invention is manufactured by Seiko Epson Corporation, and is a gate array part number SLA929S, which exhibits low power consumption and is manufactured using a CMOS process. Data transfer controller 603 controls the exchange of data between control device 501 and microprocessor 601 of cartridge 503. This data exchange uses a read control circuit 620 to send data through a read only data bus from control device 501 to cartridge 503; a FIFO control circuit 623 to pass data through a FIFO memory 621, using read control circuit 620; and a double bank control circuit 624, which makes it possible for control device 501 to read data from cartridge 503. FIFO memory 621 is configured as a RAM-type memory device that sequentially stores and reads data using a first-in-first-out procedure. An exemplary component useful for implementing this RAM is a RAM circuit, part number HM63921 manufactured by Hitachi Seisakusho or part number M6252FP manufactured by Mitsubishi Electric.

Address bus CAB is connected to data transfer controller 603 through address buffer 617, and data bus CDB is connected through data buffer 619. A first decoder 631, formed in controller 603, receives address bus CAB and cartridge selector CSEL signals and outputs selection signals to other elements in data transfer controller 603. In a similar manner, address bus AAB and control signal CCC, from microprocessor 601, are connected to transfer controller 603 using a bus controller 635 formed in controller 603. A second decoder 632 is connected to address bus AAB and outputs selection signals to other data transfer controller 603 circuitry. Furthermore, bus controller 635 receives AAB and CCC input, and provides address signals and control signals as outputs to ROMs 606 through 609 and RAMs 611 through 614, as well as expansion RAM interface 615.

In addition to the above elements, a variety of other registers are provided within data transfer controller 603. Beside normal read and write operations, many other registers are automatically written to when special processing takes place. The configuration of these special registers is described below.

Taken from the control device 501 point of view, cartridge 503 is a read only device, and registers writable from control device 501 are configured to be written to using a read operation from a specified address. That is, by specifying a particular address, a selection signal is output from a first decoder 631 and data is written to a certain register as a result. Reading from the registers takes place using normal read cycle operations. Data reading and writing by microprocessor 601 also occurs using normal read and write operations. In FIG. 18, registers are shown as being connected to a readable bus, and write operations are simply indicated by arrows. Such registers include, interrupt request register 640, polling command register 643 (register POLL in FIG. 16), status register 645 (FIG. 16 register STATUS), transfer flag register 647 (FIG. 17 register BPOLL), PROM control register 649, and control register 650.

Among these registers, registers other than status register 645 and transfer flag register 647 represent generic names for multiple registers allocated as memory mapped I/O for CPU 510 or microprocessor 601 and are not necessarily allocated to consecutive addresses. Interrupt request registers 640 include the registers AMDINT0, AMDINT1, and AMDINT2, and registers AMDCLR0, AMDCLR1, and AMDCLR2, shown in FIGS. 16 and 17. Registers POLL and MCONTCS belong to polling command register 643. The PROM control registers include the registers EEPCS, EEPSK, and EEPDI.

All registers not belonging to read control circuit 620, FIFO control circuit 623 or double bank control register 624, and not mentioned in the above description, generally belong to or form part of control register 650. These are registers ADDMUXA, ADDMUXB, CLKDIV, RTCVAL, RTCON, RTCSEL, RTCCLR and SYSKEEP, which are shown in FIGS. 16 and 17.

Among the various portions of FIGS. 16 and 17, EWWR0 and EWWR1, which are each 128 bytes in size, are memory areas used for writing to a first latch 651 and a second latch 652 of read control circuit 620 from control device 501. Registers EWRD0 and EWRD1 correspond to seeing latches 651 and 652 as a one word latch from the microprocessor 601 point of view. Registers FIFORST, and FIFOWR correspond to FIFO register 653 of FIFO control circuit 623. Registers FIRCLK, and FIFORD correspond to FIFO read register 655 of FIFO control circuit 623. A latch 657 is also provided in FIFO control circuit 623 to maintain data to be written to FIFO memory 621 using some of the functions of read control circuit 620.

Portions of FIG. 16 labeled by the symbols DPRAMA and DPRAMB represent buffers having a 256-byte (128-word) capacity. These buffers are equivalent to viewing first and second buffers 658 and 659 of double bank control circuit 624 from the control device 501 side. These banks, DPWROA and DPWROB, shown in FIG. 17, are what is seen by microprocessor 601 when viewing buffers 658 and 659. Certain bits d1 and d2 of status register 645 are also used for the exchange of data through double bank control circuit 624. Details of this exchange are provided below.

F. Registers

Interrupt request register 604 is a register that generates, or transfers and retains an interrupt request from control device 501 to microprocessor 601. Three levels, and three corresponding registers (AMDINT0, AMDINT1, and AMDINT2), are provided for interrupt requests directed from control device 501 to microprocessor 601, as shown in FIG. 16. An interrupt request to microprocessor 601 is generated by control device 501 reading any of the individual registers forming interrupt request register 640 which sets these registers. However, data read during this operation has no meaning and is generally irrelevant to the generation of interrupt requests.

A more detailed example of configurations useful for implementing interrupt request register 640 is illustrated in FIGS. 20A, 20B, and 20C in which registers are formed using D-type flip-flops. An output pin, Q, for each D-type flip-flop, 640a, 640b, and 640c, is set active low using the /AMDINT0, /AMDINT1, and /AMDINT2 signals, respectively, which are output by first decoder 631 during the register read operation described above. This results in the output of interrupt signals /INT0, /INT1, and /INT2, respectively. As before, the use of a "/" or slash symbol in front of a signal label indicates that the signal is active low.

As shown in FIG. 17, the corresponding registers that clear the respective outputs of flip-flops 640a, 640b, and 640c, are allocated to specific addresses as three read only registers AMDCLR0, AMDCLR1, and AMDCLR2, respectively. As a result, when a microprocessor 601 read operation from all of the addresses allocated to this register (640) takes place, a second decoder 632 outputs /INTCLR0, /INTCLR1, and /INTCLR2 signals and the corresponding flip-flops are preset.

When an interrupt originates from control device 501, any of the registers in interrupt request register 640 can be accessed. Microprocessor 601 determines a priority and performs operations that apply to the interrupt request. In this case, microprocessor 601 clears the corresponding interrupt request registers 640a, 640b, and 640c. Signals such as PUP2 that start with the code PUP, represent signals provided by a reset signal output circuit 637 and drop low at the time of reset, etc. Signal PUP2 is used to clear three interrupt requests at once.

Polling command register 643 is used to pass commands or instructions from microprocessor 601 to control device 501, and it can be written to by microprocessor 601 and read by control device 501. An exemplary hardware configuration for register 643 is shown in FIG. 21. As indicated in FIG. 21, command register 643 uses two octal D-type flip-flops, 643a and 643b, which form a 16-bit wide data latch, and one D-type flip-flop, 643c. A 16-bit wide data bus DB29 originating from microprocessor 601 is connected to data input terminals or pins 1D through 8D of flip-flops 643a and 643b, while a 16-bit data bus DB68 originating from control circuit 501 is connected to output terminals, 1Q through 8Q.

Second decoder 632 outputs a /MCONTCS signal when microprocessor 601 accesses polling command register 643 (FIG. 16, register MCONTCS), which is input to clock terminals CK of flip-flops 643a and 643b. When this signal goes low, the contents of data bus DB29 are latched to flip-flops 643a and 643b. In addition, first decoder 631 outputs a /POLL signal when control device 501 accesses polling command register 643 (FIG. 16, register POLL), which is connected to output-enable terminals OE, which enables the outputs of flip-flops 643a and 643b. When this signal goes low, data retained in flip-flops 643a and 643b is output to data bus DB68.

The /MCONTCS and /POLL signals are connected to a clock pin C and preset terminal PR of D-type flip-flop 643c. Flip-flop 643c generates a CMDRD signal on its output pin Q which is set high (logic 1) when DB29 data is latched in flip-flops 643a and 643b (/MCONTCS is low) and reset low (logic 0) when this data is read by control device 501 (/POLL is low). A status register 645 connected to control device 501 uses a specific bit d3 (also called flag CMDRD below) to determine the status of the CMDRD signal. Therefore, by reading status register 645, control device 501 is able to know, or is provided with an indication from microprocessor 601, that command code has been set in polling command register 643.

When control device 501 observes the CMDRD flag, bit d3 of status register 645, and finds that an instruction or command has been placed in register 643, it reads the contents of command register 643 during a normal read cycle. That is, it reads the command sent from microprocessor 601. The commands are, for instance, to start transferring print data to data transfer controller 603, to start printing, or to display messages on console 5 18. As shown in FIG. 21, when control device 501 reads the contents of polling register 643, CMDRD, output by flip-flop 643c, its output is then reset high using the /POLL signal. Therefore, by observing a bit d2 of transfer flag register 647, microprocessor 601 is able to know whether or not the command it output was read or received by control device 501.

In addition to the data described above, which shows whether or not a command has been placed in the register by microprocessor 601, status register 645 also retains the data illustrated in FIG. 22, which is described as follows. Bit d0 of this data is set low by the EWRDY signal, which is generated within read control circuit 620 when data is written to a first latch 651 by electronic control device 501, discussed later. When that data is read by microprocessor 601, bit d0 is set high by a signal from a second decoder 632. This bit is generally referred to as the EWRDY0 flag or flag EWRDY0. In addition, bit d4 is set low by the signal EWRDY1 generated within read control circuit 620 when data is written to a second word latch 652 by electronic control device 501. When those data are read by microprocessor 601, bit d4 is set high by a signal from second decoder 632. This bit is generally referred to as the EWRDY1 flag or flag EWRDY1.

Data bits d1 and d2 indicate whether or not double bank control circuit 624 has its access enabled either by control device 501 or microprocessor 601. The respective flags are referred to as ADDMUXA and ADDMUXB. These two bits correspond to the two transfer banks built into double bank control circuit 624. As shown in FIG. 16, bits d1 and d2 are set and reset by microprocessor 601 when writing data to bit d0 of registers ADDMUXA and ADDMUXB, which are contained in control circuit 650. Therefore, before writing data to one of the banks of double bank control circuit 624, microprocessor 601 sets the flag to a low level and then resets it high after writing is finished. Assuming control device 501 reads data from the bank side in which this flag is set high (1), by alternately writing and reading the data to the two banks, microprocessor 601 connects to the control device 501 side and passes data. The function of the d3 bit (flag CMDRD) has already been described above.

Bit d5 acts as a flag CLKDIV, which is set according to the operation of the microprocessor 601 clock. Clock CLK, which is output from first oscillator 661 and typically employs an external liquid crystal vibrator CRC1, is used as the operating frequency for microprocessor 601. If a value of zero is written to bit d0 of a register CLKDIV of control register 650 from microprocessor 601, the microprocessor clock is set to operate at a predetermined frequency, here 25 MHz. However, if a one is written to the prescribed bit d0, the clock is set to operate at one-half of this frequency, or 12.5 MHz in this example. Flag CLKDIV of status register 645, when observed from the point of view of control device 501, is set low when clock CLK is operating at a its normal frequency, of 25 MHz, and set high (1) when this is decreased, to 12.5 MHz. Control device 501 checks bit d5 in status register 645 to determine the clock frequency, that is, to know the current operating speed of microprocessor 601 in order to match the timing for data transfer, etc.

The d6 bit acts as a flag referred to as ADMON, which is set high when microprocessor 601 is processing data and set low when microprocessor 601 terminates data processing and enters a sleep mode. In the preferred embodiments, microprocessor 601 receives PDL-type data from control device 501 and then performs the processing necessary to develop this data into image data. However, if no PDL-type data is provided by control device 501, microprocessor 601 does not perform any data processing and is considered inactive. If this inactivity continues for a predetermined amount of time, microprocessor 601, through oscillator 661, is switched to a lower operating frequency to conserve power. While those skilled in the art will recognize that several intermediate frequencies could be used, a preferred operating frequency for the initial sleep mode is one half of the initial operating frequency, that is, 12.5 megahertz in this example. If the inactivity extends for a significant period of time, microprocessor 601 ceases operation and enters a second sleep mode wherein the output of oscillator 663 is set to zero and microprocessor 601 is effectively turned off. When transitioning from the first to the second sleep state, or half frequency operation to off, microprocessor 601 writes a zero in register ADMON of control register 650. As a result, bit d6 of status register 645 is set low, and control device 501 can easily detect the current operating mode of microprocessor 601 by checking this bit.

A real time clock built into data transfer controller 603 is used to measure the amount of activity or length of inactivity of microprocessor 601. The clock signal provided by second oscillator 667 is used to operate a real time clock RCLK, and is typically operated using a liquid crystal vibrator 665. The real time clock is formed as part of bus controller 635 and uses instructions from microprocessor 601 to measure specific elapsed time intervals. As previously indicated, two independent oscillators 663, 667, along with two sets of liquid crystal vibrators 661, 665, are used to make microprocessor 601 clock CLK independent of, and, therefore, independently adjustable from, real time clock RCLK.

By making bit d1 of registers RTCVAL and RTCSEL, for control register 650, low or high (0 or 1), the real time clock is used to establish four different time intervals or interval timers which it can start by setting the prescribed bit d0 of register RTCON. A timer that has been started outputs an interrupt request signal to microprocessor 601 at prescribed intervals until a zero is written to bit d0 of register RTCON at which point this timer is stopped. When microprocessor 601 receives this interrupt request signal, it reads register RTCCLR and clears the interrupt request. The output of these interval timers are used for counting user time, etc., during PDL data processing.

The configuration of PROM in an exemplary control register 649 is described next. The three registers EEPCS, EEPSK, and EEPDI, shown in FIG. 17 are contained in PROM register 649 of FIG. 18. These registers are typically memory elements built into cartridge 503 which are used to exchange data with EEPROM 670, which is capable of being electrically erased and rewritten with data.

Cartridge 503 stores variables (configuration parameters) required for the operation of laser printer 500 in EEPROM 670 which performs reading, deletion, and rewriting of data using a serial transfer format. An EEPROM found useful in implementing the invention is an EPROM, part number NMC93C66X3, manufactured by National Semiconductor. EEPROM 670 has a memory capacity of around 16 bits by 256 bytes (number of registers) and is capable of reading, erasing or writing the contents of any specified register. When selected using a chip select signal CS, EEPROM 670 receives zero (0) and one (1) value binary data transferred to serial data input terminal $D_{in}$ in synchronization with the serial data clock SL. However, the first three data bits being transferred are interpreted as a command to the EEPROM, and the next eight bits are interpreted as a register number or location for reading, erasing, or writing data. When writing data to be stored, it is supplied to input terminal $D_{in}$ in synchronization with serial data clock SL following the command and register designations.

Register EEPCS provides a signal that switches the level of the chip select signal. When microprocessor 601 writes a zero to bit d0 of this register, EEPROM 670 is selected. Register EEPSK is used to generate serial clock SK. Microprocessor 601 generates a serial data clock for use by EEPROM 670 by alternately writing zeros and ones to register EEPSK. Register EEPDI is used to retain each data bit that is written to EEPROM 670. When microprocessor 601 generates clock SK by rewriting register EEPSK, it simultaneously rewrites a bit d0 of register EEPDI based on the data to be rewritten. Data output terminal Dout of EEPROM 670 represents bit d0 of transfer flag register 647, which was previously described. After providing a data read command and identification of the register to be read to EEPROM 670, if microprocessor 601 reads bit d0 of transfer flag register 647 at the same time as the serial data clock, it reads the contents of the specified register. Since data stored in EEPROM 670 is retained even if power is turned off, the circuit or logic configuration present prior to power loss can be restored by reading the contents of EEPROM 670 immediately after power is restored to laser printer 500.

G. Read Control Circuit Configuration and Operation

An exemplary read control circuit 620 and associated data transfer steps utilized in its operation are described next. As shown in FIG. 23, read control circuit 620 uses a first word latch 651 made from two 8-bit latches 651a and 651b, and a second word latch 652 made from two 8-bit latches 652a and 652b, a tristate buffer 671, which is used to output address signals AC1 to AC8 from address bus CAD to the FIFO control circuit 623 as one-byte data on data bus lines Z0 to Z7, and two 2-input OR gates 672 and 673. Two D-type flip-flops 674 and 675 are used to generate flag EWRDY0 (bit d0) and flag EWRDY1 (bit d4), respectively, of status registers 645.

The 16 bits (AC1 through AC16) of the address line from address bus CAB on the connector side are connected to the data input terminals 1D to 8D of latches 651a and 651b, and latches 652a and 652b which make up the first and second word latches 651 and 652, respectively. The data lines D0 to D15 of the data bus DB29 are connected to the output terminals 1Q to 8Q of the latches. The output of OR gate 672 is connected to the clock terminals CK of latches 651a and 651b, while the output of OR gate 673 is connected to the clock terminals CK of latches 652a and 652b. The outputs of OR gates 672 and 673 are also connected to clock terminals C of flip-flops 674 and 675.

Signal /EWRD0 is connected to the output-enable terminals OE of latches 651a and 652b, and signal EWRD1 is connected to the output enable terminals 0E of latches 652a and 652b. Signals /EWRD0 and /EWRD1 are also connected to preset terminals PR of the flip-flops 674 and 675. Signal /EWWR0 and signal /ADS are connected in turn to the respective input terminals of 2-input OR gate 672, and signal /EWWR1 and signal /ADS are also connected to respective input terminals of 2-input OR gate 673. Signal /ADS is an address strobe auxiliary signal generated based on address strobe signal /ASB, as discussed above.

Here, the signal /EWWR0 drops low when the transfer of one word is designated by read control circuit 620, and the signal /EWWR1 drops low when the transfer of one word different from the above word is designated. The signal input to clock terminals CK of first and second word latches 651 and 652, is formed as a logical product of active low signals /EWWR0, /EWWR1 and /ADS. When these signals become active, addresses AC1 to AC16 output on address bus CAD are held in the two word latches. Since the outputs of OR gates 672 and 673 are also input to clock terminals C of flip-flops 674 and 675, outputs Q of these flip-flops are set low. Outputs EWRDY0 and EWRDY1 are handled as bits d0 and d4 of status registers 645 and also as bits d1 and d4 of transfer flag registers 647, i.e., as flags EWRDY0 and EWRDY1.

Viewing read control circuit 620 from the point of view of control device 501, as shown in FIG. 16, first and second word latches 651 and 652, each of which occupy a 128-kilobyte memory area, correspond to the two registers EWWR0 and EWWR1. Accessing prescribed addresses in these areas is equivalent to transferring one word each or 16 total bits of data. When seen from the point of view of microprocessor 601, first and second word latches 651 and 652 are equivalent to one-word registers EWRD0 and EWRD1 shown in FIG. 17. Both word latches 651 and 652 can each be accessed as one word by CPU 510 as well as microprocessor 601 through data bus DB68 or data bus DB29.

The first and second word latches 651 and 652 are treated as registers EWRD0 and EWRD1 by microprocessor 601. Therefore, when microprocessor 601 goes to read data held by the word latches, it performs a read operation on register EWRD0 or EWRD1. At this time, signal EWRD0 or EWRD1 drops low (active) and the previously held address (actually data) is output from the output side of first word latch 651 or second word latch 652, i.e., to data bus DB29, connected to output-enable terminal OE. Signals /EWRD0 and /EWRD 1 are connected to the preset terminal PR of flip-flops 674 and 675. Therefore, signals EWRDY0 and EWRDY1, which appear at the Q outputs of flip-flops 674 and 675, respectively, are inverted to a high level at the same time microprocessor 601 reads data in the first and second word latches. That is, flags EWRDY0 and EWRDY1, which are bits d0 and d4 of status registers 645 and bits d1 and d4 of transfer flag registers 647, are set to a logic level of one.

Assuming the above hardware configuration, control device 501 and microprocessor 601 transfer data from control device 501 to microprocessor 601 using the following procedures. The data to be transferred is limited information in this embodiment, such as console panel 513 control information, but if electronic control device 501 is connected via the data input port 514 to a computer different from the workstation 507, it is also possible to process print data and other information received from such a source.

In this case, the print data comprises a PDL program that is to be implemented by microprocessor 601. The data transfer accomplished by read control circuit 620, occurs using the data transfer routine illustrated in FIG. 24 and executed by CPU 510, and also using the data read interrupt processing routine shown in FIG. 25 and executed by microprocessor 601. Data transfer using first word latch 651 is explained below as an example but data transfer utilizing second word latch 652 is exactly the same.

When print data has been prepared for transfer to cartridge 503, the processing routine shown in the flow chart of FIG. 24 commences. First, flag EWRDY (bit d0) of status register 645 is read in a step S700 and set to zero when data is transferred or set into first word latch 651. When that data is read by microprocessor 601, the EWRDY0 flag is set to one. Thus, a determination can be made as to whether or not flag EWRDY0 is set at one in a subsequent step S705.

A standby mode is adopted for CPU 510 until flag EWRDY is set at a logical one level. When flag EWRDY is one, the next address, which is equal to the first address in the EWWR0 area or portion of memory plus twice the amount (number of bytes) of data (D×2) to be transferred, is read in a step S710. In this embodiment, the top address of the area EWWR0 is 500000h. When reading takes place for memory area EWWR0, addresses represented by address signals AC1 to AC16 are read and held as data in first word latch 651. Except for the least significant bit (LDS) address bit, the lower 16 bits are latched. Therefore when an address separated or spaced apart by a factor of D×2 from the top of area EWWR0 is read, data (D) are latched in first word latch 651. After the above processing, CPU 510 sets one interrupt request register (AMDINT0 in this embodiment) in a step S720. CPU 510 continues execution of the transfer routine shown in FIG. 24. However, when the data retention takes place using first latch 651, flag EWRDY0 is set low (0), as indicated in FIG. 23. Therefore, transfer of the next data does not occur until flag EWRDY0 is set high (1) as in steps S700 and S705.

When CPU 510 sets an interrupt request register (AMDINT0), microprocessor 601 receives this interrupt request and initiates the data read interrupt routine as shown in FIG. 25. That is, this interrupt request is handled as notification of data transfer to cartridge 3. This routine begins immediately after data is retained in first word latch 651 (or second latch 652) of read control circuit 620. Microprocessor 601 reads the one word of data prepared by control device 501 in step S730 by reading register EWRD0 (or EWRD1). After that, microprocessor 601 transfers the data it read to specified areas of RAMs 611 through 614 in a step S735.

Using the processing technique described above, electronic control device 501 is able to transfer data to cartridge 503, which is only connected to a read only data bus CDB. In addition, since cartridge 3 is notified immediately after a data transfer by an interrupt request, it can receive data from electronic control device 501 efficiently. Therefore, microprocessor 601 of cartridge 3 does not need to continue to monitor the transfer of data by electronic control device 501 nor wait for writing the next data by electronic control device 501. Further, in this embodiment, the data transfer can also be detected using bit d1 or d4 of transfer flag registers 647, i.e., flag EWRDY0 or EWRDY1. Therefore, even in cases in which multiple conditions have been allocated interrupt request register AMDINT0, when this interrupt request is received, microprocessor 601 can reliably discriminate a request for data transfer from other requests by confirming the status of flag EWRDY0 or EWRDY1.

Furthermore, since flags EWRDY0 or EWRDY1 are inverted by the hardware when microprocessor 601 completes the reading of data set by CPU 510, electronic control device 501 can immediately detect completion of data transfer. Therefore, the sequential transfer of multiple data can be performed at high speed. In addition, in this embodiment, writing and reading of data is performed in word-sized units, allowing microprocessor 601 to more efficiently transfer data.

H. FIFO Control Circuit Configuration and Operation

As shown in FIG. 18, FIFO control circuit 623 uses a latch 657 to temporarily store or latch data to be written to FIFO memory 621, and FIFO write and read registers 653 and 655, respectively, to control the writing and reading of data to FIFO memory 621. FIFO memory 621 typically stores 1,152 bytes of data and has internal write address and read counters. Internally, FIFO memory 621 has a write reset terminal, a read reset terminal, a write 8-bit data bus, a read 8-bit data bus, a write clock terminal, and a read clock terminal, all of which reset respective write and read counters. The data entering latch 657 are supplied through tristate buffer 671 shown in FIG. 23. The output of buffer 671 becomes valid when the signal /FIFOWR input to gate terminals 1G and 2G goes low. Signal /FIFOWR goes low when data transfer by FIFO control circuit 623 is designated.

In order to use FIFO memory 621 to transfer data from control device 501 to microprocessor 601, CPU 510 executes a transfer routine as illustrated in FIG. 26, which will be described first, and microprocessor 601 executes a processing routine illustrated in FIG. 27.

CPU 510 transfers several bytes of data using FIFO control circuit 623. When the data transfer routine shown in FIG. 26 is initiated by CPU 510, register FIFORST, which belongs to FIFO write circuit 654 of FIFO control circuit 623, is first read, and write and read address counters are reset in a step S750. Next, a variable N is reset to zero in step S755 and subsequently used to count the number or quantity of data (data words) being read out or transferred. After that, addresses (the first address of register FIFOWR plus data D×2) are read in a step S760. The top address of the register FIFOWR in this embodiment is 5D0000h as shown in FIG. 16. When this address is read out, it is output as data, as with read control circuit 620, and is latched in latch 657 through buses Z0 through Z7, which are shown in FIG. 23.

A prescribed amount of delay time after this latching operation occurs, a write clock is output to the write clock terminal of the FIFO memory 621, and data D, which is retained in latch 657, are written to the address indicated by the write address counter of FIFO memory 621. At the same time, the contents of the write address counter inside of FIFO memory 621 are incremented by one. After one byte of data is written in this manner, variable N is incremented by one in a step S770, and a determination is made in a step S775 as to whether or not N is equal to a total number of bytes X of data that is to be transferred. As a consequence, steps S760 to S775, are repeated until the number of bytes N of transferred data equals the total number of bytes X of data to be transferred.

When the transfer of all of the data is complete, CPU 510 sets one of the interrupt request registers (AMDINT1) and notifies microprocessor 601 that data transfer is complete in a step S780. CPU 510 then proceeds through a NEXT step and the data transfer processing routine is terminated.

Microprocessor 601 receives interrupt request AMDINT1 and starts a data receive interrupt routine as represented by the flowchart of FIG. 27. When this routine begins, microprocessor 601 first resets a variable M to zero in a step 805 and subsequently uses it to count the number or amount of data received, up to a certain value.

Register FIRCLK, which forms part of FIFO read register 655, is next read in a step S810 and data read to specified areas of RAMs 611 through 614 is transferred in a step S815. When register FIRCLK is read, a read clock signal is output to the dock terminal on the read side of FIFO memory 621, and the data D at the address indicated by the read address counter at that time are read out. At the same time, the contents of the address counter on the read side of FIFO memory 621 is incremented by one.

When one byte of data is received, variable M is incremented by one in a step S820, and whether or not the new value is equal to the total number of bytes X of data to be transferred is determined in a step S825. The processing described for steps S810 to S825 is repeated until the number of bytes M of data received matches the total number of data X to be transferred.

When it is determined that data reception or transfer is completed, microprocessor 601 writes a command in polling command register 643 in a step S630, to indicate the end of the data reading process. By reading the contents of polling command register 643, CPU 510 knows that data reception has ended, and microprocessor 601 escapes to the RNT step and ends this processing routine.

A significant amount of data can be effectively transferred from control device 501 to microprocessor 601 using the processing technique described above. Moreover, since the transfer of data to cartridge 3 is notified by the interrupt request signal AMDINT1 immediately after multiple bytes of data have been transferred, microprocessor 601 of cartridge 3 does not need to continually monitor the transfer of data by electronic control device 501 while electronic control device 501 is transferring data and can perform other processing, thus improving overall processing efficiency. Of course, electronic control device 501 does not need to wait to write the next data.

I. Double Bank Control Circuit Configuration and Operation

The print data received from the workstation 507 by communication control section 604 are interpreted using the PDL interpreter stored in ROMs 606 to 609, developed as an image, and temporarily stored in a prescribed area within RAMs 611 to 614. The image data obtained in this manner are then transferred to control device 501 and stored in a RAM 512 for printing by laser engine 505, according to a prescribed timing. This image data transfer takes place using double bank circuit 624, which is equipped with two banks that store 256 bytes of data. These banks are referred to as bank A and bank B, and generally have the same hardware construction. Therefore, only an example of the configuration of one bank, bank A, is shown in FIG. 28.

Each bank is configured to allow selective switching of its address and data buses between connection to microprocessor 601 and control device 501, which occurs for image data transfer. As indicated in FIG. 28, three data selectors 681, 682, and 683 are used to select or redirect the address buses. Two sets of octal line buffers are used each set having two buffers, four octal line buffers 684 through 687 total, to select a (16-bit wide) data bus. Two RAMs 691 and 692, having a 128 byte memory capacity, gates 694 and 695, here being OR gates, and an inverter 696 complete one bank. In FIG. 28, two memory chips with a memory capacity of 128 bytes are used but a single memory chip could be used with appropriate switching of high end addresses.

The data selectors 681 and 683 are configured to select and output the least significant seven bits (AC1 to AC7) from address bus CAB of electronic control device 501 and the lower seven bits (A2 to A8) from address bus AAB of microprocessor 601. An address selection occurs using an ADDMUXA signal (bit d0 of register ADDMUXA) connected to a select terminal S. Data selector 682 switches the read-write signals of RAMs 691 and 692 to match a desired address bus selection, and switches whichever signal is connected to chip select terminals CE1 and CE2, and output enable terminal OE, using the ADDMUXA signal.

Octal line buffers 684 and 685 are typically configured as tri-state line buffers and are connected to data bus DB29. When gate terminals 1G and 2G are set low (0), data bus DB29 of microprocessor 601 is connected to the data buses of RAMs 691 and 692, and data can be written from microprocessor 601 to RAMs 691 and 692. A two-input OR gate 694 is connected to receive signals /DPWROA and /ADDMUXA as inputs, and has an output connected to both gate terminals 1G and 2G of buffers 684 and 685. The /DPWROA signal goes low (0) when microprocessor 601 attempts to write data to bank A. Therefore, to write data to bank A, if bit d0 of register ADDMUXA is set low in advance, the gates of line buffers 684 and 685 open and when microprocessor 601 outputs data to bus DB29, it is output to the data buses of RAMs 691 and 692 where it is stored.

When gate terminals 1G and 2G of line buffers 686 and 687 are set low (0), data bus DB68 is connected to the data buses of RAMs 691 and 692 and data is read from RAMs 691 and 692 to control device 501. A two-input OR gate 695 is connected to receive signal /DPOEIA and an inverted ADDMUXA signal from an inverter 696 as its inputs, and has an output connected to both gate terminals 1G and 2G of line buffers 686 and 687. The /DPOE IA signal goes low (0) when control circuit 501 attempts to read data from bank A. Therefore, to read data from bank A, if bit d0 of register ADDMUXA is set high (1) in advance, the gates of line buffers 686 and 687 are open and data output to the data buses of RAMs 691 and 692 are output to data bus DB68 when the control circuit 501 performs a read operation on bank A.

The transfer of image data by microprocessor 601 and receipt by CPU 510 are now described assuming the above type of bank memory hardware. A flowchart illustrating an exemplary transfer initiation routine for image data, which is executed by microprocessor 601, is shown in FIG. 29. As shown in FIG. 29, before image data is transferred, microprocessor 601 places a transfer start command in polling command register 643 in a step S850, and CPU 510 reads this command and executes the response processing routine illustrated in FIG. 30. That is, electronic control device 501 determines whether or not laser printer 500 is print enabled in a step S860. If laser printer 500 is enabled, one of the interrupt request registers (AMDINT2) is set, in a step S865, and operation proceeds to the step labeled NEXT which temporarily terminates the current routine. If, on the other hand, laser printer 500 is not enabled, microprocessor 601 is notified of this status in a step S870. If laser printer 500 is not print enabled, it means that the laser printer cannot print even if it receives the image data. For example, laser engine 505 might still not be warmed up or could have a paper jam.

When microprocessor 601 receives interrupt request signal AMDINT2 from control device 501, it initiates the transfer interrupt routine shown in FIG. 31. When this processing starts, microprocessor 601 first writes a one to bit d0 of register ADDMUXA as in a step S900. When bit d0 of register ADDMUXA is one, as described using FIG. 28, the data buses of RAMs 691 and 692, which form bank A, are connected to data bus DB29 of microprocessor 601 and disabling access from control circuit 501 takes place.

Microprocessor 601 then transfers 128 words (here 256 bytes) of data to bank A DPWROA in a step S902. When data is written to bank A DPWROA, signal /DPWROA, which is shown in FIG. 28, goes low and data is written to RAMs 691 and 692 through line buffers 684 and 685. When this 128 word data transfer is completed, microprocessor 601 writes a one to bit d0 of register ADDMUXA, in a step S904, and connects the data buses of RAMs 691 and 692 to data bus DB68 of control device 501.

After that, microprocessor 601 writes command data to bank A, in a step S906, to notify polling command register 643 that data transfer has ended, and data transfer for bank A terminates. Microprocessor 601 next executes the same processing described above for bank B, in a step S910. When data transfer for bank B terminates, in the same manner, microprocessor 601 writes additional command data to notify polling command register 643 that this transfer has ended. In this manner, a total of 256 words (or 512 bytes) of data are transferred from cartridge 503 to banks A and B.

In response to the above processing performed by microprocessor 601, CPU 510 executes the image data reception routine shown in FIG. 32 for the microprocessor 601 processing described above. That is, CPU 510 first reads bit d3 of status register 645 or flag CMDRD in a step S920 and determines whether or not it is set to zero in a step S925. When command data is written from microprocessor 601 to polling command register 643, flag CMDRD is set to zero. At this time, CPU 510 reads the command data in polling command register 643 in a step S930. The command data is then checked, in a step S935, to determine whether or not it indicates data transfer to bank A has ended, and if not, other processing is executed in a step S940. If the command data of polling command register 643 indicates an end to bank A data transfer, control device 501 reads the 128 words of bank A DPRAMA (see FIG. 16) in a step S945 and transfers the data to RAM 512 in a step S950.

Since the above processing completes the reading of the 128 words of data in A bank, electronic control device 501 sets one of the interrupt request registers (AMDINT2) to allow transfer of the next 128 words from microprocessor 601. The processing described above for steps S920 to S955 is then repeated with respect to bank B. That is, when control device 501 determines from command data in polling command register 643 that data transfer from microprocessor 601 for bank B has ended, after reading the 128-word data of bank B DPRAMB and transferring it to RAM 512, it sets one of the interrupt request registers, requesting an interrupt from microprocessor 601.

Since microprocessor 601 repeats the interrupt processing routine shown in FIG. 32 when it receives such an interrupt request, the transfer of all data terminates when microprocessor 601 and CPU 510 have executed both routines (FIGS. 32 and 33). After the transfer of all of the image data, if new print data is not received from control device 501, microprocessor 601 writes a one in register CLKDIV of control register 650 after a predetermined amount of time and cuts its own operating frequency in half, here to 12.5 MHz, thereby reducing power consumption.

Using the above configuration, cartridge 503 is able to efficiently transfer developed image data to electronic control device 501 using interrupts and the register flag CMDR. Since the image data are sent to laser engine 505 for printing at the same time as described below, it is extremely important that the transfer of image data from cartridge 503 be performed efficiently.

J. Image Data Printing

Electronic control device 501, receives and then prints all of the image data by exchanging signals with laser engine 505 using double buffer 520 and a register 517. The exchange of signals between control device 501 and laser engine 505 is illustrated in graphic form in FIG. 33 and a general description of the printing process is provided below with reference to that figure.

When control device 501 receives developed image data from cartridge 503, it determines if laser engine 505 is ready to allow printing, that is, is the printer in a print-enabled mode. After any warm up period has ended and printing is enabled, the signals shown in FIG. 33 are output to laser engine 505 through register 517. Laser engine 505 receives these signals and immediately starts a paper or print medium transport motor. At the same time, rotation of the photosensitive drum begins, as does electrostatic charge processing, etc.

When paper, or other media, on which printing is to take place reaches a specified position relative to the photosensitive drum, laser engine 505 senses the leading edge of the paper and outputs a vertical margin control or VREQ signal to control device 501 through register 517. Upon receipt of the VREQ signal, control circuit 501 enters a standby mode for a pre-selected period of time. That is, it suspends or delays signal transmission to laser engine 505 for the length of time required for the photosensitive drum to rotate to a starting position for latent image formation, using a laser scanning beam.

A vertical synchronization or VSYNC signal is then output through register 517 to laser engine 505 which responds by outputting a laser beam horizontal synchronization or HSYNC signal through register 517. Because the HSYNC signal is the equivalent of an instruction to start reading one line of image data, laser engine 505 reads image data from one of RAMs 520A or 520B, of double bank buffer circuit 520, in synchronization with the this signal. To form blank or empty top or bottom margins on the image media, here paper, a controlled interruption or override to ignore the VSYNC signal occurs for the length of time required to scan the number of lines required to form the desired margin.

At the same time, CPU 510 counts signals and transfers required image data to RAM 520A or RAM 520B of double-buffer circuit 520. CPU 510 ends this transfer of image data to double buffer 520 when either a specified amount of time has elapsed after detection of a paper trailing edge, or a horizontal synchronization signal count reaches a preset value corresponding to the paper size. Using the above processing steps, one page of image data is transferred to laser engine 505 and then printed on paper.

While image data are transferred and printed as described above, an explanation of the processing steps used to change the settings in EEPROM 670 is provided below. CPU 510 executes a setting change routine shown in FIG. 34 according to a prescribed timing and determines whether or not a request for a setting change has been generated in a step S1200. Such a request for a setting change is generated when it is determined that cartridge 503 is installed, immediately after power on, when switches 518a on console panel 518 are operated, or when a change request is received from workstation 507.

It is desirable that the cartridge be configured to not receive or to ignore change requests or instructions from console panel 518 or workstation 507, except when related to certain communications, until after image development is completed. This approach results from that fact that settings related image development often cannot be changed during the development process, based on the a prescribed PDL.

If no request for a setting change has been received or generated, then the routine is summarily terminated without executing any further tasks. If, on the other hand, it is determined that a request has been generated, the setting is analyzed or determined in a step S1210. Here, a setting determination refers to processing required to detect or specify a value to which a communication parameter, etc., should be set to according to operation of switches 518a on console panel 518, or alternatively to analysis of a command from workstation 507. When selecting a new setting from console panel 518, an interface is often employed whereby selections are displayed on display 518b and an item is selected by operation of switches 518a in order to effectively utilize a limited number of console or operating buttons. The method used to determine a setting, and settings themselves are established according to these specifications.

After a setting has been selected, detected, or otherwise determined, electronic control device 501 transfers the setting to cartridge 503 using read control circuit 620 in a step S1220. When microprocessor 601 receives this setting data, it stores it in EEPROM 670 using the processing described above. Following this, CPU 510 executes steps or a processing routine creates an indication on liquid crystal display 518b of console panel 518 that the setting is complete or entered, and this routine is then terminated. EEPROM 670 stores data using serial transfer, and when data are transferred from the electronic control device, this data are generally written in a prescribed area in RAM 611 in place of data previously developed and are compiled and written according to a prescribed timing. These setting data can be rewritten each time a prescribed period of time has elapsed, or rewriting can be delayed until an instruction is received from the console panel 518. Further, cartridge 503 can be provided with a battery, and rewriting can be performed immediately after power to the laser printer is cut off, or immediately after cartridge 503 is removed from connector CN11.

The change in settings may only be a change in the number of copies to be printed, or it may be a general change in the operating mode of laser printer 500. In the latter case, the change may be an operation such as interrupting or inhibiting processing using the page description language in cartridge 503, and switching to processing by control commands specific to laser printer 500, or vice versa, for example.

Using this configuration, settings that determine the various operating conditions for laser printer 500 are stored in EEPROM 670 of cartridge 503. Therefore, by installing cartridge 503 in connector CN11, the operating characteristics or conditions of laser printer 500 can be easily switched to those more suited to development of print data by cartridge 503. Moreover, since the contents of EEPROM 513 are not rewritten, laser printer 500 operating conditions can be immediately returned to their original state when cartridge 503 is removed. Therefore, adding cartridge 503 to laser printer 500 in order to change its functionality, is not only easy to setup, but can also be easily removed or canceled. The number of copies to be made of an image is also normally stored by the printer, but this information rewrites data in EEPROM 513 even when printing with cartridge 513 installed. Of course, this value can also be stored in EEPROM 670 of cartridge 503, or the number of copies being printed might not be counted when cartridge 503 is installed.

K. Effectiveness of Second Embodiment

Using the second embodiment described above, as opposed to simply supplying a PDL processing program using a cartridge, the throughput of the PDL processing can be greatly increased by installing cartridge 503 as in the first embodiment. By also providing cartridge 503 with a communication capability or circuitry, it is possible to connect it to another device such as workstation 507 without breaking the connection between laser printer 500 and a computer. Furthermore, since cartridge 503 receives print data directly from workstation 507, there is no need to transfer data from laser printer 500 to cartridge 3, making it possible to use cartridge 503 with existing printers that are not intended to receive or communicate with cartridges equipped with an on-board processor.

Normally, as the functionality of a main computer unit improves, the printer becomes a bottleneck in the system, which often results in the entire printer unit being replaced in conjunction with such an improvement. Using this embodiment, however, only a cartridge 503 with a highly functional processor needs to be installed in laser printer 500, which is extremely cost effective.

In addition, data can be transferred to cartridge 503 through a read-only data bus DB68, as seen from the point of view of original electronic control device 501. Therefore, cartridge 503 can be immediately notified of operation of console panel 518, and of other printer unit information. At this time, interrupts are used to indicate the occurrence of data transfers, and processing in cartridge 503 is initiated by interrupt requests. Therefore, microprocessor 601 of cartridge 503 does not need to continually monitor the operation of electronic control device 501, and it can be utilized with greater efficiency. That is, processing overhead can be reduced and overall efficiency improved.

In this embodiment, furthermore, an ASIC is used, which facilitates a more compact, simple circuit. Since the transfer of data from electronic control device 501 to data transfer control section 603 is accomplished using read control circuit 620 and FIFO control circuit 623, one or the other can be used depending on the type of data to be transferred, and the transfer of data can be accomplished efficiently. Also, if one system should malfunction, the other can be used to compensate.

L. Alternate Embodiments

Specific configurations of the invention were explained in relation to the two embodiments presented above, but the invention is not limited to these embodiments.

Since the cartridge 503 can receive data from external sources via communication control section 604, a new page description language interpreter, for example, can be loaded into a prescribed area in RAMs 611 to 614. Processing by the new PDL then becomes possible by transferring control to this program. Therefore, updating or upgrading of a page description language is simplified. Furthermore, should an abnormal condition occur in the operation of cartridge 503, a debugging program can be loaded via communication control section 604 and used to determine the nature of the problem. Normally, it is difficult to prepare an emergency program in advance for products already in service. Therefore the ability to download such a program as required is an important advantage.

By transferring data other than image data from microprocessor 601 to CPU 510 using double-bank control circuit 624, desired information can be displayed on console panel 518. For example, since main printer unit 1 may appear to an operator to have stopped operating, while data transfer control section 603 is interpreting the PDL program and developing an image, a configuration may be employed where a message related to the development is displayed on the liquid crystal display panel of console panel 518. For example, messages such as "Data being developed," or indicating the name of the module currently being developed, the percentage of modules that have been completed from a group of modules, etc. could be used.

It is also desirable to display memory use for cartridge 503, and error codes and descriptions for the codes when an error occurs during image development using the liquid crystal display panel of console panel 518. It may also be effective to display an operating mode, such as current operating frequency (clock), sleep mode, etc., of microprocessor 601, or messages that indicating insufficient memory capacity, etc., when cartridge 503 is installed or instructions to remove expansion memory within laser printer 500.

Embodiments of this invention were described above as being applied to printers. However, use of this invention is not limited to printers. The present invention can be applied to all types of equipment the uses an internal processor. For example, dedicated word processors, personal computers, work stations, electronic vehicle devices, facsimile machines, telephones, electronic memos, musical instruments, cameras, translation machines, hand copiers, cash dispensers, remote control devices and electronic calculators which utilize such processors, as well as cartridges of any other information processing device are some of the possible applications. In recent years, such computer related equipment has not only employed expansion slots, but often cartridge type expansion devices, such as IC cards.

In dedicated word processors and personal computers, equipped with expansion slots and IC card connectors, improving or adding to data processing functions or making operational modifications can be made easy. Such ease is achieved if the cartridge of this invention is installed in one of these devices and a monitor command, etc., is used to convert the operations of the original equipment processor to processing routines stored in the built in cartridge memory so that the original electronic equipment processor processes data along with the add-on control device. Moreover, if control is switched to a cartridge, no matter what the processing or process steps are, they can be modified. Therefore, it is possible to modify and improve the functionality of existing equipment as well as update software versions in a variety of dedicated equipment, such as dedicated word processors.

In this manner, this invention can be applied to all types of devices that employ a processor and receive external data for operation, such as, printers, electrical equipment for vehicles, facsimile machines, telephones, electronic pocketbooks, electronic musical instruments, translating machines, cash dispensers, remote controllers, and any other information processing device to which an accessory control device can be connected using a connector.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. Information processing apparatus comprising:

an electronic device having at least a first processor capable of performing preselected logical operations and executing processing steps stored in a first memory connected thereto, and a connector connected to a signal line capable of exchanging data with said first processor; and an accessory control device coupled to said connector comprising:

communication means for receiving data from external sources;

a second processor capable of performing predetermined processing independent from that of said first processor;

a second memory connected to said second processor in which at least routines executed by said second processor utilizing said received data is stored; and data output means for outputting processed data from said second processor to said electronic device;

wherein said accessory control device comprises:

RAM configured to store executable programs and data;

program developing means for developing received data into a program to be stored in said RAM; and control transfer means for selectively transferring control of said second processor to a developed program;

wherein the program comprises at least one of a program for debugging the accessory control device, a program for correcting the data processing routines stored in the second memory, and a program for obtaining a more functional routine for data processing.

2. The information processing device of claim 1 wherein said received data contains data attributes that said first processor lacks a capability to effectively process, but said stored routines in said second memory are configured to process.

3. The information processing device of claim 1 wherein said data output means is configured to output data processing information to the electronic control device while said second processor is processing such data.

4. The information processing device of claim 3 wherein said data processing information comprises at least one of amount of data processed, of processed data identification, remaining processing time, and errors encountered during data processing.

5. The information processing device of claim 3 further comprising display means for providing a visual image of preselected information to an electronic device user, and for receiving and displaying data processing information from said data output means.

6. The information processing device of claim 1 wherein said electronic device comprises information transfer means for transferring information from the electronic device to the accessory control device.

7. The information processing device of claim 6 wherein said electronic device further comprises a control section that generates control information for transfer to said accessory device.

8. The information processing device of claim 6 wherein said information transfer means is coupled to at least one address bus for said first processor, and encodes information to be output to the accessory control device in addresses, and further comprising data extraction means connected to the accessory control device for extracting data contained in the addresses.

9. The information processing device of claim 1 further comprising a memory expansion connector connected to said accessory control device configured to receive memory cards containing memory storage elements and coupling them to said second processor.

10. The information processing device of claim 1 further comprising:

a third memory connected to said accessory control device in which processing executed by the first processor is stored; and control transfer means connected to said electronic and accessory control devices for transferring control of the first processor to processing stored in the third memory according to preselected timing.

11. An accessory control device for use in an electronic device having at least a first processor capable of performing preselected logical operations and executing processing steps stored in a first memory connected thereto, and a connector connected to a signal bus capable of exchanging data with said first processor, comprising:

communication means for receiving data from external sources;

a second processor capable of performing predetermined processing independent from that of said first processor;

a second memory connected to said second processor in which at least routines executed by said second processor utilizing said received data is stored;

data output means for outputting processed data from said second processor to said electronic device;

RAM configured to store executable programs and data;

program developing means for developing received data into a program to be stored in said RAM; and control transfer means for selectively transferring control of said second processor to a developed program;

wherein the program comprises at least one of a program for debugging the accessory control device, a program for correcting the data processing routines stored in the second memory, and a program for obtaining a more functional routine for data processing.

12. The accessory control device of claim 11 wherein said received data contains data attributes that said first processor lacks a capability to effectively process, but said stored routines in said second memory are configured to process.

13. The accessory control device of claim 11 wherein said data output means is configured to output data processing information to the electronic control device while said second processor is processing such data.

14. The accessory control device of claim 13 wherein said data processing information comprises at least one of processed data amount and identification, remaining processing time, and errors encountered during data processing.

15. The accessory control device of claim 11 further comprising:

a user operable control interface connected to said electronic device;

control information transfer means for transferring control information resulting from operation of a control section in said electronic device to the accessory control device; and response execution means for executing predefined processing steps in the second processor according to the received data and said control information.

16. The accessory control device of claim 11 wherein in said connector is connected to at least one address bus for said first processor, further comprising:

encoding means connected to said electronic device for encoding information to be output to said accessory control device in address values on said address bus; and information extraction means connected to said accessory control device and coupled to said address bus for extracting information contained in addresses provided by said electronic device.

17. The accessory control device of claim 11 further comprising a memory expansion connector connected to said accessory control device configured to receive memory cards containing memory storage elements and coupling them to said second processor.

18. The accessory control device of claim 11 further comprising:

a third memory connected to said accessory control device in which processing executed by the first processor is stored; and control transfer means connected to said electronic and accessory control devices for transferring control of the first processor to processing stored in the third memory according to preselected timing.

19. An information processing method performed by an electronic device, which is equipped with a first processor capable of logic operation and a first memory means that stores the processing executed by the processor, and an accessory control device, which is connected to the electronic device via a connector and is equipped with a second processor that performs processing different from the first processor, comprising the steps of:

receiving data in the accessory control device directly from external sources;

processing received data using the second processor according to routines stored in the second memory;

outputting data processed by the second processor to the electronic device;

developing data received in the accessory control device by a program stored in a RAM; and transferring control of the second processor to the developed program;

wherein the program developed in RAM is at least one of a program for debugging the accessory control device, a program for correcting the handler routine for data processing stored in the second memory means, and a program for realizing a handler routine that is more functional than the handler routine for data processing, and the second processor executes the processing.

20. The information processing method of claim 19 wherein said received data contains data attributes that said first processor lacks a capability to effectively process, further comprising the step of storing routines in said second memory configured to process such data.

21. The information processing method of claim 19 wherein information regarding the processing of data is output to the electronic control device from the accessory control device while the second processor is processing data.

22. The information processing method of claim 21 further comprising the step of outputting at least one of the amount of data processed, designation for data being processed, remaining processing time, and error information as information regarding data processing.

23. The information processing method of claim 19 wherein said electronic device has a display for displaying preselected information, and further comprising the steps of:

outputting information regarding the processing of data in said accessory control device to the electronic device while the second processor is processing the data;

receiving the information output by the accessory control device in the electronic device; and displaying said received information on the display.

24. The information processing method of claim 19 wherein the electronic device outputs information from the electronic device to the accessory control device.

25. The information processing method of claim 19 wherein said electronic device has a control section operated by the user, and further comprising the steps of:

storing control information output by the electronic device; and outputting data processed by the second processor to the electronic device.

26. The information processing method of claim 19 wherein said electronic device has a read-only bus coupled to said connector, and further comprising the steps of:

reflecting information to be provided to said accessory control device in addresses to be accessed;

performing read processing of those addresses by the first processor; and fetching information contained in the addresses in the accessory control device in response to read processing.

27. The information processing method of claim 19 further comprising the steps of:

installing a memory card in a connector provided in the accessory control device;

processing received data according to procedures stored in ROM in said memory card or processed data are developed in RAM in the memory card.

28. The information processing method of claim 19 further comprising the step of transferring control of the first processor to processing stored in a third memory provided in the accessory control device.

29. The information processing device of claim 1 wherein the electronic device is a printer that develops print data received from outside and performs printing;

the accessory control device comprises an insertable cartridge housing that mounts in a connector in the printer; and the second memory means stores a page description language interpreter which is capable of interpreting print data received via the communication means and develops the image data.

30. The information processing device of claim 29 wherein the accessory control device comprises video output means for outputting developed image data as a video signal.

31. The device of claim 29 wherein said accessory control device comprises a display device mounted on a control device housing and configured to display developed image data.

32. The accessory control device of claim 19 wherein:

the accessory control device is installed in the form of a cartridge in the connector of an electronic device, which is a printer that develops print data received from outside and performs printing; and the second memory means stores an interpreter for a page description language that interprets received print data and develops the image data.

33. The accessory control device of claim 32 wherein said accessory control device comprises video signal output means for outputting developed image data in the form of a video signal.

34. The accessory control device of claim 32 wherein said accessory control device comprises a visually observable display device that displays said developed image data.

* * * * *

UNITED STATES PATENT AND TRADEMARK OFFICE
CERTIFICATE OF CORRECTION

PATENT NO. : 5,481,656
DATED : January 2, 1996
INVENTOR(S) : Wakabayashi, et al.

It is certified that error appears in the above-indentified patent and that said Letters Patent is hereby corrected as shown below:

Column 44, line 43, change "off" to --of:--.

Column 45, line 12, change "claim 19" to --claim 11--.

Signed and Sealed this

Second Day of November, 1999

*Attest:*

Q. TODD DICKINSON

*Attesting Officer*     *Acting Commissioner of Patents and Trademarks*